United States Patent
Edge et al.

(10) Patent No.: US 11,683,738 B2
(45) Date of Patent: Jun. 20, 2023

(54) SYSTEMS AND METHODS FOR HANDOVER OF 5G LOCATION SESSIONS FOR AN NG-RAN LOCATION MANAGEMENT COMPONENT

(71) Applicant: QUALCOMM Incorporated, San Diego, CA (US)

(72) Inventors: Stephen William Edge, Escondido, CA (US); Sven Fischer, Nuremberg (DE)

(73) Assignee: QUALCOMM Incorporated, San Diego, CA (US)

(*) Notice: Subject to any disclaimer, the term of this patent is extended or adjusted under 35 U.S.C. 154(b) by 79 days.

(21) Appl. No.: 17/523,782

(22) Filed: Nov. 10, 2021

(65) Prior Publication Data

US 2022/0070753 A1 Mar. 3, 2022

Related U.S. Application Data

(63) Continuation of application No. 16/993,142, filed on Aug. 13, 2020, now Pat. No. 11,206,595.
(Continued)

(51) Int. Cl.
*H04W 36/32* (2009.01)
*H04W 48/16* (2009.01)
(Continued)

(52) U.S. Cl.
CPC .......... *H04W 36/32* (2013.01); *H04W 4/029* (2018.02); *H04W 8/12* (2013.01); *H04W 48/16* (2013.01)

(58) Field of Classification Search
None
See application file for complete search history.

(56) References Cited

U.S. PATENT DOCUMENTS

2010/0202407 A1  8/2010  Edge
2016/0105831 A1  4/2016  Masini et al.
(Continued)

FOREIGN PATENT DOCUMENTS

WO   WO-2020069757 A1   4/2020

OTHER PUBLICATIONS

"3rd Generation Partnership Project, Technical Specification Group Radio Access Network, NG-RAN, Architecture Description (Release 15)", 3GPP Draft, Draft 38401-F40, 3rd Generation Partnership Project (3GPP), Mobile Competence Centre, 650, Route Des Lucioles, F-06921 Sophia-Antipolis Cedex, France, Jan. 3, 2019 (Jan. 3, 2019), XP051576896, 40 pages, Retrieved from the Internet: URL: http://www.3gpp.org/ftp/tsg%5Fran/WG3%5Flu/Draft%5FSpecs/TSG%2DRAN82/Draft%5F38401%2Df40%2Ezip. [retrieved on Jan. 3, 2019] p. 7, section 3.1; pp. 10, 15, section 6.1.1; p. 16, section 8.2.1.1.

(Continued)

*Primary Examiner* — German Viana Di Prisco
(74) *Attorney, Agent, or Firm* — Campbell C. Chiang; Weaver Austin Villeneuve & Sampson LLP

(57) ABSTRACT

A RAN location server function (e.g. for 5G New Radio), referred to as Location Management Component (LMC), may be included in a gNB and connected to a gNB Central Unit (gNB-CU). The gNB-CU may receive a location request for a UE (e.g. from an AMF) and may initiate a location session for the UE, including selecting an LMC for the location session. The gNB-CU may handover the UE to a new serving gNB during the location session. The LMC for the location session may then remain unchanged after the handover or may be changed to a new LMC to suit the new serving gNB. The location session may then continue using the original LMC if not changed or the new LMC if changed.

30 Claims, 22 Drawing Sheets

Related U.S. Application Data

(60) Provisional application No. 62/886,829, filed on Aug. 14, 2019.

(51) Int. Cl.
*H04W 8/12* (2009.01)
*H04W 4/029* (2018.01)

(56) References Cited

U.S. PATENT DOCUMENTS

| | | |
|---|---|---|
| 2017/0272987 A1 | 9/2017 | Han et al. |
| 2020/0053817 A1* | 2/2020 | Hayashi ............... H04W 76/27 |
| 2021/0051559 A1 | 2/2021 | Edge et al. |
| 2021/0136571 A1 | 5/2021 | Ke et al. |
| 2022/0159736 A1* | 5/2022 | Chen .................... H04L 5/0048 |

OTHER PUBLICATIONS

"3rd Generation Partnership Project, Technical Specification Group Services and System Aspects, 5G System (5GS) Location Services (LCS), Stage 2 (Release 16)", 3GPP Standard Technical Specification, 3GPP TS 23.273, 3rd Generation Partnership Project (3GPP), Mobile Competence Centre, 650, Route Des Lucioles, F-06921 Sophia-Antipolis Cedex, France, No. V16.0.0, Jun. 11, 2019 (Jun. 11, 2019), XP051753949, pp. 1-86, [retrieved on Jun. 11, 2019] pp. 36-37, 46, 61, 65-67, 76.

Ericsson: "Study on Enhancement to the 5GC Location Services", 3GPP TSG-RAN WG2 #104, R2-1817723, Spokane, USA, Nov. 12-Nov. 16, 2018, pp. 1-6.

International Search Report and Written Opinion—PCT/US2020/046429—ISA/EPO—dated Oct. 16, 2020.

Qualcomm Incorporated: "NG-RAN Positioning Architecture and Procedures", 3GPP Draft, 3GPP TSG-RAN WG2 Meeting #104, R2-1817898, (NG-RAN Positioning Architecture), 3rd Generation Partnership Project (3GPP), Mobile Competence Centre, 650, Route Des Lucioles, F-06921 Sophia-Antipolis Cedex, France, vol. RAN WG2. No. Spokane, USA, Nov. 12, 2018-Nov. 16, 2018, Nov. 12, 2018 (Nov. 12, 2018), XP051557411, 17 pages, Retrieved from the Internet: URL: http://www.3gpp.org/ftp/Meetings%5F3GPP%5FSYNC/RAN2/Docs/R2%2D1817898%2Ezip. [retrieved on Nov. 12, 2018] paragraph [09.2]-paragraph [9.3.x.7.2].

Qualcomm Incorporated: "TP for TR 38.856: Impact of UE Mobility", 3GPP Draft, 3GPP TSG-RAN WG3 Meeting #105bis, R3-195823 [TP for TR 38.856 Impact of UE Mobility], 3rd Generation Partnership Project (3GPP), Mobile Competence Centre, 650, Route Des Lucioles, F-06921 Sophia-Antipolis Cedex, France, vol. RAN WG3, No. Chongqing, China, Oct. 14, 2019-Oct. 18, 2019 Oct. 4, 2019 (Oct. 4, 2019), XP051810036, 12 Pages, Retrieved from the Internet: URL:https://ftp.3gpp.org/tsg_ran/WG3_Iu/TS GR3_105bis/Docs/R3-195823.zip—R3-195823 [TP for TR 38.856 Impact of UE mobility].docx [retrieved on Oct. 4, 2019] the whole document.

* cited by examiner

SYSTEMS AND METHODS FOR HANDOVER OF 5G LOCATION SESSIONS FOR AN NG-RAN LOCATION MANAGEMENT COMPONENT

CROSS-REFERENCE TO RELATED APPLICATIONS

This application is a continuation of U.S. application Ser. No. 16/993,142, entitled "SYSTEMS AND METHODS FOR HANDOVER OF 5G LOCATION SESSIONS FOR AN NG-RAN LOCATION MANAGEMENT COMPONENT," filed Aug. 13, 2020, which claims the benefit of U.S. Provisional Application No. 62/886,829, entitled "HANDOVER OF 5G LOCATION SESSIONS FOR AN NG-RAN LOCATION MANAGEMENT COMPONENT," filed Aug. 14, 2019, both of which are assigned to the assignee hereof and are expressly incorporated herein by reference in their entireties.

BACKGROUND

Field

Aspects of the disclosure relate to architecture to support UE location services in a 5G NG-RAN.

Relevant Background

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., LTE or WiMax). A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor.

Obtaining the location of a mobile device that is accessing a wireless (e.g. 5G) network may be useful for many applications including, for example, emergency calls, personal navigation, asset tracking, locating a friend or family member, etc. However, location of a mobile device can require the implementation of one or more position methods which may require support by multiple elements in a wireless network as well as by mobile devices. This may lead to extensive signaling in obtaining the location of a wireless device caused by interaction between the multiple elements in the wireless network which may increase delay, reduce accuracy and/or increase resource usage when obtaining the location of mobile devices. It may therefore be desirable to improve the architecture for support of different position methods to reduce the amount of signaling and other resource usage and thereby enable lower delay and/or higher accuracy. Certain architectural enhancements may be sensitive to handoff of a mobile device if this occurs while locating the mobile device and if certain elements in the wireless network cannot support the location of the mobile device after the handoff. In that case, additional enhancements may be useful to better enable location of a mobile device during and following a handoff.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

A RAN location server function (referred to as Location Management Component (LMC)) may be included in a gNB and connected to a gNB Central Unit (gNB-CU). The gNB-CU may initiate a location session for a UE, including selecting a first LMC for the location session. The gNB-CU may handover the UE to a new serving gNB. The LMC for the location session with the UE may remain unchanged after the handover or may be changed to a new LMC to suit the new serving gNB.

In one implementation, a method for supporting a location session for a user equipment (UE) performed by a first Central Unit (CU) in a first New Radio (NR) node B (gNB) in a radio access network (RAN), includes receiving a first positioning message for the UE from a first entity; determining a first Location Management Component (LMC); storing first information for the location session, the first information for the location session including an identity of the first LMC, an identity of the UE and a first identifier for the location session; forwarding the first positioning message towards the first LMC; and performing a handover of the UE to a second gNB, whereby the second gNB supports a continuation of the location session.

In one implementation, a first Central Unit (CU) in a first New Radio (NR) node B (gNB) in a radio access network (RAN) configured to support a location session for a user equipment (UE), the first CU includes an external interface configured to communicate with one or more of an Access and Mobility Management Function (AMF), other gNBs in the RAN, other CUs within the other gNBs, and Location Management Components (LMCs) within the other gNBs; an internal interface configured to communicate with one or more of an LMC within the first gNB, a Distributed Unit (DU) within the first gNB, and a Transmission Reception Point (TRP) within the first gNB, which may include a Reception Point (RP) and Transmission Point (TP); at least one memory; at least one processor coupled to the external interface, the internal interface, and the at least one memory, wherein the at least one processor is configured to: receive a first positioning message for the UE from a first entity; determine a first Location Management Component (LMC); store first information for the location session, the first information for the location session including an identity of the first LMC, an identity of the UE and a first identifier for the location session; forward the first positioning message towards the first LMC; and perform a handover of the UE to a second gNB, whereby the second gNB supports a continuation of the location session.

In one implementation, a first Central Unit (CU) in a first New Radio (NR) node B (gNB) in a radio access network (RAN) configured to support a location session for a user equipment (UE), the first CU includes means for receiving a first positioning message for the UE from a first entity; means for determining a first Location Management Component (LMC); means for storing first information for the location session, the first information for the location session including an identity of the first LMC, an identity of the UE and a first identifier for the location session; means for forwarding the first positioning message towards the first LMC; and means for performing a handover of the UE to a second gNB, whereby the second gNB supports a continuation of the location session.

In one implementation, a non-transitory storage medium including program code stored thereon, the program code is operable to cause at least one processor in a first Central Unit (CU) in a first New Radio (NR) node B (gNB) in a radio access network (RAN) to support a location session for a user equipment (UE), includes program code to receive a first positioning message for the UE from a first entity; program code to determine a first Location Management Component (LMC); program code to store first information for the location session, the first information for the location session including an identity of the first LMC, an identity of the UE and a first identifier for the location session; program code to forward the first positioning message towards the first LMC; and program code to perform a handover of the UE to a second gNB, whereby the second gNB supports a continuation of the location session.

In one implementation, a method for continuing a location session for a user equipment (UE) performed by a first Central Unit (CU) in a first New Radio (NR) node B (gNB) in a radio access network (RAN), includes receiving a first handover request message for the UE from a second gNB, the first handover request message comprising first information for the location session, the first information for the location session including an identity of a first Location Management Component (LMC), an identity of the UE and a first identifier for the location session; storing second information for the location session, the second information for the location session including at least part of the first information for the location session; completing the handover of the UE from the second gNB to the first gNB; determining a second LMC, wherein the second LMC is the first LMC or is different from the first LMC; including an identity of the second LMC in the second information for the location session when the second LMC is different from the first LMC; and sending a first location session update message to the first gNB, the first location session update message comprising an identity of the second gNB and an identity of the second LMC when the second LMC is different from the first LMC.

In one implementation, a first Central Unit (CU) in a first New Radio (NR) node B (gNB) in a radio access network (RAN) configured to continue a location session for a user equipment (UE), the first CU includes an external interface configured to communicate with one or more of an Access and Mobility Management Function (AMF), other gNBs in the RAN, other CUs within the other gNBs, and Location Management Components (LMCs) within the other gNBs; an internal interface configured to communicate with one or more of an LMC within the first gNB, a Distributed Unit (DU) within the first gNB, and a Transmission Reception Point (TRP) within the first gNB, which may include a Reception Point (RP) and Transmission Point (TP); at least one memory; at least one processor coupled to the external interface, the internal interface, and the at least one memory, wherein the at least one processor is configured to: receive a first handover request message for the UE from a second gNB via the external interface, the first handover request message comprising first information for the location session, the first information for the location session including an identity of a first Location Management Component (LMC), an identity of the UE and a first identifier for the location session; store second information for the location session, the second information for the location session including at least part of the first information for the location session; complete a handover of the UE from the second gNB to the first gNB; determine a second LMC, wherein the second LMC is the first LMC or is different from the first LMC; include an identity of the second LMC in the second information for the location session when the second LMC is different from the first LMC; and send a first location session update message to the first gNB via the internal interface, the first location session update message comprising an identity of the second gNB and an identity of the second LMC when the second LMC is different from the first LMC.

In one implementation, a first Central Unit (CU) in a first New Radio (NR) node B (gNB) in a radio access network (RAN) configured to continue a location session for a user equipment (UE), the first CU includes means for receiving a first handover request message for the UE from a second gNB, the first handover request message comprising first information for the location session, the first information for the location session including an identity of a first Location Management Component (LMC), an identity of the UE and a first identifier for the location session; means for storing second information for the location session, the second information for the location session including at least part of the first information for the location session; means for completing a handover of the UE from the second gNB to the first gNB; means for determining a second LMC, wherein the second LMC is the first LMC or is different from the first LMC; means for including an identity of the second LMC in the second information for the location session when the second LMC is different from the first LMC; and means for sending a first location session update message to the first gNB, the first location session update message comprising an identity of the second gNB and an identity of the second LMC when the second LMC is different from the first LMC.

In one implementation, a non-transitory storage medium including program code stored thereon, the program code is operable to cause at least one processor in a first Central Unit (CU) in a first New Radio (NR) node B (gNB) in a radio access network (RAN) configured to continue a location session for a user equipment (UE) includes program code to receive a first handover request message for the UE from a second gNB, the first handover request message comprising first information for the location session, the first information for the location session including an identity of a first Location Management Component (LMC), an identity of the UE and a first identifier for the location session; program code to store second information for the location session, the second information for the location session including at least part of the first information for the location session; program code to complete a handover of the UE from the second gNB to the first gNB; program code to determine a second LMC, wherein the second LMC is the first LMC or is different from the first LMC; program code to include an identity of the second LMC in the second information for the location session when the second LMC is different from the first LMC; and program code to send a first location session update message to the first gNB, the first location session update message comprising an identity of the second gNB and an identity of the second LMC when the second LMC is different from the first LMC.

In one implementation, a method for supporting a location session for a user equipment (UE) performed by a first Location Management Component (LMC) in a first New Radio (NR) node B (gNB) in a radio access network (RAN), includes receiving a first positioning message for the UE from a first entity, the first positioning message relayed to the first LMC by a Central Unit (CU) for the first gNB, the first positioning message initiating the location session for the UE in the first LMC, the first positioning message including an identity for a source gNB, the source gNB serving the UE, and an identifier for the location session; transmitting at least one positioning message for the UE to a second entity; receiving a location session update message, the location session update message indicating a handover of the UE from the source gNB to a target gNB, the location session update message indicating whether or not a second LMC is assigned, the location session update message including an identity of the second LMC when the second LMC is assigned; continuing to support the location session using the target gNB when the second LMC is not assigned; and sending a location session transfer message to the second LMC when the second LMC is assigned, the location session transfer message including a current status of the location session and the first positioning message.

In one implementation, a first Location Management Component (LMC) in a first New Radio (NR) node B (gNB) in a radio access network (RAN) configured to support a location session for a user equipment (UE), the first LMC includes a communications interface, comprising one or more of an external interface and an internal interface, configured to communicate with a Central Unit (CU); at least one memory; at least one processor coupled to the communications interface and the at least one memory, wherein the at least one processor is configured to: receive a first positioning message for the UE from a first entity, the first positioning message relayed to the first LMC by a Central Unit (CU) for the first gNB, the first positioning message initiating the location session for the UE in the first LMC, the first positioning message including an identity for a source gNB, the source gNB serving the UE, and an identifier for the location session; transmit at least one positioning message for the UE to a second entity; receive a location session update message, the location session update message indicating a handover of the UE from the source gNB to a target gNB, the location session update message indicating whether or not a second LMC is assigned, the location session update message including an identity of the second LMC when the second LMC is assigned; continue to support the location session using the target gNB when the second LMC is not assigned; and send a location session transfer message to the second LMC when the second LMC is assigned, the location session transfer message including a current status of the location session and the first positioning message.

In one implementation, a first Location Management Component (LMC) in a first New Radio (NR) node B (gNB) in a radio access network (RAN) configured to support a location session for a user equipment (UE), the first LMC includes means for receiving a first positioning message for the UE from a first entity, the first positioning message relayed to the first LMC by a Central Unit (CU) for the first gNB, the first positioning message initiating the location session for the UE in the first LMC, the first positioning message including an identity for a source gNB, the source gNB serving the UE, and an identifier for the location session; means for transmitting at least one positioning message for the UE to a second entity; means for receiving a location session update message, the location session update message indicating a handover of the UE from the source gNB to a target gNB, the location session update message indicating whether or not a second LMC is assigned, the location session update message including an identity of the second LMC when the second LMC is assigned; means for continuing to support the location session using the target gNB when the second LMC is not assigned; and means for sending a location session transfer message to the second LMC when the second LMC is assigned, the location session transfer message including a current status of the location session and the first positioning message.

In one implementation, a non-transitory storage medium including program code stored thereon, the program code is operable to cause at least one processor in a first Location Management Component (LMC) in a first New Radio (NR) node B (gNB) in a radio access network (RAN) configured to support a location session for a user equipment (UE), includes program code to receive a first positioning message for the UE from a first entity, the first positioning message relayed to the first LMC by a Central Unit (CU) for the first gNB, the first positioning message initiating the location session for the UE in the first LMC, the first positioning message including an identity for a source gNB, the source gNB serving the UE, and an identifier for the location session; program code to transmit at least one positioning message for the UE to a second entity; program code to receive a location session update message, the location session update message indicating a handover of the UE from the source gNB to a target gNB, the location session update message indicating whether or not a second LMC is assigned, the location session update message including an identity of the second LMC when the second LMC is assigned; program code to continue to support the location session using the target gNB when the second LMC is not assigned; and program code to send a location session transfer message to the second LMC when the second LMC is assigned, the location session transfer message including a current status of the location session and the first positioning message.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1:
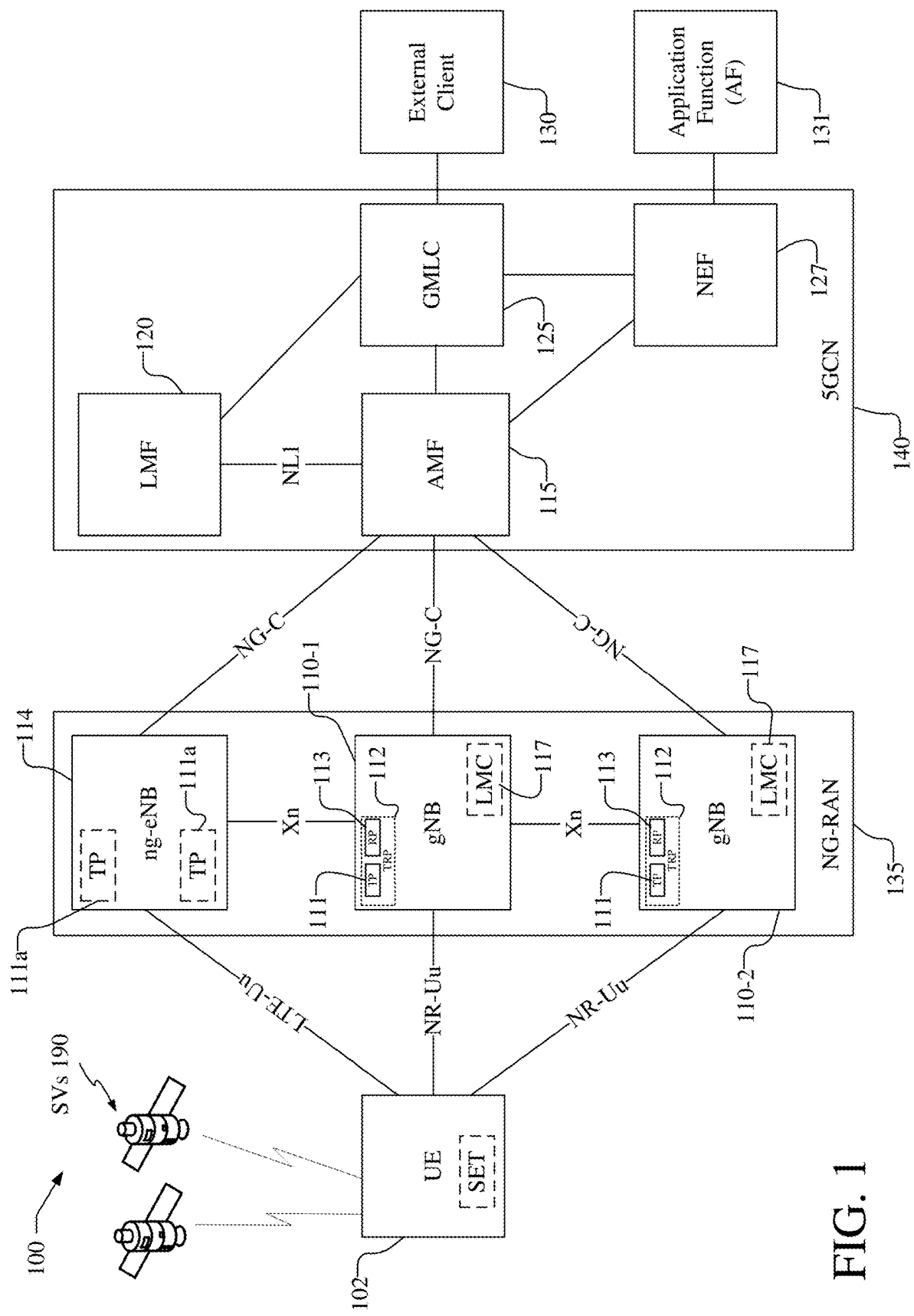
FIG. 1 illustrates a wireless communication system including a Next Generation (NG) Radio Access Network.

Elements with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 110-1, and 110-2 of a gNB are shown in FIG. 1. A reference to a gNB 110 may then refer to either of gNBs 110-1 and 110-2.

DETAILED DESCRIPTION

In technical specifications (TSs) for the Third Generation Partnership Project (3GPP), a location server (Location Management Function (LMF)) can be located in a 5G Core Network (5GCN) and connected to an Access and Mobility Management Function (AMF). Location related signaling between an LMF and a target device (UE) then comprises core network and Radio Access Network (RAN) signaling. For example, a Long Term Evolution Positioning Protocol (LPP) message, that is sent between an LMF and a UE, may be transported over multiple interfaces including interfaces between an LMF and AMF, between an AMF and an NG-RAN (e.g. a gNB)) and over an air interface between the NG-RAN (e.g. gNB) and the UE. These interfaces may be control plane interfaces, user plane interfaces or both. Each interface and intermediate node would typically add additional delay to the transport of the LPP message.

In order to reduce the signaling delays between a location server and a UE, (at least parts of) the location server function can be moved from a core network to a RAN. A location server function in the RAN can also reduce resource utilization (by reducing signaling) and increase location capacity by offloading location support from LMFs in the core network.

In accordance with an implementation, a RAN location server function (referred to here as a Location Management Component (LMC)) can be a separate component in a New Radio (NR) Node B (gNB) connected to a gNB Central Unit (CU), referred to as a gNB-CU. The gNB-CU can receive location related messages from the UE via a gNB Distributed Unit (gNB-DU), from another gNB-CU in a different gNB via an Xn interface between two gNBs, or from a core network entity (e.g. an AMF) via a Next Generation (NG) interface. Location related signaling can be transported in container messages of the corresponding application protocols. For example, the transport can use: (i) a Radio Resource Control (RRC) container for LPP messages transported over an air interface; (ii) a Next Generation Application Protocol (NGAP) container for location related messages transported over the NG interface between an AMF and a gNB (or other NG-RAN node); and (iii) an Xn Application Protocol (XnAP) container for location related messages transported over the Xn interface between two NG-RAN nodes (e.g. 2 gNBs). A gNB-CU in a destination gNB may then forward each of these containers to an LMC in the gNB using an F1 Application Protocol (F1-AP) container message. Similarly, for location related messages sent from an LMC to a UE or to another gNB or to a core network entity (e.g. AMF), the LMC can send the location related message inside a corresponding F1AP message container to the gNB-CU for distribution to a UE, other gNB, a gNB-DU or a core network entity.

The architectures and other aspects disclosed in the following description and related drawings are directed to specific aspects of the disclosure. Alternate aspects may be devised without departing from the scope of the disclosure. Additionally, well-known elements of the disclosure are not described in detail or are omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A mobile device, also referred to herein as a UE, may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile device," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 shows a positioning architecture diagram of a communication system 100 that includes support of location management functionality in NG-RAN. The "location management functionality in NG-RAN" is referred to here as a "Location Management Component (LMC)" and is in one or more of the gNBs 110 in FIG. 1.

The communication system 100 may be configured for supporting location of a user equipment (UE) 102. Here, the communication system 100 comprises a UE 102, and components of a Fifth Generation (5G) network comprising a Next Generation (NG) Radio Access Network (RAN) (NG-RAN) 135 and a 5G Core Network (5GCN) 140. A 5G network may also be referred to as a New Radio (NR) network; NG-RAN 135 may be referred to as a 5G RAN or as an NR RAN; and 5GCN 140 may be referred to as an NG Core network (NGC). The communication system 100 may further utilize information from satellite vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 102 is illustrated, it will be understood that many UEs (e.g., hundreds, thousands, millions, etc.) may utilize the communication system 100. Similarly, the communication system 100 may include a larger (or smaller) number of SVs 190, gNBs 110, next generation evolved Node Bs (ng-eNBs) 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology or for other communication technologies and protocols) may be used to configure, in response to receiving a request, an increased quantity of location-related information or resources associated with broadcast communication from wireless nodes (e.g. broadcast of assistance data), transmission of Positioning Reference Signals (PRSs) or some other location related function of the wireless nodes.

The UE 102 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 102 may correspond to a cellphone, smartphone, laptop, tablet, PDA, tracking device, navigation device, Internet of Things (IoT) device, or some other portable or moveable device. Typically, though not necessarily, the UE 102 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 135 and 5GCN 140), etc. The UE 102 may also support wireless communication using a Wireless Local Area Network (WLAN) which may connect to other networks (e.g. the Internet) using a Digital Subscriber Line (DSL) or packet cable for example. The use of one or more of these RATs may allow the UE 102 to communicate with an external client 130 (via elements of 5GCN 140 not shown in FIG. 1, or possibly via a Gateway Mobile Location Center (GMLC) 125) and/or allow the external client 130 to receive location information regarding the UE 102 (e.g., via the GMLC 125).

The UE 102 may include a single entity or may include multiple entities such as in a personal area network where a user may employ audio, video and/or data I/O devices and/or body sensors and a separate wireline or wireless modem. An estimate of a location of the UE 102 may be referred to as a location, location estimate, location fix, fix, position, position estimate or position fix, and may be geographic, thus providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of the UE 102 may also be expressed as an area or volume (defined either geographically or in civic form) within which the UE 102 is expected to be located with some probability or confidence level (e.g., 67%, 95%, etc.) A location of the UE 102 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 135 shown in FIG. 1 comprise NR NodeBs, also referred to as gNBs, 110-1 and 110-2 (collectively and generically referred to herein as gNBs 110). Pairs of gNBs 110 in NG-RAN 135 may be connected to one another—e.g. directly as shown in FIG. 1 or indirectly via other gNBs 110. Access to the 5G network is provided to UE 102 via wireless communication between the UE 102 and one or more of the gNBs 110, which may provide wireless communications access to the 5GCN 140 on behalf of the UE 102 using 5G NR. 5G NR radio access may also be referred to as NR radio access or as 5G radio access. In FIG. 1, the serving gNB for UE 102 is assumed to be gNB 110-1, although other gNBs (e.g. gNB 110-2) may act as a serving gNB if UE 102 moves to another location or may act as a secondary gNB to provide additional throughout and bandwidth to UE 102. A Location Management Component (LMC) 117 within a node in the NG-RAN 135, such as in serving gNB 110-1, may perform a location server function, as discussed herein. An LMC 117 may be referred to by other names such as a "location function", "location management function" (LMF), local LMF, RAN LMF, NG-RAN LMF.

Base stations (BSs) in the NG-RAN 135 shown in FIG. 1 may also or instead include a next generation evolved Node B, also referred to as an ng-eNB, 114. Ng-eNB 114 may be connected to one or more gNBs 110 in NG-RAN 135—e.g. directly or indirectly via other gNBs 110 and/or other ng-eNBs. An ng-eNB 114 may provide LTE wireless access and/or evolved LTE (eLTE) wireless access to UE 102. Some gNBs 110 (e.g. gNB 110-2) and/or ng-eNB 114 in FIG. 1 may be configured to function as positioning-only beacons, which may transmit signals (e.g. PRS signals) and/or may broadcast assistance data to assist positioning of UE 102 but may not receive signals from UE 102 or from other UEs. It is noted that while only one ng-eNB 114 is shown in FIG. 1, some embodiments may include multiple ng-eNBs 114.

As noted, while FIG. 1 depicts nodes configured to communicate according to 5G NR and LTE communication protocols for an NG-RAN 135, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 102, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GCN 140 in FIG. 1.

The gNBs 110 and ng-eNB 114 can communicate with an Access and Mobility Management Function (AMF) 115, which, for positioning functionality may communicates with a Location Management Function (LMF) 120. The AMF 115 may support mobility of the UE 102, including cell change and handover and may participate in supporting a signaling connection to the UE 102 and possibly data and voice bearers for the UE 102. The LMF 120 (if present) may support positioning of the UE 102 when UE accesses the NG-RAN 135 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), Enhanced Cell ID (ECID), angle of arrival (AOA), angle of departure (AOD), multi-cell round trip signal propagation time (Multi-RTT), and/or other position methods. The LMF 120 may also process location services requests for the UE 102, e.g., received from the AMF 115 or from the GMLC 125. The LMF 120 may be connected to AMF 115 and/or to GMLC 125. In some embodiments, a node/system that implements the LMF 120 may additionally or alternatively implement other types of location-support modules, such as an Enhanced Serving Mobile Location Center (E-SMLC). It is noted that in some embodiments, at least part of the positioning functionality (including derivation of a UE 102's location) may be performed at the UE 102 (e.g., using signal measurements obtained by UE 102 for signals transmitted by wireless nodes such as gNBs 110 and ng-eNB 114, and assistance data provided to the UE 102, e.g. by LMF 120).

The Gateway Mobile Location Center (GMLC) 125 may support a location request for the UE 102 received from an external client 130 and may forward such a location request to the AMF 115 for forwarding by the AMF 115 to the LMF 120 (or to an LMC 117). A location response from the LMF 120 (e.g. containing a location estimate for the UE 102) may be similarly returned to the GMLC 125 either directly or via the AMF 115, and the GMLC 125 may then return the location response (e.g., containing the location estimate) to the external client 130.

A Network Exposure Function (NEF) 127 may be included in 5GCN 140. The NEF 127 may support secure exposure of capabilities and events concerning 5GCN 150 and UE 102 to an application function (AF) 131 and may enable secure provision of information from the AF 131 to 5GCN 150. In the context of location services, NEF 127 may function to obtain a current or last known location for a UE 102, may obtain an indication of a change in location for a UE 102, or an indication of when a UE 102 becomes available (or reachable). The NEF 127 may be connected to the AMF 115 and the GMLC 125 to support, e.g., last known location, current location and/or deferred periodic and triggered location for the UE 102.

The LMF 120 may communicate with the gNBs 110 and/or with the ng-eNB 114 using a New Radio Position Protocol A (NRPPa), which may be defined in 3GPP Technical Specification (TS) 38.455. NRPPa messages may be transferred between a gNB 110 and the LMF 120, and/or between an ng-eNB 114 and the LMF 120, via the AMF 115. LMF 120 and UE 102 may communicate using an LTE Positioning Protocol (LPP), which may be defined in 3GPP TS 37.355. Here, LPP messages may be transferred between the UE 102 and the LMF 120 via the AMF 115 and a serving gNB 110-1 or serving ng-eNB 114 for UE 102. For example, LPP messages may be transferred between the LMF 120 and the AMF 115 using service operations based on the Hypertext Transfer Protocol (HTTP) and may be transferred between the AMF 115 and the UE 102 using a 5G Non-Access Stratum (NAS) protocol. The LPP protocol may be used to support positioning of UE 102 using UE assisted and/or UE based position methods such as A-GNSS, RTK, OTDOA, Multi-RTT and/or ECID. The NRPPa protocol may be used to support positioning of UE 102 using network based position methods such as ECID (e.g. when used with measurements obtained by a gNB 110 or ng-eNB 114), uplink AOA and Multi-RTT, and/or may be used by LMF 120 to obtain location related information from gNBs 110 and/or ng-eNB 114, such as parameters defining PRS transmission from gNBs 110 and/or ng-eNB 114.

With a UE assisted position method, UE 102 may obtain location measurements and send the measurements to a location server (e.g. LMF 120, or an LMC 117 within a node in the NG-RAN 135, such as in serving gNB 110-1) for computation of a location estimate for UE 102. For example, the location measurements may include one or more of a Received Signal Strength Indication (RSSI), Round Trip signal propagation Time (RTT), Reference Signal Time Difference (RSTD), Reference Signal Received Power (RSRP), Reference Signal Received Quality (RSRQ), Receive Time-Transmit Time difference (Rx-Tx), AOA, and/or AOD for gNBs 110, ng-eNB 114 and/or a WLAN access point (AP). The location measurements may also or instead include measurements of GNSS pseudorange, code phase and/or carrier phase for SVs 190. With a UE based position method, UE 102 may obtain location measurements (e.g. which may be the same as or similar to location measurements for a UE assisted position method) and may compute a location of UE 102 (e.g. with the help of assistance data and/or uplink measurements received from a location server such as LMF 120 or LMC 117 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ, AOA, Rx-Tx or Time Of Arrival (TOA)) for signals transmitted by UE 102, and/or may receive measurements obtained by UE 102, and may send the measurements to a location server (e.g. LMF 120, or an LMC 117) for computation of a location estimate for UE 102.

Information provided by the gNBs 110 and/or ng-eNB 114 to the location server, e.g., LMF 120 using NRPPa or to an LMC 117 within a node in the NG-RAN 135, such as in serving gNB 110-1 using XnAP, may include timing and configuration information for PRS transmission and location coordinates. The location server may then provide some or all of this information to the UE 102 as assistance data in an LPP message via the NG-RAN 135 and the 5GCN 140.

An LPP message sent from the location server to the UE 102 may instruct the UE 102 to do any of a variety of things, depending on desired functionality. For example, the LPP message could contain an instruction for the UE 102 to obtain measurements for GNSS (or A-GNSS), WLAN, and/or OTDOA (or some other position method like Multi-RTT). In the case of OTDOA, the LPP message may instruct the UE 102 to obtain one or more measurements (e.g. RSTD measurements) of PRS signals transmitted within particular cells supported by particular gNBs 110 and/or ng-eNB 114 (or supported by some other type of base station such as an eNB or WiFi AP). An RSTD measurement may comprise the difference in the times of arrival at the UE 102 of a signal (e.g. a PRS signal) transmitted or broadcast by one gNB 110 and a similar signal transmitted by another gNB 110. The UE 102 may send the measurements back to the location server, e.g., to the LMF 120 in an LPP message (e.g. inside a 5G NAS message) via the serving gNB 110-1 (or serving ng-eNB 114) and the AMF 115 or to the LMC 117 within a node in the NG-RAN 135, such as in serving gNB 110-1.

As noted, while the communication system 100 is described in relation to 5G technology, the communication system 100 may be implemented to support other communication technologies, such as GSM, WCDMA, LTE, etc., that are used for supporting and interacting with mobile devices such as the UE 102 (e.g., to implement voice, data, positioning, and other functionalities). In some such embodiments, the 5GCN 140 may be configured to control different air interfaces. For example, in some embodiments, 5GCN 140 may be connected to a WLAN, either directly or using a Non-3GPP InterWorking Function (N3IWF, not shown FIG. 1) in the 5GCN 140. For example, the WLAN may support IEEE 802.11 WiFi access for UE 102 and may comprise one or more WiFi APs. Here, the N3IWF may connect to the WLAN and to other elements in the 5GCN 140 such as AMF 115. In some other embodiments, both the NG-RAN 135 and the 5GCN 140 may be replaced by other RANs and other core networks. For example, in an EPS, the NG-RAN 135 may be replaced by an E-UTRAN containing eNBs and the 5GCN 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use the LPP A (LPPa) protocol defined 3GPP TS 36.455 in place of NRPPa to send and receive location information to and from the eNBs in the E-UTRAN and may use LPP to support positioning of UE 102. In these other embodiments, on-demand resource allocation for positioning of a UE 102 may be supported in an analogous manner to that described herein for a 5G network with the difference that functions and procedures described herein for gNB s 110, ng-eNB 114, AMF 115 and LMF 120 may, in some cases, apply instead to other network elements such eNBs, WiFi APs, an MME and an E-SMLC.

It should be noted that the gNBs 110 and ng-eNB 114 may not always both be present in the NG-RAN 135. Moreover, when both the gNBs 110 and ng-eNB 114 are present, the NG interface with the AMF 115 may only present for one of them.

As illustrated in FIG. 1, a gNB 110 may be allowed to control one or more Transmission Points (TPs) 111, such as broadcast-only TPs for improved support of DL position methods such as OTDOA or ECID. Additionally, a gNB 110 may be allowed to control one or more Reception Points (RPs) 113, such as internal Location Measurement Units (LMUs) for UL measurements for position methods such as UTDOA or ECID. The TPs 111 and RPs 113 may be combined into, or defined to be part of, a Transmission Reception Point (TRP) 112 to support downlink (DL) and/or uplink (UL) position methods, such as UL Time Difference of Arrival (TDOA), DL TDOA (also referred to as OTDOA) and Multi-RTT. Further, a gNB 110 may be allowed to include a Location Management Component (LMC) 117 to support positioning of a target UE 102 by a serving gNB 110. LMC 117 may support some or all of the same functions as LMF 120, with the difference that LMC 117 is located in NG-RAN 135, whereas LMF 120 is located in 5GCN 140. Positioning of a UE 102 by a serving gNB 110 can be used to provide a location service to a UE 102, serving AMF 115 or LMF 120 and to improve NG-RAN operation—e.g. by reducing the latency of position determination and increasing the number of UEs 102 for which location can be supported.

As illustrated, the ng-eNB 114 may control one or more TPs 111*a*, which may use different protocols than TPs 111 in gNBs 110-1 and 110-2, e.g., the TPs 111*a* may use protocols related to LTE, while TPs 111 use protocols related to 5G NR. The TPs 111*a* may perform similar functions as TPs 111 in gNBs 110-1 and 110-2, and accordingly, TPs 111 and 111*a* may be collectively referred to herein as TPs 111.

The location management functionality in the NG-RAN 135, i.e., LMC 117, may have comparable capability to a 5GCN LMF, e.g., (LMF 120). An operator could restrict an LMC 117 to support of e.g., NR Radio Access Technology (RAT) dependent positioning if a 5GCN LMF 120 is present that supports other position methods or could support most or all position methods in an LMC 117 if no 5GCN LMF 120 is present. The LMC 117 may communicate with a gNB Central Unit (gNB-CU) as described later. The LMC 117 may further manage one or more Transmission Points (TPs) 111 that are configured to transmit downlink (DL) reference signals (RSs) to be measured by the UE 102 and one or more Reception Points (RPs) 113 that are configured to receive and measure uplink (UL) Resource Signals (RSs) transmitted by the UE 102. In some implementations, LMC 117 may be a logical function in a gNB 110 CU or may be external to and connected to a gNB 110.

An LMC 117 in a gNB 110 may perform various functions. For example, the LMC 117 may request location measurements from the UE 102, e.g., using RRC or LPP, may manage UL location measurements by the gNB 110 or TRP 112 of the UE 102, and may manage static and dynamic scheduling of DL-PRS and broadcast of assistance data by the gNB 110. The LMC 117 may further interact with other gNBs 110 to coordinate location support (e.g. obtain UL location measurements for a UE 102 or request changes to DL-PRS broadcast). The LMC 117 may determine a location estimate for a UE. The LMC 117 may provide a location service capability to a serving AMF 115 (e.g., using NGAP), provide a location service capability to other gNBs, and provide a location service capability to a UE 102 (e.g., using RRC or LPP). The above functions are provided as examples only. Additional or different functions may be performed if desired. An LMC 117 may communicate with other gNBs 110 using XnAP or a location specific protocol above XnAP in order to coordinate support of these functions.

Thus, an LMC 117 may support NG-RAN 135 determination of a UE 102 location which can be requested by the UE 102 (e.g., using LPP), by a serving AMF 115 (e.g., using NGAP or a location specific protocol conveyed by NGAP), or by another gNB 110/ng-eNB 114 (e.g. using XnAP or a location specific protocol conveyed by XnAP). Such a capability would allow location support without the need for an LMF 120 (or possibly a GMLC 125) in the 5GCN 140 and can also be used to reduce latency in position determination (since the NG-RAN 135 is closer to a UE 102 than an LMF 120) and offload location support from LMFs.

The signaling between an AMF 115 and NG-RAN 135 node may use a protocol layering as defined in 3GPP Technical Specification (TS) 38.300 and 3GPP TS 23.501 and can make use of the Next Generation Application Protocol (NGAP) at the top level as defined in 3GPP TS 38.413. An NG-RAN 135 location reporting procedure is defined in 3GPP TS 23.502 and 3GPP TS 38.413 and enables a serving AMF to request a serving NG-RAN node to report the UE location once only, periodically on a change of serving cell or periodically when a UE presence in an area of interest has changed. The location provided by the serving NG-RAN node can comprise an NR or LTE Cell Global Identity CGI (CGI) and a Tracking Area Identity. This existing procedure may be enhanced to further include an optional Quality of Service (QoS) parameter in a Location Reporting Control message to enable a serving AMF 115 to request a more accurate location for a UE 102 than that corresponding to a CGI. The procedure may be further enhanced to include an optional list of supported Geographic Area Description (GAD) shapes in a Location Reporting Control message. The procedure may further include allowing the serving NG-RAN node to obtain a more accurate UE location when a QoS (e.g. using Enhanced Cell ID (ECID) positioning). The procedure may further permit an NG-RAN node (e.g. a gNB 110) to return a UE location to a serving AMF 115 using a GAD shape when requested in a Location Reporting Control message.

Figure 2:
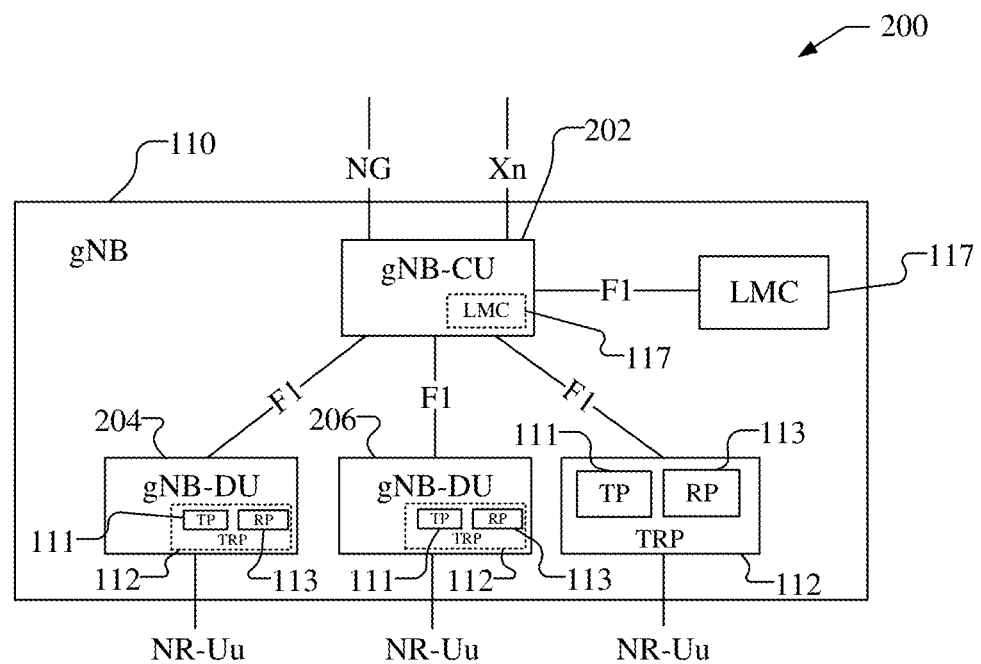
FIG. 2 shows an extended architecture diagram of an NG-RAN node that includes a Location Management Component (LMC).

FIG. 2 shows an architecture diagram of an NG-RAN node 200, which includes an LMC 117. The NG-RAN node 200 may be a gNB 110, according to one implementation. The architecture shown in FIG. 2, for example, may be applicable to any gNB 110-1 and 110-2 in NG-RAN 135 shown in FIG. 1.

As illustrated, gNB 110 includes a gNB Central Unit (gNB-CU) 202, and gNB Distributed Units (gNB-DUs) 204 and 206, which may be physically co-located in the gNB 110 or may be physically separate. The gNB-CU 202 is a logical or physical node hosting support for RRC, Service Data Adaptation Protocol (SDAP) and Packet Data Convergence Protocol (PDCP) protocols of the gNB used over the NR Uu air interface and controlling the operation of one or more gNB-DUs. The gNB-CU terminates the F1 interface connected with the gNB-DU. As illustrated, the gNB-CU 202 may communicate with an AMF 115 via an NG interface. The gNB-CU 202 may further communicate with one or more other gNBs 110 via the Xn interface. The gNB-DUs 204 and 206 are logical or physical nodes hosting support for Radio Link Control (RLC), Medium Access Control (MAC) and Physical (PHY) protocol layers used over the NR Uu air interface of the gNB 110, operation of which is partly controlled by gNB-CU 202. The gNB-DU terminates the F1 interface connected with the gNB-CU. The gNB-CU 202 requests positioning measurements (e.g. E-CID) to the gNB-DU 204 and 206. The gNB-DU 204 and 206 reports the measurements back to the gNB-CU 202. A gNB-DU 204 or 206 may include positioning measurement functionality. It should be understood that a separate measurement node is not precluded.

The LMC 117 can be part of a gNB-CU 202 (e.g. a logical function or a gNB-CU 202). However, in order to offload positioning support from a gNB-CU 202 and to allow a multi-vendor environment, a separate LMC 117 is allowed, which may be connected to the gNB-CU 202 via an F1 interface. The gNB-CU 202 can then forward all positioning related signaling to the LMC 117 and/or gNB-DUs 204 and 206 or TRPs 112.

Additionally, as illustrated, gNB 110 may include a TP 111 and an RP 113 combined into a TRP 112, and LMC 117, which may be physically or logically located in the gNB 110. The gNB-CU 202 may be configured to communicate with the TP 111, RP 113, and LMC 117, e.g., via F1 interfaces. The gNB-CU 202, thus, controls one or more TP 111 and RP 113 and the LMC 117 is accessible from the gNB-CU 202 via an F1 interface.

In some embodiments, the NG-RAN node 200 (or gNB 110) may comprise a subset of the elements shown in FIG. 2. For example, the NG RAN node 200 may comprise the gNB-CU 202 and the LMC 117 but may not include one or more of gNB-DUs 204 and 206, RP 113 or TP 111. Alternatively, NG-RAN node 200 may include one or more of gNB-DUs 204 and 206, RP 113 or TP 111 but may not include LMC 117. Further, the elements shown in FIG. 2 may be logically separate but physically co-located or may be partially or completely physically separate. For example, LMC 117 may be physically separate from gNB-CU 202 or may be physically combined with gNB-CU 202. Similarly, one or more of gNB-DUs 204 and 206, RP 113 or TP 111 may be physically separate from gNB-CU 202 or may be physically combined with gNB-CU 202. In the case of physical separation, the F1 interface may define signaling over a physical link or connection between two separated elements. In some implementations, gNB-CU 202 may be split into a control plane portion (referred to as a CU-CP or gNB-CU-CP and a user plane portion (referred to as CU-UP or gNB-CU-UP). In this case, both the gNB-CU-CP and gNB-CU-UP may interact with gNB-DUs 204 and 206 to support NR Uu air interface signaling for control plane (CP) and user plane (UP), respectively. However, only the gNB-CU-CP may interact with LMC 117, TPs 111 and RPs 113 to support and control location related communication.

Protocol layering between the gNB-CU 202 and the TP 111, RP 113, and LMC 117 may be based on an F1 CP (F1 C) interface as defined in 3GPP TS 38.470, which uses F1AP at the top level as specified in 3GPP TS 38.473. New messages to support positioning could be added directly into F1AP or could be introduced in a new location specific protocol which is transported using F1AP.

The location procedures between the gNB-CU 202 and LMC 117 may comprise all location related procedures on NG, Xn, and NR-Uu interfaces. For example, the location procedures between AMF 115 and the NG-RAN node 200 may use NGAP. The location procedures between NG-RAN node 200 and other NG-RAN nodes, e.g., gNBs 110, may use XnAP or a protocol above XnAP, such as an extended NR Positioning Protocol A (NRPPa) as defined in 3GPP TS 39.455. The location procedures between NG-RAN node 200 and UE 102 may use RRC and/or LPP.

The corresponding messages to support positioning may be carried inside a transparent F1AP message transfer container. For example, the Transfer of an NGAP Location Reporting Control and NAS Transport message may be carried in an UL/DL NGAP Message Transfer. The Transfer of location related XnAP messages may be carried in an UL/DL XnAP Message Transfer. The Transfer of location related RRC(LPP) messages may be carried in an UL/DL RRC (LPP) Message Transfer.

The above support may also be realized with a single F1AP UL/DL LMC Message Transfer container and/or a new location protocol transported using F1AP. Thus, a gNB-CU 202 could forward any location related transfer messages received on NG, Xn and Uu interfaces to the LMC 117 (either within the same gNB 110 (e.g. in case the gNB includes an LMC, as illustrated in FIG. 2) or to another gNB (e.g. in case the gNB has no LMC)).

The location procedures between the LMC 117 and the gNB-DUs 204 and 206, TP 111, and RP 113, which may be coordinated by a gNB-CU 202, may include the transfer of UL/DL PRS configuration and the transfer of UL/DL PRS measurement information. The above functionality may be similar to that of LTE LMUs as specified in 3GPP TS 36.305 and TS 36.459 (SLmAP) and also similar to that between LMF 120 and NG-RAN node 200. Therefore, NRPPa could be extended to support TRP location measurement/configuration messages which can be carried inside F1AP transport messages.

Thus, the NG-RAN node 200 may support signaling and location procedures between a gNB-CU 202 and LMC 117 based on F1AP to support the same location procedures as supported on NG, Xn, and NR-Uu interfaces and, in addition, support transfer of a UL/DL PRS configuration and measurements information to/from a gNB-DU/TRP from/to the LMC.

As can be seen, the NG-RAN location functionality (LMC) may be realized using existing interfaces and protocols. However, given that there are common location procedures on Xn, NG and F1, it would be efficient to define a new generic RAN location protocol which could be transported by Xn-C or F1-C (and probably NG) transfer messages. Given that most functionality would also be required between LMF and NG-RAN Node (i.e., to support new Rel-16 location methods and features by a 5GCN LMF), it may also be possible to extend NRPPa to support the additional RAN location messages.

For the signaling between an AMF 115 and the LMC 117 in the gNB 110, there may be two main options which can reuse existing procedures/protocols, which are described below and referred to as "Option 1" and "Option 2".

Figure 3:
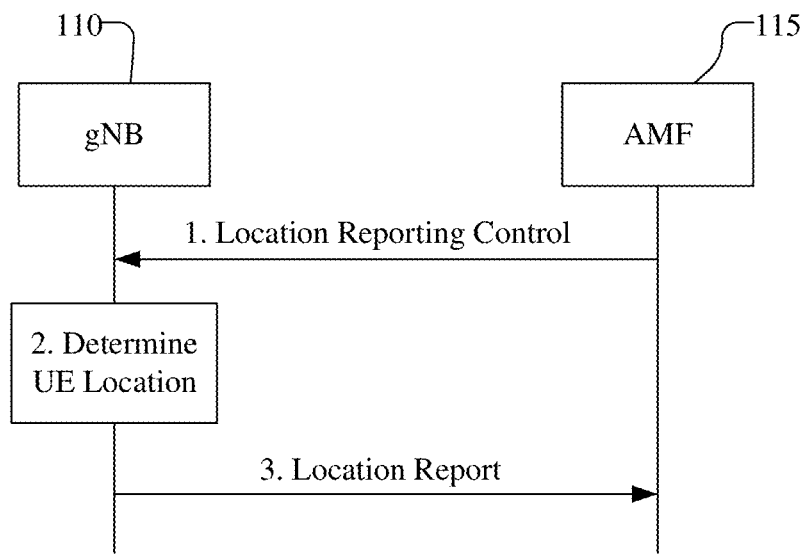
FIG. 3 is an enhanced location reporting procedure illustrating the signaling between an AMF and the NG-RAN node.

FIG. 3 illustrates "Option 1", with an enhanced location reporting procedure. FIG. 3 illustrates the signaling between the AMF 115 and the NG-RAN Node, illustrated as gNB 110 in an enhanced NG-RAN location reporting procedure. A serving AMF 115 may request a serving NG-RAN node 110 to report the UE location once only, periodically on a change of serving cell or periodically when a UE presence in an area of interest has changed. However, the location provided by the serving NG-RAN node based on the existing 3GPP procedure comprises an NR or E-UTRA Cell Global Identity (CGI) and a Tracking Area Identity (TAI) only. This procedure requires some minor additions as described below to enable a serving AMF to request a more accurate location from NG RAN.

At stage 1 in FIG. 3, an AMF 115 may send a Location Reporting Control message to the NG RAN node, e.g., gNB 110, to request a target device location. An optional QoS parameter may be added to the Location Reporting Control message to enable a serving AMF 115 to request a more accurate location than that corresponding to a CGI. Additionally, an optional list of supported GAD shapes in a Location Reporting Control message.

At stage 2, the LMC 117 in the serving NG-RAN node, e.g., the serving gNB 110, then determines the UE location. The serving NG-RAN node may obtain a more accurate UE location when a QoS is provided (using an LMC).

At stage 3, the gNB 110 provides the location estimate back to the AMF 115 in a Location Report message. The UE location may be returned using a GAD shape when requested in a Location Reporting Control message.

The enhanced Location Reporting procedure in FIG. 3 can be supported by an LMC 117 in a gNB 110. A gNB-CU 202 without LMC 117 in the same gNB 110 may forward a location request (with QoS higher than cell ID granularity) to another gNB 110 with LMC 117 (by forwarding a Location Reporting Control message using an XnAP transport message) and receive a later response from the LMC 117 (a Location Report message conveyed by an XnAP transport message).

Figure 4:
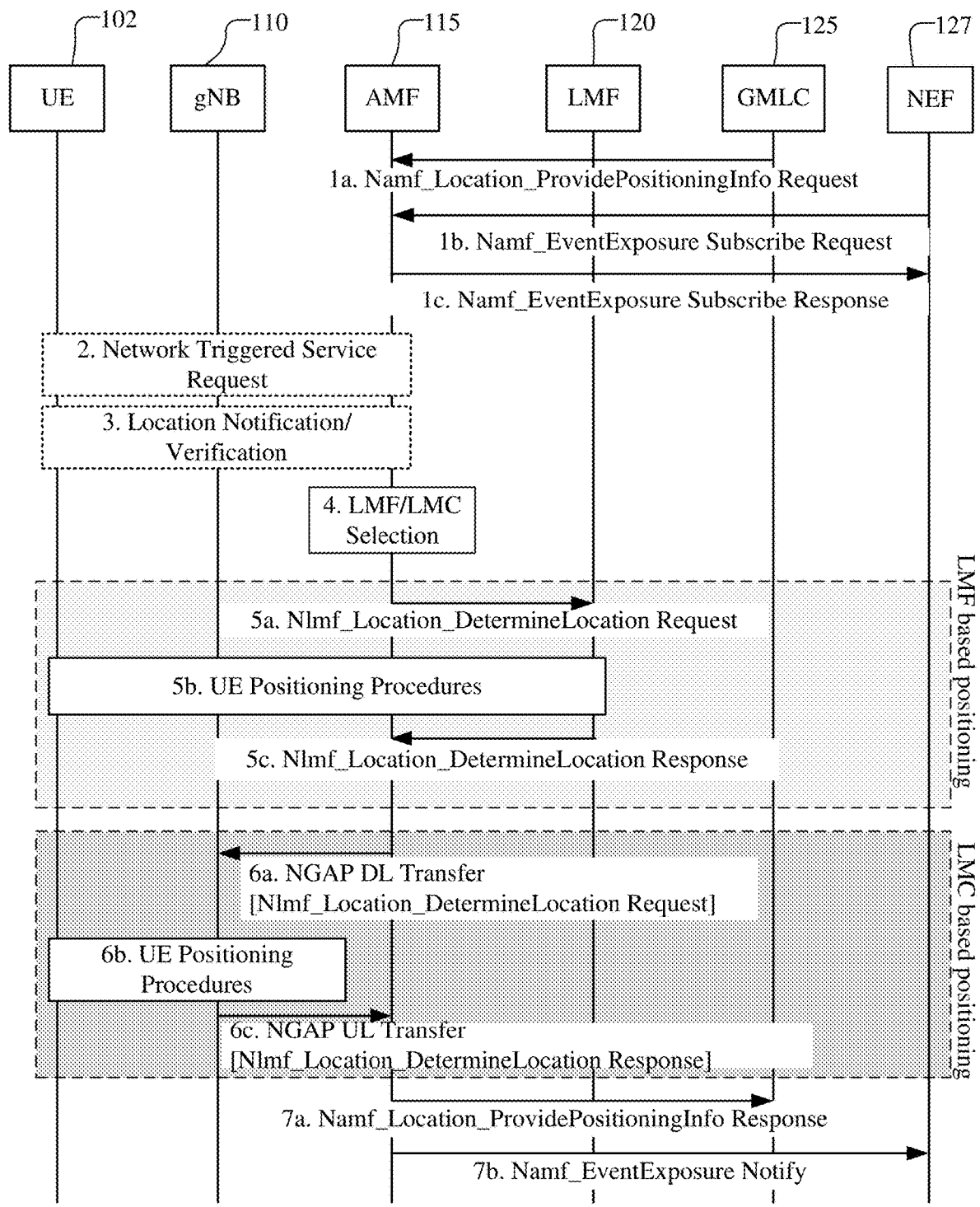
FIG. 4 is another enhanced location reporting procedure.

FIG. 4 illustrates "Option 2", in which a protocol defined in 3GPP TS 29.572 for the NL1 interface in 5GCN 140 (as shown in FIG. 1) is reused. FIG. 4 shows an example of Location Service Support for a Mobile Terminated Location Request (MT-LR) using 5GCN LMF based positioning (stages 5) and using a NG-RAN LMC based positioning (stages 6).

At stage 1a in FIG. 4, the GMLC 125 may send an Namf_Location_ProvidePositioningInfo request (as defined in 3GPP TS 29.572) to the AMF 115. Stages 1b and 1c are then skipped.

At stage 1b, and if stage 1a is not performed, the NEF 127 may send an Namf_EventExposure Subscribe request (e.g. as defined in 3GPP TS 29.518) to the AMF 115.

At stage 1c, the AMF 115 may send an Namf_EventExposure Subscribe response to the NEF 127.

At stage 2, the UE 102, gNB 110, and AMF 115 initiate a network triggered service request, if needed, to place UE 102 into a connected state.

At stage 3, the UE 102, gNB 110, and AMF 115 initiate a location notification verification, if needed, to notify UE 102 of the location request and optionally allow UE 102 to allow or reject the location request.

At stage 4, the AMF 115 makes a selection for LMF or LMC for positioning. Stages 5 are the procedures which would be performed if the AMF 115 selects LMF based positioning; and stages 6 would be performed if the AMF 115 selects a RAN LMC based positioning. From an AMF point of view, the messages used for stages 5a and 5c in case of LMF selection could be the same as the messages used for stages 6a and 6c in case of LMC selection; only the transport (container) would then be different. Thus, an LMC would see the same "input/output" data as an LMF.

At stage 5a for LMF based positioning, the AMF 115 sends a location request, e.g., Nlmf_Location_DetermineLocation request, to the LMF 120. The NL1 interface between AMF 115 and LMF 120 shown in FIG. 1 supports location requests for a target UE 102 sent from a serving AMF 115 for the target UE 102 to an LMF 120 as specified in 3GPP TS 29.572. The Request operation can include one or more of externalClientType, correlationID, amfId, locationQoS, supportedGADShapes, supi, pei, gpsi, ecgi, ncgi, priority, and velocityRequested, where at least one of these parameters is present.

At stage 5b, the UE 102, gNB 110, AMF 115, and/or LMF 120 initiate UE positioning procedures.

At stage 5c, the LMF 120 sends an Nlmf_Location_DetermineLocation response to the AMF 115. The Response operation includes the locationEstimate and may further include one or more of accuracyFulfilmentIndicator, ageOfLocationEstimate, velocityEstimate, civicAddress, positioningDataList, gnssPositioningDataList, ecgi, ncgi, altitude, barometricPressure.

At stage 6a for LMC based positioning, the AMF 115 sends a location request, e.g., Nlmf_Location_DetermineLocation request, to the serving gNB 110. An Nlmf_Location_DetermineLocation Request message may be transported between the serving gNB 110 and serving AMF 115 for a target UE 102 in an NGAP transport container, which could be defined as a new NGAP DL transport message. A gNB-CU 202 without a collocated LMC 117 may then forward an Nlmf_Location_DetermineLocation request to another gNB 110 with LMC 117 (by forwarding a Nlmf_Location_DetermineLocation request message using an XnAP transport message) and receive a later response from the other gNB.

At stage 6b, the UE 102, and gNB 110 initiate UE positioning procedures. The UE 102 and/or gNB 110 may make UL/DL signal measurements for location (e.g., UL-TDOA, DL-TDOA, Multi-RTT, etc.).

At stage 6c, the serving gNB 110 sends a location response, e.g., Nlmf_Location_DetermineLocation response, to the AMF 115. The Nlmf_Location_DetermineLocation Response message may be transported between the serving gNB 110 and serving AMF 115 for a target UE 102 in an NGAP transport container, which could be defined as a new NGAP UL transport message.

At stage 7a, and if stage 1a was performed, the AMF 115 sends an Namf_Location_ProvidePositioningInfo response to the GMLC 125.

At stage 7b, and if stages 1b and 1c were performed, the AMF 115 sends an Namf_EventExposure Notify message to the NEF 127.

Option 2 illustrated in FIG. 4 may have several advantages compared to Option 1 illustrated in FIG. 3. For example, the AMF 115 may use the same message/operation towards an LMF 120 and LMC 117. An LMC 117 may be based on an LMF 120 to reduce implementation for vendors who support both LMC 117 and LMF 120. Moreover, immediate and deferred location requests may be supported in alignment with 5GCN location procedures (e.g. MT-LR, Mobile Originated Location Request (MO-LR), Network Induced Location Request (NI-LR)) as defined in 3GPP TS 23.273 and discussed below. Accordingly, the Option 2, illustrated in FIG. 4 may be preferred and is assumed for the procedures described below.

The LPP protocol is used for the positioning procedures between an LMF 120 and target UE 102, as specified in 3GPP TS 38.305 and 3GPP TS 37.355. For an LMF 120, LPP messages are carried as transparent PDUs across intermediate network interfaces using the appropriate protocols (e.g., NAS/NGAP over the NG CP (NG-C) interface, NAS/RRC over the Uu interface).

LPP can be reused for the positioning signaling between an LMC 117 and target UE 102 and transported in an RRC message container. The DL and UL Information Transfer messages may be extended to support a non-NAS message container, or a new UL/DL RRC Transfer container message can be defined. The reuse of LPP has the lowest overall impact, which also makes UE positioning procedures agnostic to regarding where the LMF 120 is located (i.e., 5GCN LMF or NG-RAN LMC) (similar to the reuse of NL1 messages, discussed above).

Figure 5:
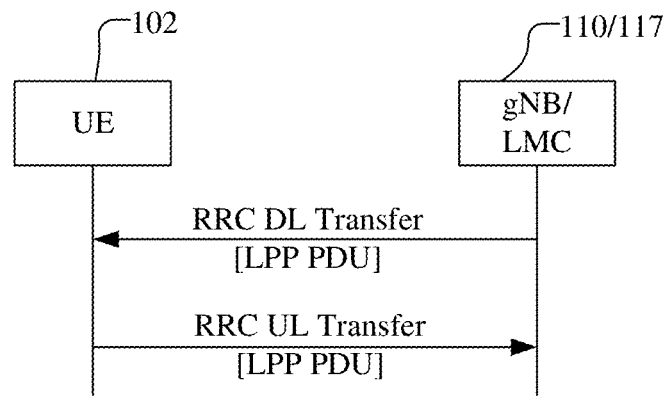
FIG. 5 illustrates LPP signaling between an LMC in a gNB and a UE.

FIG. 5 illustrates LPP signaling between the LMC 117 in the gNB 110 and the UE 102. Stage 6b in FIG. 4 may be extended as shown.

At stage 1 in FIG. 5, the LMC 117 in gNB 110 sends an RRC DL Transfer message, e.g., in an LPP PDU, to the target UE 102.

At stage 2, the target UE 102 sends an RRC UL Transfer message, e.g., in an LPP PDU, to the LMC 117.

The RRC signaling to request measurement gaps (e.g., Location Measurement Indication) may be reused but may typically not be needed when an LMC 117 is part of a serving gNB-CU 202. Since the gNB-CU 202 can now be aware of a positioning session, there may be no need for a UE 102 to request measurement gaps (i.e., gaps can be configured by the serving gNB-CU 202 before any LPP location request). To indicate this to the UE 102, a flag (or similar small parameter) might be added to an LPP location request.

Broadcast of assistance data can be supported by an LMC 117 in the same way as for an LMF 120 (e.g. as defined in 3GPP TS 38.305, 3GPP TS 38.455, 3GPP TS 38.331 and 3GPP TS 23.273). The LMC 117 would then perform any segmentation and ciphering and provides pre-coded positioning System Information Blocks (posSIBs) for broadcast in System Information (SI) messages. When assistance data is broadcast in ciphered form, the ciphering keys could be provided by an LMC 117 to an AMF 115 for distribution to suitably subscribed UE 102s. The Nlmf_Broadcast_CipheringKeyData service operation specified in 3GPP TS 29.572 may be reused (or adapted) for this purpose transported inside NGAP UL/DL transport messages (similar to stages 6a/c in FIG. 4). To avoid multiple LMCs providing the same ciphering keys (e.g. for the same Tracking Area (TA)) to AMFs, only some LMCs can be configured to provide ciphering keys to AMFs (e.g. just one LMC in each TA). Ciphering keys can be configured in LMCs (e.g. via O&M) to ensure that gNBs in the same TA are using the same ciphering keys.

For Location Services operation, the Supplementary Services (SS) Protocol (defined in 3GPP TS 24.080) may also be used for 5GCN Location Services, as specified in 3GPP TS 23.273.

Figure 6:
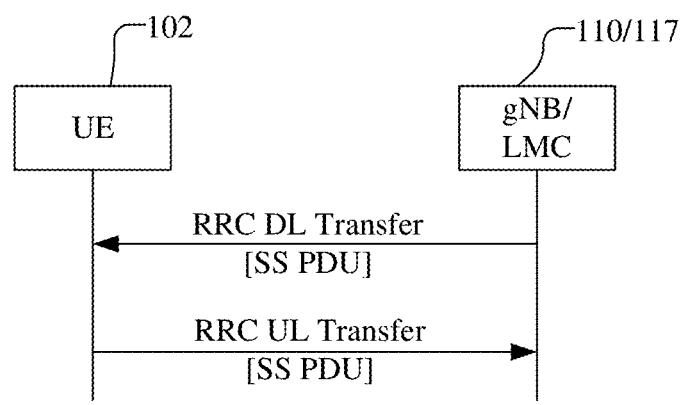
FIG. 6 illustrates Supplementary Services (SS) signaling between an LMC in a gNB and a UE.

FIG. 6 illustrates Supplementary Services (SS) signaling between an LMC 117 in a gNB 110 and a UE 102.

At stage 1 in FIG. 6, the LMC 117 in gNB 110 sends an RRC DL Transfer message, e.g., in an SS PDU, to the target UE 102.

At stage 2, the target UE 102 sends an RRC UL Transfer message, e.g., in an SS PDU, to the LMC 117.

The MT-LR and MO-LR Services messages are exchanged between an AMF 115 and a UE 102 and can also be used in the same way as currently defined for 5GCN LMF location services 3GPP TS 23.23. The Supplementary Services messages for support of periodic and triggered location services are exchanged between a 5GCN LMF 120 and UE 102. For an NG-RAN LMC 117 these messages can be transported in the same RRC container message as for the LPP messages.

Figure 7:
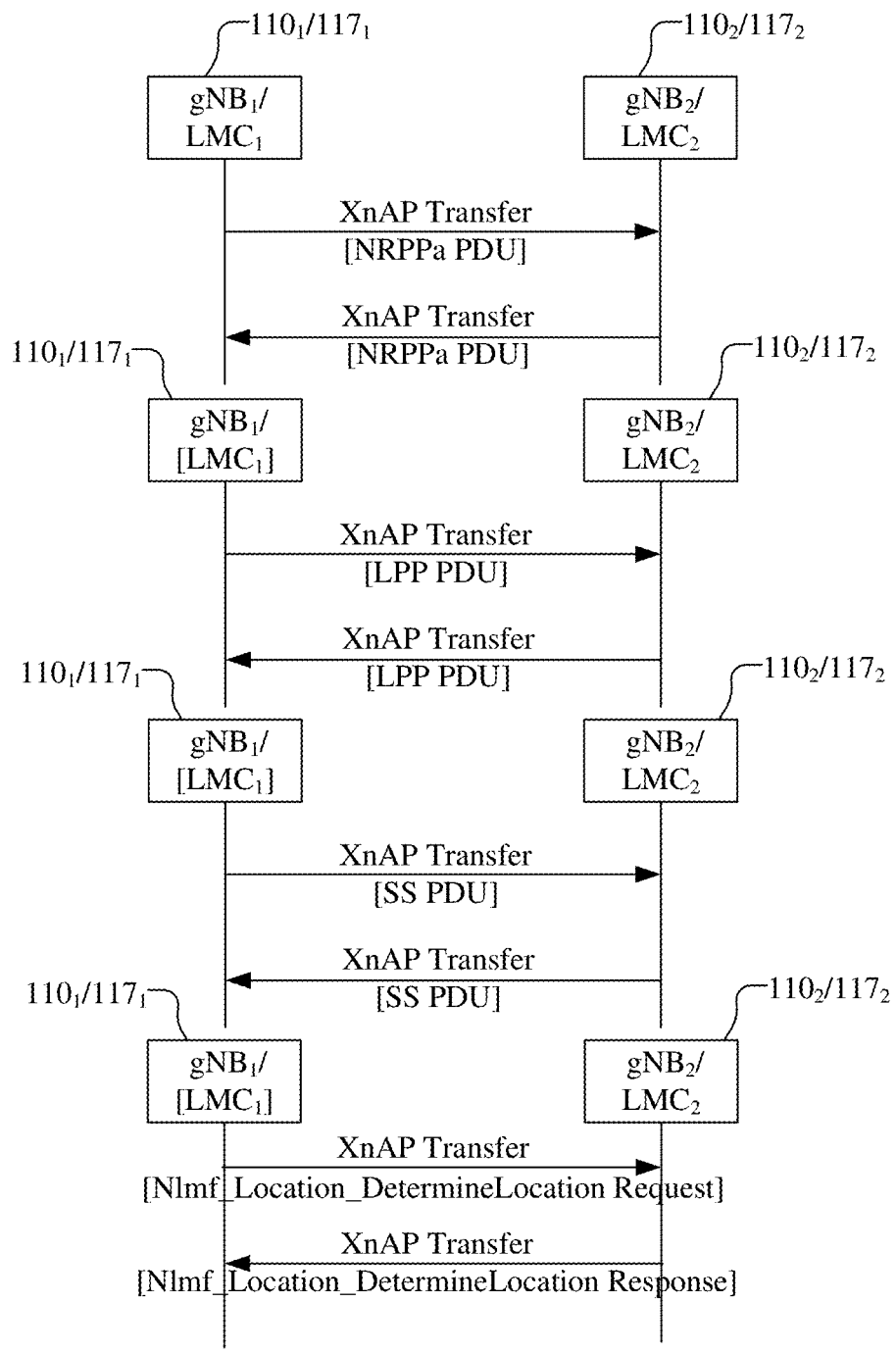
FIG. 7 illustrates various signaling between a gNB/LMC and a separate gNB/LMC.

FIG. 7 illustrates various signaling between a first gNB$_1$/LMC$_1$ 110$_1$/117$_1$ and a second gNB$_2$/LMC$_2$ 110$_2$/117$_2$. Location procedures between pairs of gNBs/LMCs are required to support one or more of the following functions: (a) request UL measurements for a target UE by one gNB (e.g. a serving gNB with an LMC) from another gNB (TRP); (b) provide assistance data for a target UE by one gNB (e.g. a serving gNB with an LMC) to another gNB to assist UL measurements of the target UE by the other gNB/TRP; (c) request a change in DL PRS broadcast scheduling and configuration by one gNB to a neighbor gNB; (d) request a change in scheduling and resources for broadcast of location information by one gNB to a neighbor gNB; (e) transfer of an LPP container via a serving gNB without LMC to a neighbor gNB with LMC; (f) transfer of an SS container via a serving gNB without LMC to a neighbor gNB with LMC; and (g) transfer of an NGAP container via a serving gNB without LMC to a neighbor gNB with LMC.

Items (a)-(d) are the same functionality as required between a 5GCN LMF and an NG-RAN Node which is expected to be supported in Rel-16 using NRPPa to support the new NR positioning methods. Therefore, NRPPa could be reused for the location procedures between gNBs. A XnAP Transfer container message could be defined in 3GPP TS 38.423, similar to the RRC Transfer procedure as illustrated in FIG. 7. This XnAP Transfer container message can also be used to transfer LPP and SS messages from a gNB without LMC to a gNB with LMC, and to forward a Nlmf_Location_DetermineLocation Request/Response to a neighbor gNB (in case the serving gNB has no LMC), as described in FIG. 4.

Figure 8:
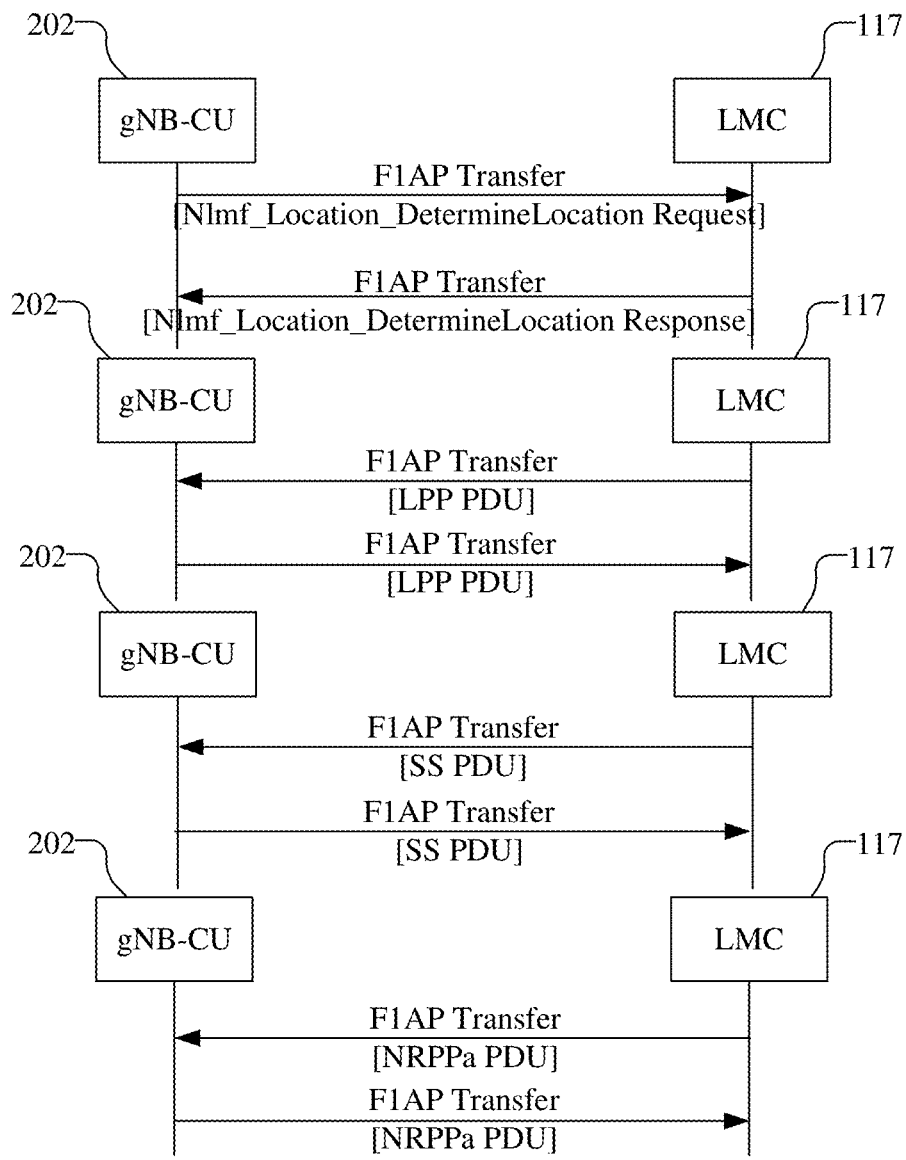
FIG. 8 illustrates various signaling between a gNB-CU (Central Unit) and an LMC.

FIG. 8 illustrates various signaling between a gNB-CU 202 and an LMC 117. The location procedures between a gNB-CU 202 and LMC 117 comprise all location related procedures on NG, Xn, and NR-Uu interfaces, including: location procedures between AMF 115 and gNB/LMC 110/117 (using Nlmf_Location_DetermineLocation), as described in FIG. 4; location procedures between gNB/LMC 110/117 and UE 102 (using LPP and SS), as described in FIG. 5; location procedures between gNBs/LMCs 110/117 (using NRPPa), as described in FIG. 7.

The corresponding messages to support positioning can be carried inside F1AP message transfer containers. Essentially, a gNB-CU 202 would forward any location related messages received on NG, Xn and Uu interfaces to the LMC 117, as illustrated in FIG. 8 (if the gNB 110 has a LMC 117; otherwise to another gNB 110 using XnAP as described in FIG. 7).

Figure 9:
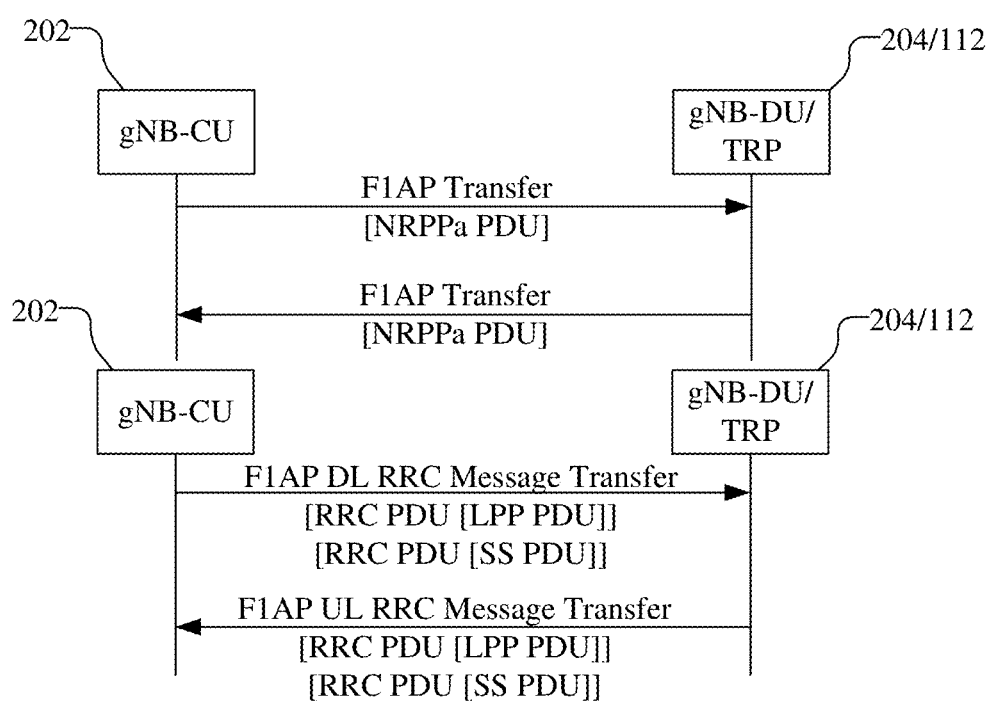
FIG. 9 illustrates various signaling between a gNB-CU and a gNB-DU/TRP (Distributed Unit/Transmission Reception Point).

FIG. 9 illustrates various signaling between a gNB-CU 202 and a gNB-DU/TRP 204/112. A gNB-DU/TRP 204/112 may perform general functions, such as: transmission of DL PRS according to a selected configuration (which may be configured by a gNB-CU/LMC 202/117 on-demand, e.g., based on required QoS); performing UL PRS signal measurements such as RTOA, Rx-Tx, or AOA, where the UL PRS configuration need to be provided by the gNB-CU/LMC 202/117 to the RP 113 on-demand; and reporting UL signal measurements (for a particular UE 102) to the gNB-CU/LMC 202/117.

The above functions need to be supported by signaling between a 5GCN LMF 120 and gNB-DU/TRP 204/112, and therefore would be defined in NRPPa. Main options for the signaling between a gNB-CU 202 and gNB-DU/TRP 204/112 are referred to here as "option (a)" and "option (b)". Option (a) uses separate procedures, messages and parameters in F1AP which align with NRPPa (but may not exactly copy NRPPa). Option (b) uses F1AP container messages, which carry NRPPa PDUs. The gNB-CU 202 may then forward the received NRPPa PDU to the particular gNB-DU/TRP 204/112.

For option (b), a common F1AP Transfer Message may be used for both gNB-CU 202 to gNB-DU/TRP 204/112 signaling and gNB-CU 202 to LMC 117 signaling (as discussed in FIG. 8). This would be similar to the RRC Message Transfer messages in F1AP which carry an RRC Container and is summarized for both cases in FIG. 9.

The positioning transfer messages may not be transparent to the gNB-CU 202. For example, the gNB-CU 202 would need to interpret some header part of the transfer message to determine any follow up action but does not need to interpret the included positioning PDU. For example, the gNB-CU 202 would need to decide whether a NRPPa PDU is intended for the gNB-DU/TRP 204/112 in the same gNB 110 or needs to be provided to the gNB-DU/TRP 204/112 of a neighbor gNB (which would require transfer of the NRPPa PDU using a XnAP Transfer message.

With option (a), NRPPa messages would need to be converted to or from corresponding F1AP messages by a gNB-CU 202. This could result in substantial overhead and extra processing by gNB-CUs 202.

Figure 10:
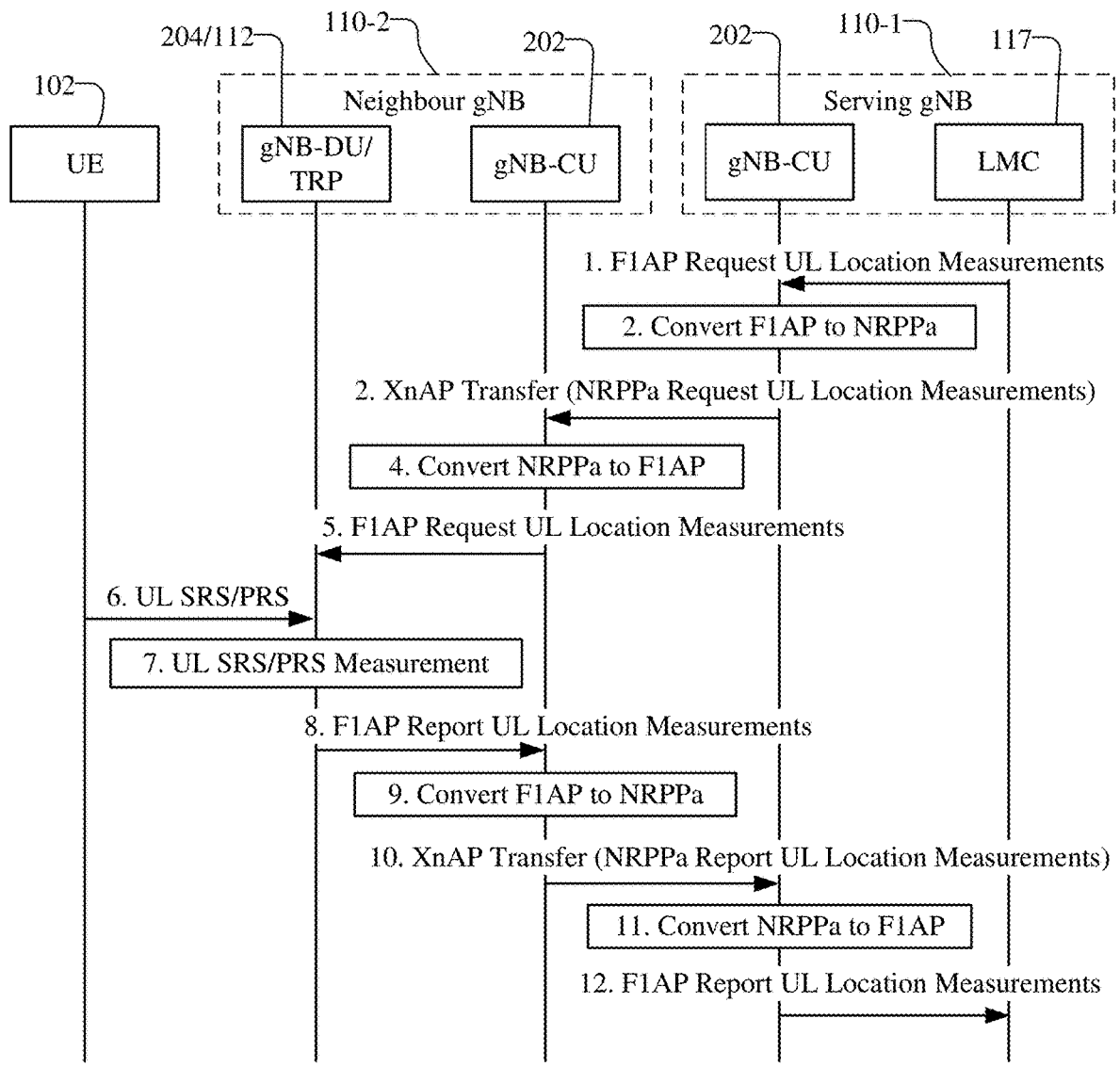
FIG. 10 illustrates an example of signaling when an LMC in a serving gNB for a target UE requests uplink (UL) location measurements from a gNB-DU/TRP in a neighbor gNB.

FIG. 10 illustrates an example of signaling for option (a), where an LMC 117 in a serving gNB 110-1 for a target UE 102 requests UL location measurements for a target UE 102 from a gNB-DU/TRP 204/112 in a neighbor gNB 110-2. With option (b), NRPPa messages would be transferred between the LMC 117 in the serving gNB 110-1 and gNB-DU/TRP 204/112 in the neighbor gNB 110-2 without any conversion by the gNB-CUs 202.

As shown in FIGS. 3-10, existing location protocols may be reused for local NG-RAN positioning, including: Nlmf_Location_DetermineLocation and Nlmf_Broadcast_CipheringKeyData service operations defined in 3GPP TS 29.572; LPP defined in 3GPP TS 37.355; Supplementary Services defined in 3GPP TS 24.080; and NRPPa defined in 3GPP TS 38.455.

The positioning messages for these location protocols may be transported in transport container messages for NGAP, RRC, XnAP, and F1AP. Therefore no new interface(s) may be required; and impact on existing protocols can be limited to the specification of a new UL/DL transfer message container in NGAP, RRC, XnAP, and F1AP protocols.

UE-positioning-related services can be instigated from the 5GCN in the case of an NI-LR or MT-LR location service, or from the UE 102 in the case of an MO-LR location service, as specified in 3GPP TS 23.273. The same UE-positioning services can also be supported using an LMC 117 in the NG-RAN, as described below.

Figure 11:
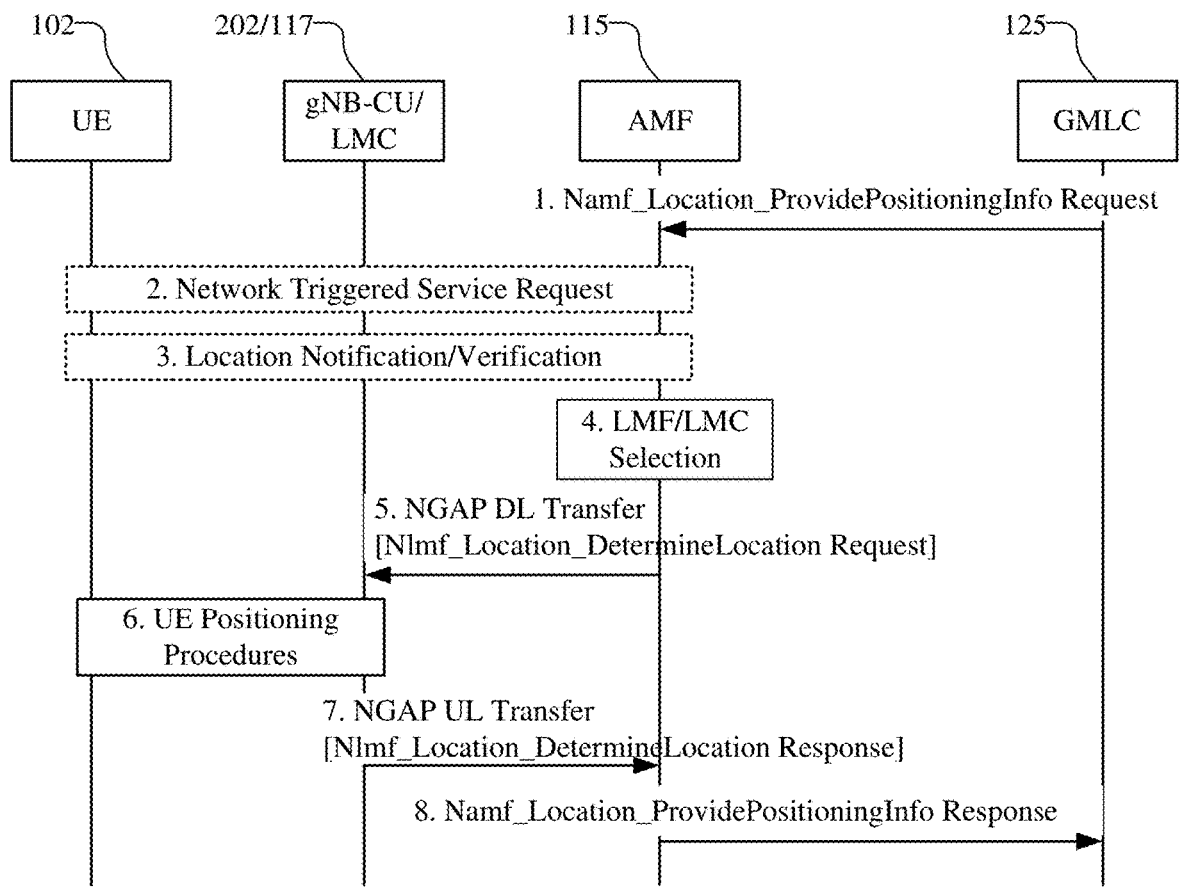
FIG. 11 illustrates an MT-LR procedure using an LMC in the NG-RAN to determine the UE location.

FIG. 11 illustrates an MT-LR procedure using an LMC 117 in the NG-RAN to determine the UE 102 location. The 5GCN MT-LR and NI-LR procedures are specified in 3GPP TS 23.273. The signaling and procedures in the 5GCN where an LMC 117 is used can be the same as currently specified for an LMF 120. For the MT-LR procedures, the serving AMF 115 in the Home or Visiting PLMN will receive at some point a Namf_Location_ProvidePositioningInfo Request operation to request the current location of the UE 102, as shown in FIG. 4 above, and further explained in FIG. 11 below. FIG. 11 shows an MT-LR via a GMLC 125. A message flow similar to FIG. 11 would be used for an MT-LR via an NEF. In particular stages 4-7 in FIG. 11 could remain the same. For an NI-LR, the serving AMF 115 determines a requirement to locate the UE 102, e.g., due to detecting the start of an emergency services call from the UE 102. All stages in FIG. 11 are performed for an MT-LR whereas only stages 4-7 are performed for an NI-LR.

At stage 1 in FIG. 11, for or an MT-LR, the serving AMF 115 of the target UE 102 receives a Namf_Location_ProvidePositioningInfo Request operation from a GMLC 125 (e.g., an H-GMLC or a V-GMLC). This service operation includes the SUPI, client type, and other information such as required QoS, supported GAD shapes, etc. The GMLC 125 verifies UE privacy before instigating stage 1.

At stage 2, for an MT-LR, if the UE 102 is in CM IDLE state, the AMF 115 initiates a network triggered Service Request procedure as defined in clause 4.2.3.4 of 3GPP TS 23.502 to establish a signaling connection with the UE 102.

At stage 3, for an MT-LR, if the UE 102 must either be notified or notified with privacy verification according to stage 1 and if the UE 102 supports LCS notification (according to the UE capability information), a notification invoke message is sent to the target UE 102, as specified in 3GPP TS 23.273. The target UE 102 notifies the UE user of the location request and, if privacy verification was requested, waits for the user to grant or withhold permission. The UE 102 then returns a notification result to the AMF 115 indicating, if privacy verification was requested, whether permission is granted or denied for the current LCS request.

At stage 4, for an MT-LR or NI-LR, the AMF 115 selects an LMF 120 or LMC 117. This can be based on the information as currently defined in clause 5.1 of 3GPP TS 23.273 or based on AMF local configuration. The LMF/LMC selection takes the NG-RAN currently serving the UE into account. If an LMC 117 is selected, stages 5-7 are performed. If an LMF 120 is selected, similar steps are performed with an LMF 120 as defined in clause 6.1 and clause 6.10 in 3GPP TS 23.273.

At stage 5, the AMF 115 sends the Nlmf_Location_DetermineLocation Request service operation inside a NGAP DL Transfer message as described in FIG. 4 above to the serving gNB-CU 202. The service operation may include a LCS Correlation identifier, an indication if the UE supports LPP, the required QoS and Supported GAD shapes as specified in 3GPP TS 29.572. Any UE/subscriber identity supported in Nlmf_Location_DetermineLocation (e.g., SUPI or PEI) does not need to be provided to the LMC 117 in case of "security concerns". The UE 102 can be identified via e.g. NGAP-ID. The serving gNB-CU 202 may forward the Nlmf_Location_DetermineLocation Request to a separate LMC 117 in the same gNB 110 in a F1AP transfer message, as described in FIG. 8 above. The serving gNB-CU 202 could instead forward the Nlmf_Location_DetermineLocation Request to an LMC in another gNB 110-2, in which case the Nlmf_Location_DetermineLocation Request would be initially forwarded in an XnAP transfer message to the gNB-CU in the other gNB 110-2 with the gNB-CU then forwarding the message to the LMC in an F1AP transfer message if the LMC is separate from the gNB-CU.

At stage 6, the LMC 117 performs the positioning procedures. This may include DL-PRS measurements performed at the UE 102, and UL-PRS measurements performed at gNB-DUs/TRPs 204/112, as described in FIG. 12 below.

At stage 7, the gNB-CU 202 returns the Nlmf_Location_DetermineLocation Response message inside a NGAP UL Transfer message to the AMF 115 to return the current location of the UE 102, as described in FIG. 4 above. The message includes the LCS Correlation identifier, the location estimate, its age and accuracy and may include information about the positioning method, as specified in 3GPP TS 29.572. If the LMC 117 is not part of the serving gNB-CU 202, the LMC would first return the Nlmf_Location_DetermineLocation Response to the serving gNB-CU 202 in an F1AP transfer message if the LMC is part of the serving gNB 110-1, in an XnAP transfer message if the LMC is part of another gNB-CU 202 or in an F1AP transfer message followed by an XnAP transfer message if the LMC is in another gNB 110-2 and not part of the CU in that gNB. These operations as well as the positioning at stage 3 require the serving gNB-CU 202 to maintain the identity of the LMC 117 and the LMC 117 to maintain the identity of the serving gNB-CU 202.

At stage 8, for an MT-LR, the AMF 115 returns the Namf_Location_ProvidePositioningInfo Response to the GMLC 125 to return the current location of the UE 102, as specified in 3GPP TS 23.273. The GMLC 125 may perform additional privacy verification before returning the current location to an external client 130 or AF 131.

Figure 12:
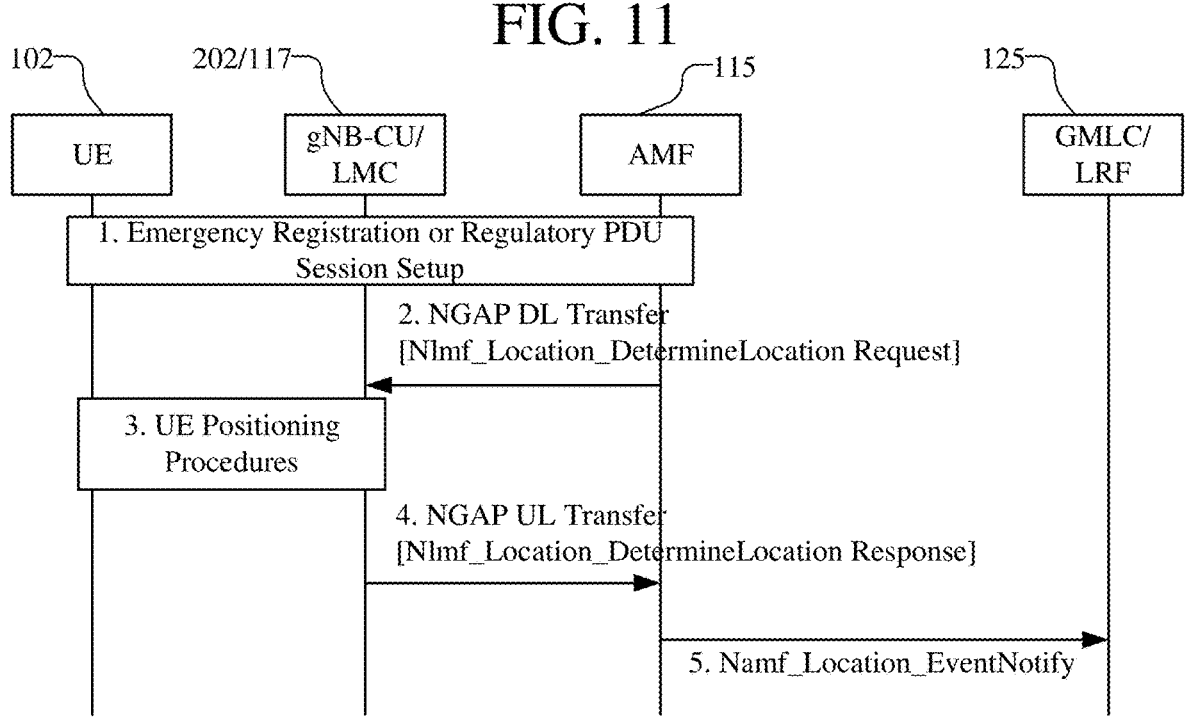
FIG. 12 illustrates an NI-LR Procedure using the LMC in the NG-RAN to determine the UE location.

FIG. 12 illustrates an NI-LR Procedure using the LMC 117 in the NG-RAN to determine the UE location.

At stage 1 in FIG. 12, the serving AMF 115, UE 102 and gNB-CU 202 perform an emergency registration or regulatory PDU session setup.

Stages 2-4 in FIG. 12 are almost identical to stages 5-7 in FIG. 11 with differences only in some parameters of the Nlmf_Location_DetermineLocation Request service operation.

At stage 5, the AMF 115 provides the Namf_Location_EventNotify message to the GMLC/LRF 125.

Figure 13:
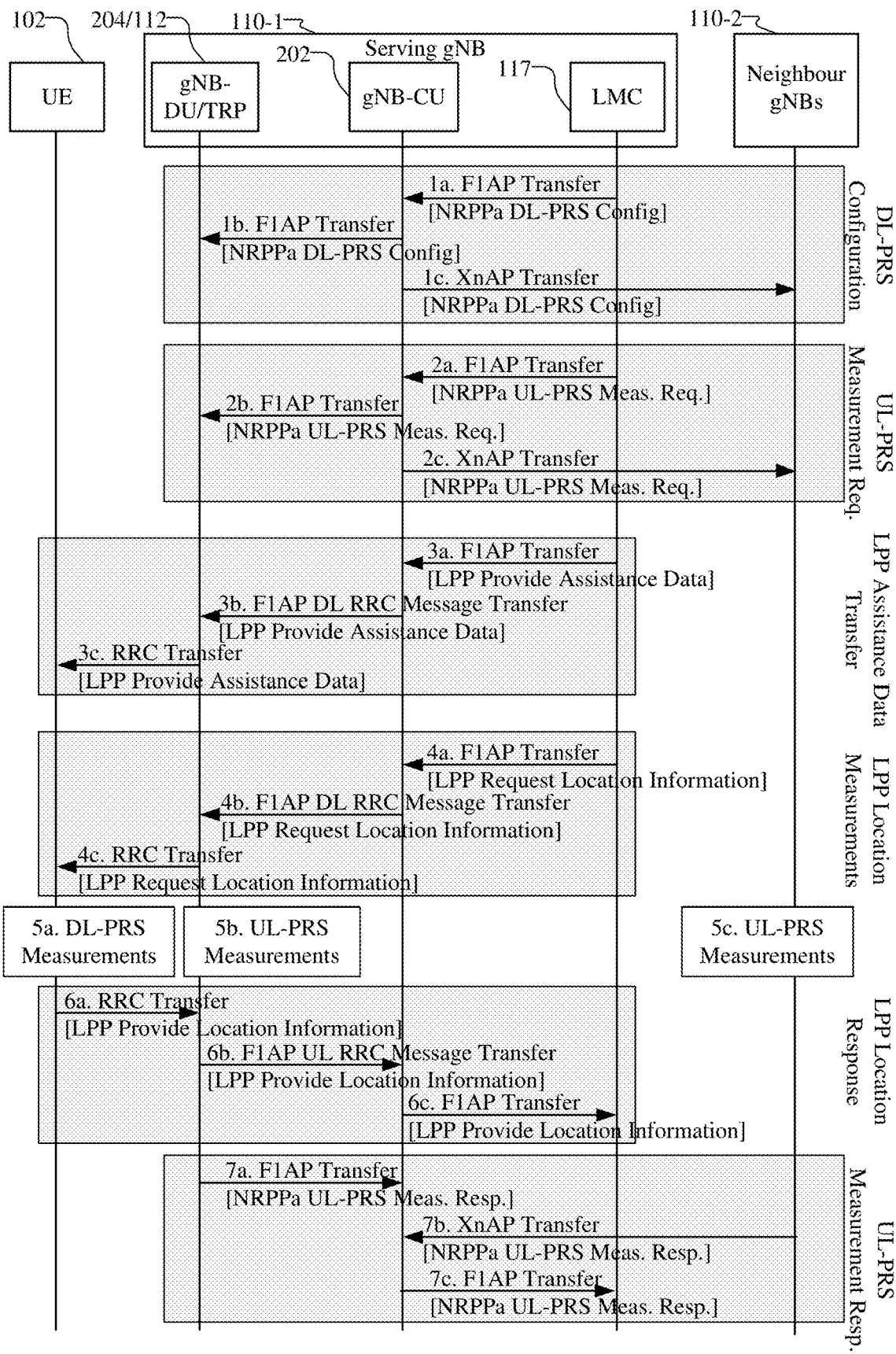
FIG. 13 illustrates UE positioning procedures.

FIG. 13 illustrates UE positioning procedures. The UE Positioning Procedure at stage 6 in FIG. 11 and stage 3 in FIG. 12 may include LPP and NRPPa signaling and is summarized in FIG. 13. FIG. 13 assumes the LMC 117 is part of the serving gNB 110-1 and separate from the serving gNB-CU 202. If the LMC 117 is part of the serving gNB-CU 202, stages 1a, 2a, 3a, 4a, 6c and 7c would not occur. If the LMC 117 is part of a neighbor gNB 110-2, each of stages 1a, 2a, 3a, 4a, 6c and 7c would be replaced by a stage in which the LPP or NRPPa location message in each stage is transferred between the serving gNB-CU and the gNB-CU in the neighbor gNB 110-2 in an XnAP transfer message and, if the LMC 117 is not part of the neighbor gNB-CU, an additional step in which the location message is further transferred between the neighbor gNB-CU and LMC 117 in an F1AP transfer message.

At stages 1 in FIG. 13, illustrated as stages 1a, 1b, and 1c, for DL-PRS measurements, the LMC 117 may determine the gNB-DUs/TRPs 204/112 nearby the approximate location (e.g., serving gNB-DU) of the target device 102. If there are no or not sufficient DL-PRS resources configured on these gNB-DUs/TRPs, the LMC 117 may initiate a NRPPa procedure to configure (or reconfigure) the DL PRS on the gNB-DUs/TRPs.

At stage 1a, the LMC 117 sends the NRPPa DL-PRS Configuration message inside a F1AP Transfer message to the gNB-CU 202, as described in FIG. 8.

At stages 1b and 1c, the gNB-CU 202 may forward the NRPPa DL-PRS Configuration message to gNB DUs/TRPs 204/112 using F1AP as described in section FIG. 9 above or to neighbor gNBs 110-2 using XnAP as described in FIG. 7 above.

At stages 2, illustrated as stages 2a, 2b, and 2c, for UL-PRS measurements, the LMC 117 provides the UL PRS configuration to the selected gNB-DUs/TRPs 204/112 in a NRPPa UL PRS Measurement Request message. The message includes all information required to enable the gNB-DUs/TRPs 204/112 to perform the UL measurements.

At stage 2a, the LMC 117 sends the NRPPa UL-PRS Measurement Request message inside a F1AP Transfer message to the gNB-CU 202, as described in FIG. 8.

At stages 2b and 2c, the gNB-CU 202 may forward the NRPPa UL-PRS Measurement Request message to gNB DUs/TRPs 204/112 using F1AP as described in FIG. 9 above or to neighbor gNBs 110-2 using XnAP, as described in FIG. 7 above.

At stages 3, illustrated as stages 3a, 3b, and 3c, the LMC 117 may send a LPP Provide Assistance Data message to the target device 102.

At stage 3a, the LMC 117 sends the LPP Provide Assistance Data message in a F1AP Transfer message to the gNB-CU 202, as described in FIG. 4.

At stages 3b and 3c, the gNB-CU 202 forwards the LPP Provide Assistance Data message to the gNB-DU 204 as described in FIG. 9 above, which forwards the message to the UE 102 inside a RRC Transfer message, as described in FIGS. 5 and 6 above.

At stages 4, illustrated as stages 4a, 4b, and 4c, the LMC 117 may send a LPP Request Location Information message to the target device 102.

At stage 4a, the LMC 117 sends the LPP Request Location Information message in a F1AP Transfer message to the gNB-CU 202, as described in FIG. 8.

At stages 4b and 4c, the gNB-CU 202 forwards the LPP Request Location Information message to the gNB-DU 204 as described in FIG. 9 above, which forwards the message to the UE 102 inside a RRC Transfer message, as described in FIGS. 5 and 6 above.

At stages 5, illustrated as stages 5a, 5b, and 5c, the UE 102 and the configured gNB-DUs/TRPs 204/112, e.g., in the serving gNB 110-1 or neighbor gNB 110-2, perform the DL and UL PRS measurements.

At stages 6, illustrated as stages 6a, 6b, and 6c, the UE 102 sends a LPP Provide Location Information message to the LMC 117.

At stage 6a, the UE 102 sends the LPP Provide Location Information message in a RRC Transfer message to the gNB-DU 204, as described in FIGS. 5 and 6.

At stage 6b, the gNB-DU 204 forwards the LPP Provide Location Information message to the gNB-CU 202 inside a F1AP Transfer message as described in FIG. 9.

At stage 6c, the gNB-CU 202 forwards the LPP Provide Location Information message to the LMC 117 inside a F1AP Transfer message, as described in FIG. 8.

At stages 7, illustrated as stages 7a, 7b, and 7c, each gNB-DU/TRP 204/112 reports the UL PRS measurements to the LMC 117 in a NRPPa UL PRS Measurement Response message.

At stages 7a and 7b, the NRPPa UL-PRS Measurement Response message is sent to the serving gNB-CU 202 inside a F1AP Transfer message from a gNB-DU/TRP 204/112 in the serving gNB 110-1 or inside an XnAP Transfer message from a neighbor gNB 110-2.

At stage 7c, the serving gNB-CU 202 forwards the NRPPa UL-PRS Measurement Response message to the LMC 117 inside an F1AP Transfer message.

Figure 14:
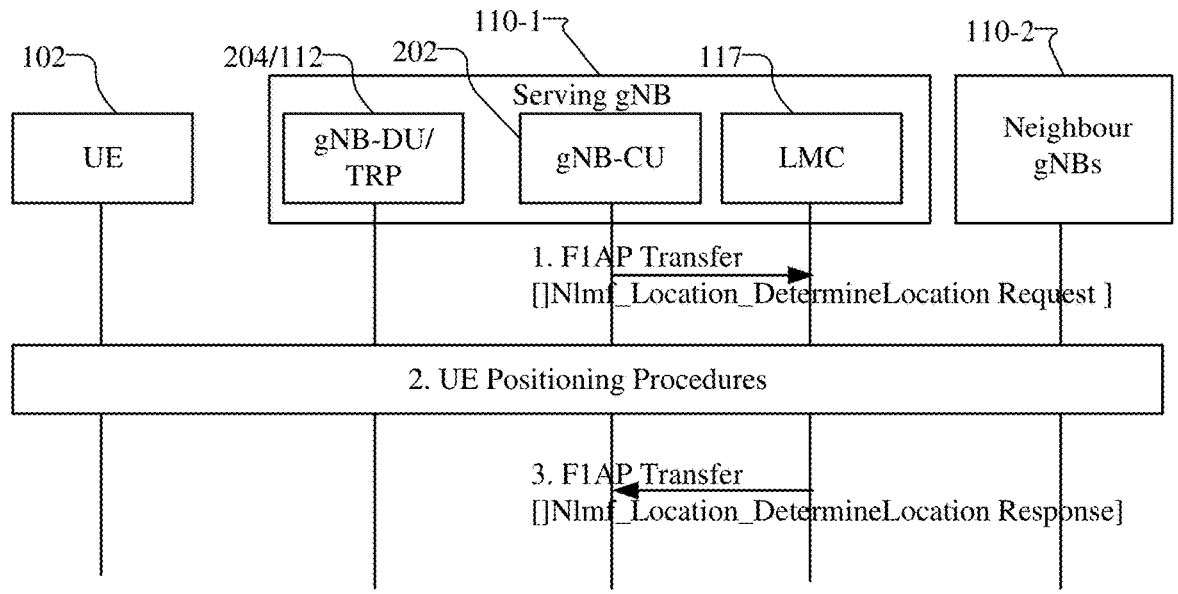
FIG. 14 illustrates a RAN initiated Location Request (RI-LR) procedure to determine the UE location.

FIG. 14 illustrates a RAN initiated Location Request (RI-LR) procedure to determine the UE location, which may be used when the NG-RAN (e.g. serving gNB 110-1) requires the location of a target UE 102; e.g., for RRM purposes. With this procedure, separate/new procedures for "NG RAN acting as LCS client" may not be needed. The procedure assumes that notification and/or verification of location by the UE 102 is not needed, e.g. which may be indicated in UDM privacy subscription for the UE 102 and signalled to the serving gNB 110-1 by the serving AMF 115 as part of signaling connection establishment. The procedure is not applicable if UE privacy subscription would otherwise require notification and/or verification.

FIG. 14 assumes the LMC 117 is part of the serving gNB 110-1 and separate from the serving gNB-CU 202. If the LMC 117 is part of the serving gNB-CU 202, stages 1 and 3 would not occur. If the LMC 117 is part of a neighbor gNB 110-2, each of stages 1 and 3 would be replaced by a stage in which the location message in each stage is transferred between the serving gNB-CU 202 and the gNB-CU in the neighbor gNB 110-2 in an XnAP transfer message and, if the LMC 117 is not part of the neighbor gNB-CU, an additional stage in which the location message is further transferred between the neighbor gNB-CU and LMC in an F1AP transfer message.

At stage 1 in FIG. 14, the serving gNB-CU 202 sends an Nlmf_Location_DetermineLocation Request service operation to the LMC 117 inside an F1AP Transfer message. The service operation may include a LCS Correlation identifier, the required QoS and Supported GAD shapes as specified in 3GPP TS 29.572.

At stage 2, the LMC 117 performs positioning of the target UE 102 as described in FIG. 13.

At stage 3, the LMC 117 returns an Nlmf_Location_DetermineLocation Response message to the serving gNB-CU 202 inside an F1AP Transfer message. The location response includes the LCS Correlation identifier, the location estimate, its age and accuracy and may include information about the positioning method, as specified in 3GPP TS 29.572.

Figure 15:
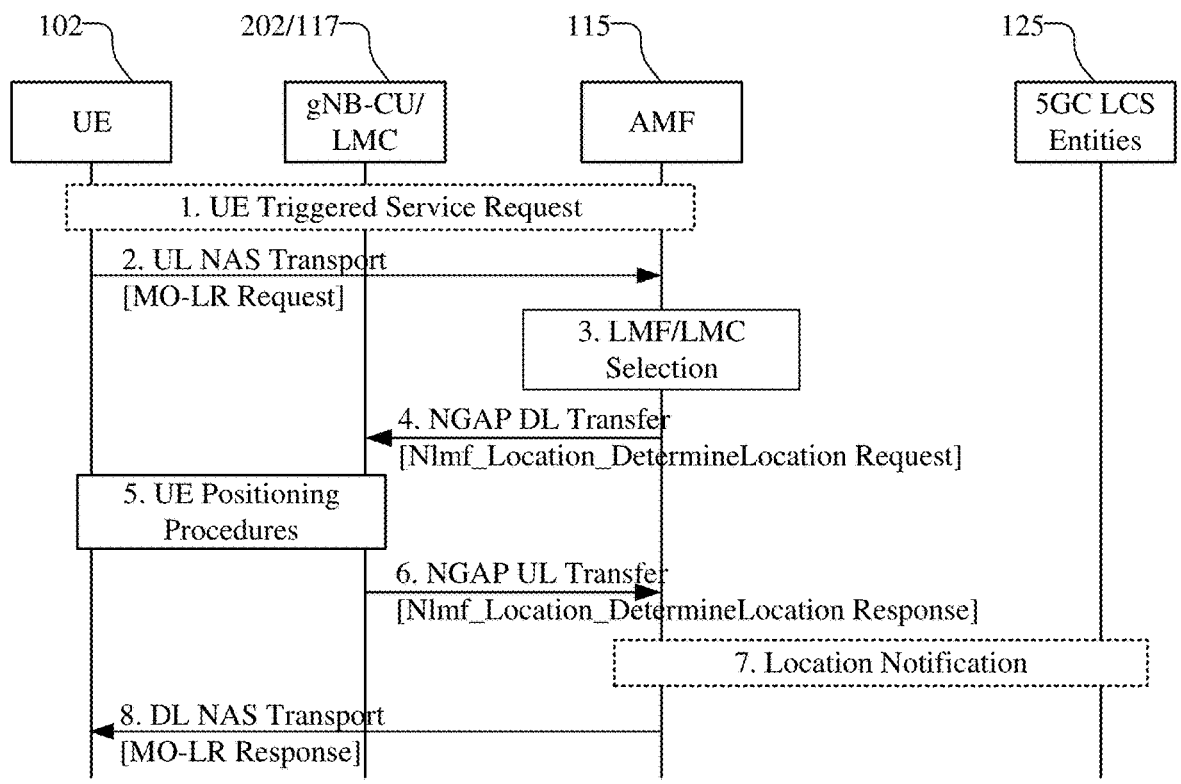
FIG. 15 illustrates a 5GCN MO-LR procedure with an LMC in the NG-RAN.

FIG. 15 illustrates a 5GCN MO-LR procedure with the LMC 117 in the NG-RAN. The 5GCN MO-LR procedures are specified in 3GPP TS 23.273. The signaling and procedures in the 5GCN can be the same as currently specified, as shown in FIG. 15.

At stage 1 in FIG. 15, if the UE 102 is in CM-IDLE state, the UE 102 instigates the UE triggered Service Request as defined in clause 4.2.3.2 of 3GPP TS 23.502 in order to establish a signaling connection with the AMF 115.

At stage 2, the UE 102 sends an SS MO-LR Request message included in an UL NAS Transport message to the AMF 115. The MO-LR Request may include an LPP positioning message (e.g., LPP Request Assistance Data). Different types of location services can be requested, including: location estimate of the UE 102, location estimate of the UE 102 to be sent to an LCS client 130 or AF 131, or location assistance data.

At stage 3, the AMF 115 selects an LMF 120 or LMC 117. This can be based on the information as currently defined in clause 5.1 of 3GPP TS 23.273 or based on AMF local configuration. The LMF/LMC selection takes the NG-RAN currently serving the UE 102 into account. If an LMC 117 is selected, stages 4-6 are performed. If an LMF 120 is selected, similar stages are performed with an LMF 120 as defined in clause 6.2 in 3GPP TS 23.273.

At stage 4, the AMF 115 sends the Nlmf_Location_DetermineLocation Request service operation inside a NGAP DL Transfer message as described in FIG. 4 above to the serving gNB-CU 202. The service operation may include a LCS Correlation identifier, an indication whether a location estimate, or location assistance data is requested, and any embedded LPP message in the MO-LR Request as specified in 3GPP TS 23.273.

The serving gNB-CU 202 may forward the Nlmf_Location_DetermineLocation Request NGAP container to a separate LMC 117 in the same gNB in a F1AP transfer message, as described in FIG. 8 above. The serving gNB-CU could instead forward the Nlmf_Location_DetermineLocation Request to an LMC in another gNB 110-2, in which case the Nlmf_Location_DetermineLocation Request would be initially forwarded in an XnAP transfer message to the gNB-CU in the other gNB 110-2 with the gNB-CU then forwarding the message to the LMC in an F1AP transfer message if the LMC is separate from the gNB-CU.

At stage 5, the LMC 117 performs the positioning procedures (to obtain the UE location or to transfer assistance data, as requested at stage 2).

At stage 6, when a location has been obtained or when the requested location assistance data has been transferred to the UE 102, the serving gNB-CU 202 returns the Nlmf_Location_DetermineLocation Response message inside a NGAP UL Transfer message to the AMF 115 to return the current location of the UE 102 or confirm the transfer of assistance data. The message includes the LCS Correlation identifier and may include a location estimate, its age and accuracy and information about the positioning method, as specified in 3GPP TS 29.572. If the LMC 117 is not part of the serving gNB-CU 202, the LMC 117 would first return the Nlmf_Location_DetermineLocation Response to the serving gNB-CU 202 in an F1AP transfer message if the LMC 117 is part of the serving gNB 110-1, in an XnAP transfer message if the LMC 117 is part of another gNB-CU or in an F1AP transfer message followed by an XnAP transfer message if the LMC 117 is in another gNB 110-2 and not part of the CU in that gNB. These operations as well as the positioning at stage 5 require the serving gNB-CU 202 to maintain the identity of the LMC 117 and the LMC 117 to maintain the identity of the serving gNB-CU 202.

At stage 7, signaling with other 5GCN LCS entities 125 (e.g. GMLC 125) may take place, e.g., to notify the GMLC 125 (e.g., for charging purposes) or to transfer the location estimate to a 3rd party as specified in 3GPP TS 23.273.

At stage 8, the AMF 115 sends an SS MO-LR Response message included in a DL NAS Transport message to the UE 102. The response carries any location estimate requested by the UE 102, or an indicator whether a location estimate was successfully transferred to the identified LCS client 130 or AF 131.

Figure 16:
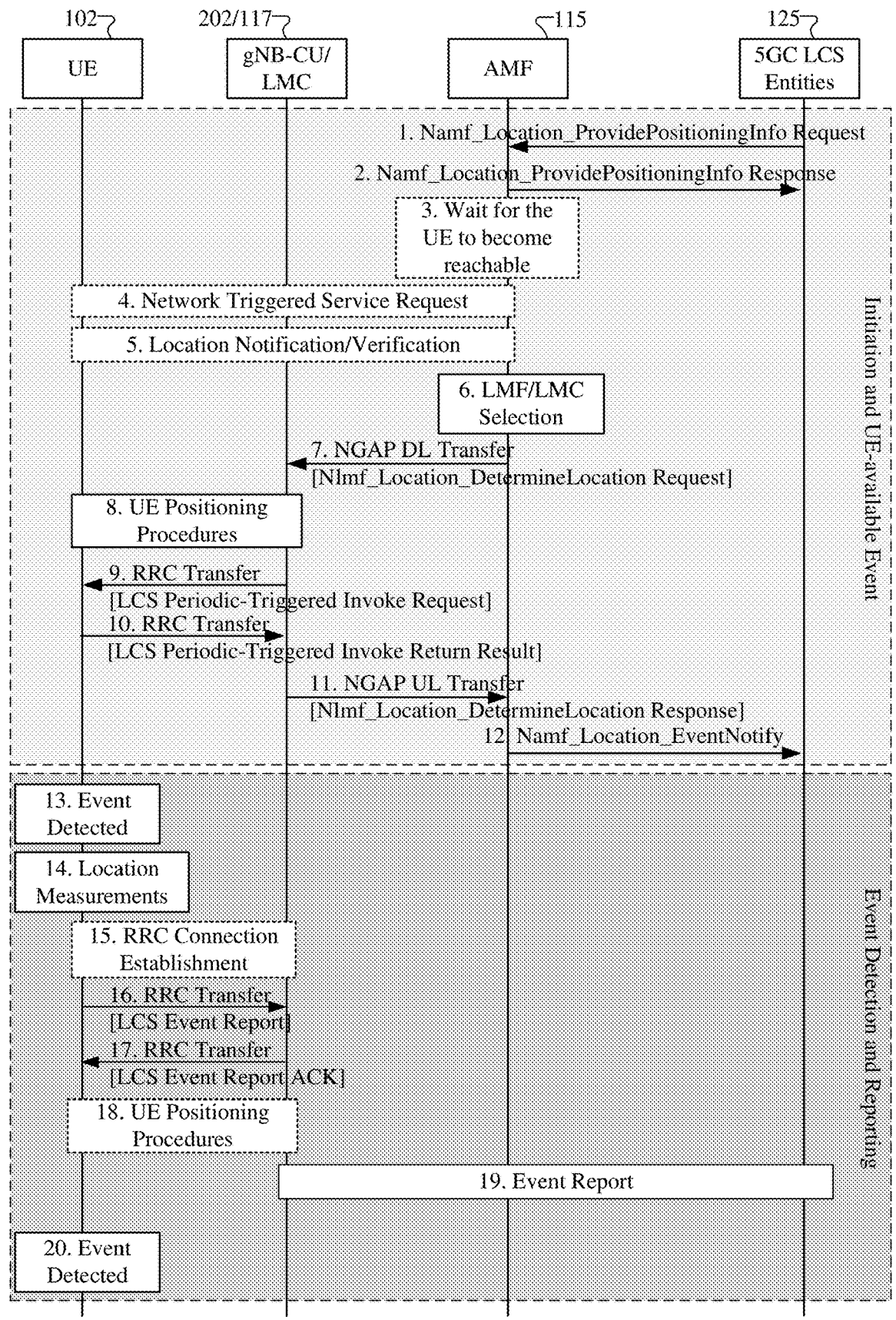
FIG. 16 illustrates a deferred MT-LR for periodic, triggered and UE available location events with LMC in the NG-RAN.

FIG. 16 illustrates a deferred MT-LR for periodic, triggered and UE available location events with LMC in the NG-RAN. The deferred 5GCN MT-LR procedures using an LMF are specified in 3GPP TS 23.273. The signaling and procedures in the 5GCN can be the same as specified in 3GPP TS 23.273, as shown in FIG. 16 below.

At stage 1 in FIG. 16, the serving AMF 115 of the target UE 102 receives a Namf_Location_ProvidePositioningInfo Request operation (or message) from an LCS entity 125 in the 5GCN, e.g., from a H-GMLC or V-GMLC 125. This service operation may include a Location Deferred Request (LDR) Reference Number, (H-)GMLC contact address, whether location estimates are required for triggered location, a QoS, the supported GAD shapes and other parameters as defined in 3GPP TS 23.273. A GMLC 125 verifies UE privacy before instigating stage 1.

At stage 2, if the AMF 115 supports a deferred location request, the AMF 115 returns an acknowledgment.

At stage 3, if the UE 102 is not currently reachable (e.g. is using eDRX or PSM), the AMF 115 waits for the UE 102 to become reachable.

At stage 4, once the UE 102 is reachable, if the UE 102 is then in CM IDLE state, the AMF 115 initiates a network triggered Service Request procedure as defined in clause 4.2.3.4 of 3GPP TS 23.502 to establish a signaling connection with the UE 102.

At stage 5, if the UE 102 must either be notified or notified with privacy verification according to stage 1 and if the UE 102 supports LCS notification (according to the UE capability information), a notification invoke message is sent to the target UE 102, as specified in 3GPP TS 23.273. The target UE 102 notifies the UE user of the location request and, if privacy verification was requested, waits for the user to grant or withhold permission. The UE 102 then returns a notification result to the AMF 115 indicating, if privacy verification was requested, whether permission is granted or denied for the current LCS request.

At stage 6, the AMF 115 selects an LMF 120 or LMC 117. If an LMC 117 is selected, stages 7-20 are performed. If an LMF 120 is selected, similar steps are performed with an LMF 120 as defined in clause 6.3.1 in 3GPP TS 23.273. The AMF 115 may or may not select a particular LMC. If a particular LMC is not selected, the serving gNB-CU 202 selects an LMC 117 (e.g. an LMC in the serving gNB 110-1).

At stage 7, the AMF 115 sends the Nlmf_Location_DetermineLocation Request service operation (or message) inside a NGAP DL Transfer message as described in FIG. 4 above to the serving gNB-CU 202. The service operation includes an LCS Correlation identifier, an indication if UE supports LPP, and other parameters as received in stage 1 and as defined in 3GPP TS 29.572. Any UE/subscriber identity supported in Nlmf_Location_DetermineLocation (e.g., SUPI or PEI) does not need to be provided to the LMC 117 in case of "security concerns". The UE 102 can be identified via e.g. NGAP-ID. If the LMC 117 is not part of the serving gNB-CU 202, the serving gNB-CU 202 may forward the Nlmf_Location_DetermineLocation Request NGAP container to the LMC 117 in a F1AP transfer message, as described in FIG. 8 above. If the LMC 117 is in another gNB, the Nlmf_Location_DetermineLocation Request would be forwarded to the other gNB-CU in an XnAP Transfer message and the other gNB-CU would then forward this to the LMC 117. Only the serving gNB-CU 202 and LMC 117 need to retain state information for the location request (which needs to include the identity of the serving gNB-CU 202 in the case of the LMC 117 and the identity of the LMC 117 in the case of the serving gNB-CU 202).

At stage 8, the LMC 117 may perform positioning procedures (e.g. if an initial location estimate is needed) as described in FIG. 13. During this stage, the LMC 117 may request and obtain the UE positioning capabilities (e.g. which may indicate the type(s) of periodic and triggered location supported by the UE 102 and the access types supported by the UE 102 for event reporting).

For a request for the UE available location event, the LMC 117 skips stages 9 and 10.

At stage 9, if periodic or triggered location was requested, the LMC 117 sends a supplementary services LCS Periodic-Triggered Invoke Request to the UE 102, as described in FIGS. 5 and 6 above. The LCS Periodic-Triggered Location Invoke carries the location request information received from the AMF 115 at stage 7. As specified in 3GPP TS 23.273, the LCS Periodic-Triggered Location Invoke also includes a deferred routing identifier, which can be the identification of the LMC 117 when the LMC 117 will act as a serving LMC 117 or a default LMC identification otherwise. The LCS Periodic-Triggered Location Invoke may also include an embedded LPP positioning message which indicates certain allowed or required location measurements (or a location estimate) at stage 14 for each location event reported. The deferred routing identifier may be global (e.g. an IP address, UUID or URI) or may be local. The deferred routing identifier is used for routing by the gNB-CU 202 in stage 16.

At stage 10, if the request in stage 9 can be supported, the UE 102 returns a supplementary services acknowledgment to the LMC 117, which is transported in a RRL UL Transfer message, as described in FIGS. 5 and 6 above.

At stage 11, the LMC 117 sends the Nlmf_Location_DetermineLocation Response message to the AMF 115, which is transported inside an NGAP UL Transfer message over the NG interface, to respond to the request at stage 7. For a request for the UE available location event, the response includes any UE location obtained at stage 8 and the LMC 117 then releases all resources. For a periodic or triggered location request, the response includes any location obtained at stage 8, a confirmation of whether periodic or triggered location was successfully activated in the UE 102 according to stages 9 and 10 and the identification of the LMC 117 in the case of successful activation with a serving LMC. The LMC 117 also retains state information and resources for later steps if the LMC 117 acts a serving LMC.

At stage 12, the AMF 115 invokes the Namf_Location_EventNotify service operation towards the V-GMLC for roaming, or H GMLC for non-roaming, and includes any location received at stage 11 and, for periodic or triggered location, a confirmation of whether or not periodic or triggered location was successfully activated in the target UE 102. The AMF 115 also includes the LMC identification if received at stage 11. The AMF 115 may then release all resources for the location request and cease support for the procedure.

At stage 13, for a periodic or triggered location request where stages 9 and 10 were successfully performed, the UE 102 monitors for occurrence of the trigger or periodic event requested in stage 9. For the area event or motion event, the UE 102 monitors the requested event at intervals equal to or less than the maximum event sampling interval. An event trigger is detected by the UE 102 when any of the following occur: (i) a requested area event or motion event has been detected and the minimum reporting time interval has elapsed since the last report (if this is not the first event report); (ii) a requested periodic location event has occurred; or (iii) the maximum reporting time for an area event or motion event has expired.

At stage 14, the UE 102 obtains any location measurements, or a location estimate that were requested or allowed at stage 9.

At stage 15, the UE 102 performs a RRC Connection Establishment as defined in 3GPP TS 38.331 if in RRC-IDLE state.

At stage 16, the UE 102 sends a supplementary services event report message included in a RRC UL Transfer message as described in FIGS. 5 and 6 above to the LMC 117 (which may be different to the original serving LMC for stages 7-10). The event report may indicate the type of event being reported (e.g. whether a normal event or expiration of the maximum reporting interval) and may include an embedded LPP positioning message which includes any location measurements or location estimate obtained at stage 14. The event report also includes the (H-)GMLC contact address, the LDR reference number, whether location estimates are to be reported and if so the location QoS. The UE 102 also includes the deferred routing identifier received in stage 9. The serving gNB-CU 202 then forwards the event report to either the serving LMC 117 or any suitable LMC (e.g. an LMC in the same gNB if available) based on whether the deferred routing identifier indicates a particular LMC or any (default) LMC. If the LMC 117 is part of the serving gNB-CU, no message transfer would be needed. If the LMC 117 is separate from the serving gNB-CU 202 but in the same gNB, the event report is forwarded using F1AP as described in FIG. 8. If the LMC 117 is in a different gNB to the serving gNB, the event report is transported in a XnAP Transfer message, as described in FIG. 7 above.

At stage 17, when the LMC 117 receives the event report and if it can handle this event report, the LMC 117 returns a supplementary services acknowledgment for the event report to the UE 102 (in a RRC DL Transfer message, as described in FIGS. 5 and 6 above). The acknowledgment may optionally include a new deferred routing identifier indicating a new serving LMC or a default (any) LMC. Inclusion of a new deferred routing identifier in the event report acknowledgment at stage 17 may be used to change the serving LMC (e.g., if a UE 102 moves into an area that is better supported by a different LMC or if the serving LMC is overloaded) or to enable a default LMC to become a serving LMC.

At stage 18, if a location estimate is needed for event reporting, the LMC 117 may perform positioning procedures as described in FIG. 13.

At stage 19, the LMC 117 sends the event report (e.g., location estimate) to an external client through the AMF 115 and includes the LDR Reference Number and (H-)GMLC contact address to enable the AMF 115 to forward the event report to the correct (H-)GMLC for onward transfer to the external client or AF 131. The (H-)GMLC may perform additional privacy verification before returning the current location to the external client or AF.

In some implementations for stage 19, LMC 117 or gNB-CU 202 could send the event report to the external client 130 (or AF 131) at a user plane level and bypass other entities such as AMF 115, GMLC 125 and NEF 127, which could enable reduced latency. For example, LMC 117 or gNB-CU 202 could send the event report directly to the external client 130 (or AF 131) using one or more of the Internet Protocol (IP), Transmission Control Protocol (TCP), User Datagram Protocol (UDP) and Transport Layer Security (TLS) Protocol to transport the event report in the form of data or a data message. In these implementations, the messages sent at stages 1 and 7 can include additional information to enable the user plane transfer. The additional information may include: (i) an IP address or Fully Qualified Domain Name for external client 130 or AF 131; (ii) a location reference (to help identify the event report); (iii) information to enable ciphering and/or authentication of the event report; and/or (iv) an address or indication of an intermediate routing function in 5GCN 140 to which the event report is sent by LMC 117 or gNB-CU 202 over a user plane and which will subsequently route the event report (e.g. over a user plane) to the external client 130 or AF 131.

At stage 20, the UE 102 continues to monitor for further periodic or trigger events as in stage 13 and instigates stages 14-19 each time a trigger event is detected.

Handover of a UE 102 from a source to a target gNB 110 may occur during positioning of the UE 102 for a single location estimate for an NI-LR, MT-LR, MO-LR or the initial (and possibly final) location estimate for a deferred MT-LR. When this occurs, the current (source) LMC 117 for the UE may be changed to a new (target) LMC 117 (alternative A) or may remain unchanged (alternative B). A network operator may configure a preference or a requirement for either alternative A or alternative B or an NG-RAN 135 may simply implement one but not both alternatives (to reduce implementation).

An advantage in not changing the source LMC (in alternative B) is that ongoing UL and DL measurements for the UE 102 can continue undisturbed with measurements continuing to be sent to the original source LMC for determination of a location. An advantage in changing the source LMC (in alternative A) would be possible availability of more assistance data and/or access to more neighbor gNBs applicable to the new serving cell of the UE 102. A main principle in supporting UE mobility, as described below, is that state information for a location session for a UE 102 can be maintained only in the current LMC and in the current serving gNB-CU for the UE 102. In particular, the LMC is kept updated with the identity of the current serving gNB and the serving gNB-CU remains aware of the current LMC.

Figure 17:
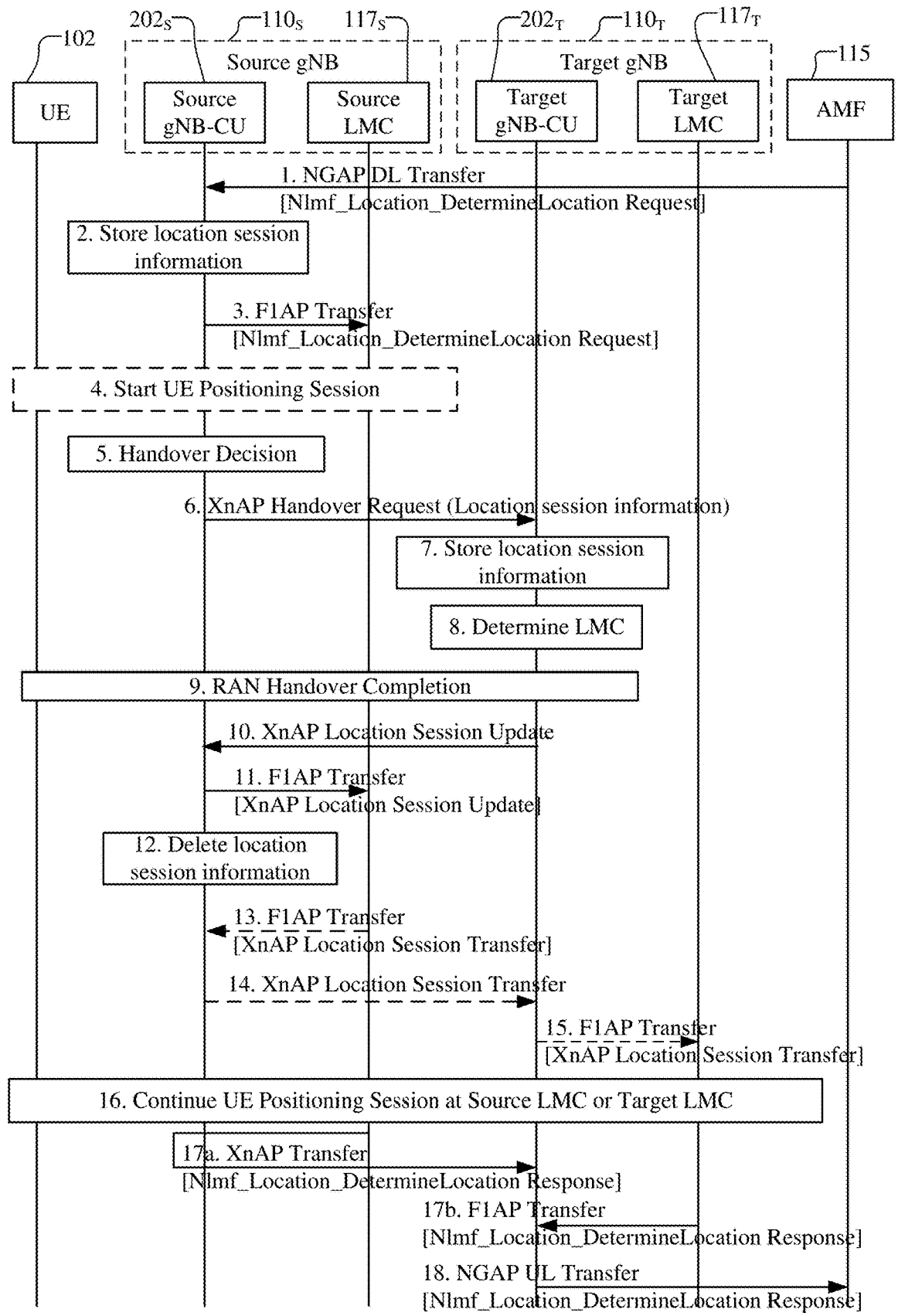
FIG. 17 illustrates a procedure supporting mobility of a UE for an MO-LR (Mobile Originated Location Request), MT-LR (Mobile Terminating Location Request) or NI-LR (Network Induced Location Request) procedure.

FIG. 17 illustrates a single generic procedure supporting mobility of a UE 102 for an MO-LR, MT-LR or NI-LR procedure, and includes support for both alternatives A and B described above. In FIG. 17 it is assumed that the source LMC $117_S$ and target LMC $117_T$ are in the source gNB $110_S$ and target gNB $110_T$, respectively, but not part of a gNB-CU. In the case that the source LMC $117_S$ is part of the source gNB-CU $202_S$ or the target LMC $117_T$ is part of the target gNB-CU $202_T$, messages in FIG. 17 between the source gNB-CU $202_S$ and source LMC $117_S$ (for stages 3, 11, 13 and 17a) or between the target gNB-CU $202_T$ and target LMC $117_T$ (for stages 15 and 17b), respectively, are not sent. In the case that the source LMC $117_S$ is in a different gNB to the source gNB $110_S$ (or is external to a gNB 110) or the target LMC $117_T$ is in a different gNB to the target gNB $110_T$ (or is external to a gNB 110), messages in FIG. 17 between the source gNB-CU $202_S$ and source LMC $117_S$ (for stages 3, 11, 13 and 17a) or between the target gNB-CU $202_T$ and target LMC $117_T$ (for stages 15 and 17b), respectively, are sent via the gNB-CU for the different gNB (or are sent to/from the LMC when external to any gNB 110) and thus include an extra XnAP transfer leg between two gNB-CUs (or between a gNB-CU and an external LMC).

In FIG. 17, a precondition may be that the AMF 115 receives an MT-LR, MO-LR or deferred MT-LR request for the location of a UE 102 or initiates an NI-LR and selects an LMC to perform the UE positioning.

At stage 1 in FIG. 17, the AMF 115 sends an Nlmf_Location_DetermineLocation Request service operation inside a NGAP DL Transfer message to the serving/source gNB-CU $202_S$ as described in FIG. 4 above in the case of an MT-LR, MO-LR or NI-LR for an immediate location or as described in FIG. 16 above for a deferred MT-LR. The AMF 115 includes the LMC identity if the AMF 115 selected a particular source LMC $117_S$.

At stage 2, the source gNB-CU $202_S$ selects a source LMC $117_S$ if the AMF 115 did not indicate an LMC (e.g. an LMC in the source gNB $110_S$) and stores location session information which includes a unique location session identifier (determined by the source gNB-CU $202_S$), the correlation ID assigned by the AMF 115, the identity of the UE 102, the identity of the source gNB $110_S$, and the identity of the source LMC $117_S$. The location session identifier may be used by both the source gNB-CU $202_S$ and LMC $117_S$ to associate later messages with the location session. These later messages can include both positioning messages and messages related to handover of the UE 102 or termination of the location session. This will enable the current serving gNB-CU to route positioning messages between the UE 102 and the current LMC even following a change of LMC and enables both the current serving gNB-CU and LMC to indicate or recognize a location session which is impacted by a handover. The location session identifier could be the correlation ID assigned by the AMF 115 if this will remain unique or could be a different identifier assigned by the source gNB-CU $202_S$.

At stage 3, the gNB-CU $202_S$ forwards the Nlmf_Location_DetermineLocation Request service operation to the source LMC $117_S$ in a F1AP Transfer message as described in FIG. 8 above and includes the location session identifier and the identity of the serving gNB $110_S$ in the F1AP Transfer message.

At stage 4, the source LMC $117_S$ stores the received information and may initiate UL and/or DL measurements for the UE 102 as described in FIG. 13.

At stage 5, the source gNB-CU $202_S$ decides to handover the UE 102 to a new target gNB $110_T$ (e.g. due to degraded radio coverage from the source gNB $110_S$). The normal handover procedure is then executed as specified in e.g., 3GPP TS 38.300, 3GPP TS 38.401, 3GPP TS 37.340 and with the additions specified below.

At stage 6, an XnAP Handover Request message sent from the source gNB-CU $202_S$ to the target gNB-CU $202_T$ includes the location session information stored at stage 2. The source gNB-CU $202_S$ may also include a preference or requirement for not changing the source LMC $117_S$.

At stage 7, the target gNB-CU $202_T$ stores the location session information.

At stage 8, the target gNB-CU $202_T$ determines whether the source LMC $117_S$ will continue to support the location session or whether a new target LMC (at the target gNB $110_T$ in this example) will be used. This determination may be based on any preference or requirement received from the source gNB-CU $202_S$ in stage 6. If the target gNB-CU $202_T$ determines to use a new target LMC $117_T$, an identification of the new target LMC $117_T$ will be stored as part of the location session information at stage 7 and the target gNB-CU $202_T$ will then buffer any LPP location responses received from the UE 102 for this location session and deliver these to the target LMC $117_T$ following stage 15. In addition, a new unique location session identifier could be assigned by the target gNB-CU $202_T$ to replace the location session identifier assigned by the source gNB-CU $202_S$. If the target gNB-CU $202_T$ determines to continue using the source LMC $117_S$, then any LPP location responses received from the UE 102 for this location session can be sent by the target gNB-CU $202_T$ to the source gNB-CU $202_S$ for forwarding to the source LMC $117_S$.

At stage 9, the rest of the normal handover procedure occurs as described in 3GPP TS 38.300, 3GPP TS 38.401, 3GPP TS 37.340.

At stage 10, the target gNB-CU $202_T$ sends an XnAP Location Session Update message (or some other XnAP message), intended for the source LMC $117_S$, to the source gNB-CU $202_S$, and includes the identity of the target gNB $110_T$, whether a new target LMC $117_T$ will be used, the identity of the target LMC $117_T$ if used and any new location session identifier if the source LMC $117_S$ will not be changed.

At stage 11, the source gNB-CU $202_S$ forwards the XnAP Location Session Update message to the source LMC $117_S$ in an F1AP container message.

At stage 12, the source gNB-CU $202_S$ deletes (or discards) the location session information stored at stage 2. If a new target LMC $117_T$ will not be used, stages 13-15 are skipped. The source gNB-CU $202_S$ should wait for stages 10 and 11 to occur before deleting the location session information at stage 12 in order to support any LPP message that may be sent to the UE 102 by the source LMC $117_S$ prior to stage 11. Prior to stage 11, the source LMC $117_S$ sees the source gNB $110_S$ to be the serving gNB for the UE 102, so would send any LPP message intended for the UE 102 to the source gNB-CU $202_S$ to forward to the UE 102 as described in FIG. 13. Between stages 6 and 9, the source gNB-CU $202_S$ could buffer an LPP message received from the source LMC $117_S$. But after stage 9 (when completion of the handover is confirmed), the source gNB-CU $202_S$ can send a buffered LPP message or an LPP message received from the source LMC $117_S$ to the target gNB-CU $202_T$ for forwarding to the UE 102. This would not always be possible if the source gNB-CU $202_S$ were to delete the location session information before stage 11. However, after stage 11, the source LMC $117_S$ knows the new serving gNB is the target gNB $110_T$ and can send any LPP message intended for the UE 102 to the target gNB-CU $202_T$ if a new target LMC $117_T$ will not be used.

At stage 13, if a new target LMC $117_T$ will be used, the source LMC $117_S$ sends an XnAP Location Session Transfer message (or some other XnAP message), intended for the target LMC $117_T$, to the source gNB-CU $202_S$ in an F1AP container message. The XnAP message includes the target LMC $117_T$ identity, the target gNB $110_T$ identity, the original Nlmf_Location_DetermineLocation Request service operation from stage 3 and the current status of the positioning session including location capabilities of the UE 102 if received in stage 4, any measurements received by the source LMC $117_S$ in stage 4 and details of any outstanding measurement requests sent in stage 4. The source LMC $117_S$ then releases all resources for the location request.

At stage 14, the source gNB-CU $202_S$ forwards the XnAP Location Session Transfer message to the target gNB-CU $202_T$.

At stage 15, the target gNB-CU $202_T$ forwards the XnAP Location Session Transfer message to the target LMC $117_T$ in an F1AP transfer message. As an alternative, the XnAP Location Session Update message in stage 11 and the XnAP Location Session Transfer message in stages 13 and 15 can be mapped into corresponding F1AP messages which are transferred instead of these XnAP messages in these stages.

At stage 16, the positioning session continues, as described in FIG. 13, but using the new target gNB $110_T$ as the serving gNB and either the source LMC $117_S$ or new target LMC $117_T$ (depending on whether there is a change of LMC) to obtain a location estimate for the UE 102. For continuation by the source LMC $117_S$, the target gNB-CU $202_T$ should forward any LPP message received from the UE 102 for this location session to the source LMC $117_S$ via the source gNB-CU $202_S$ and the source LMC $117_S$ should send any LPP message intended for the UE 102 to the target gNB-CU $202_T$ via the source gNB-CU $202_S$ for forwarding to the UE 102. For continuation by the target LMC $117_T$, the target LMC $117_T$ should notify any gNB-DU/TRP 204/112 from which UL location measurements were requested in stage 4 but not yet received to send a location response to the target LMC $117_T$ (via the target gNB-CU $202_T$) instead of the source LMC $117_S$.

At stage 17a, for location continuation by the source LMC $117_S$, the source LMC $117_S$ returns a location estimate for the UE 102 (e.g. as obtained using measurements obtained at stage 4 and/or stage 16) to the target gNB-CU $202_T$ via the source gNB-CU $202_S$ in a Nlmf_Location_DetermineLocation Response message. The source LMC $117_S$ includes an indication, visible to the target gNB-CU $202_T$, that the location session has ended. The source LMC $117_S$ then releases all resources for the location session.

At stage 17b, for location continuation by the target LMC $117_T$, the target LMC $117_T$ returns a location estimate for the UE 102 (e.g. as obtained using measurements obtained at stage 4 and/or stage 16) to the target gNB-CU $202_T$ in a Nlmf_Location_DetermineLocation Response message inside an F1AP Transfer message. The target LMC $117_T$ includes an indication, visible to the target gNB-CU $202_T$, that the location session has ended. The target LMC $117_T$ then releases all resources for the location session.

At stage 18, the target gNB-CU $202_T$ forwards the Nlmf_Location_DetermineLocation Response message to the AMF 115 inside an NGAP UL Transfer message. The target gNB-CU $202_T$ then deletes (or discards) the location session information stored at stage 7.

The procedure in stages 4-16 in FIG. 17 can also be valid for further handovers from the initial (or most recent) target gNB to additional target gNBs. In this case, the source gNB-CU $202_S$ and source LMC $117_S$ in FIG. 17 correspond, respectively, to the serving gNB-CU and LMC prior to handover, and the target gNB-CU $202_T$ and target LMC $117_T$ (when there is a change of LMC) correspond, respectively, to the new serving gNB-CU and new LMC after handover. If the source LMC is in a different gNB from the serving gNB prior to handover, then the messages in FIG. 17 for stages 11, 13 and 17a would be sent via the gNB-CU for the different gNB and would thus include an extra XnAP transfer leg between two gNB-CUs, as described above for the initial handover.

Figure 18A:
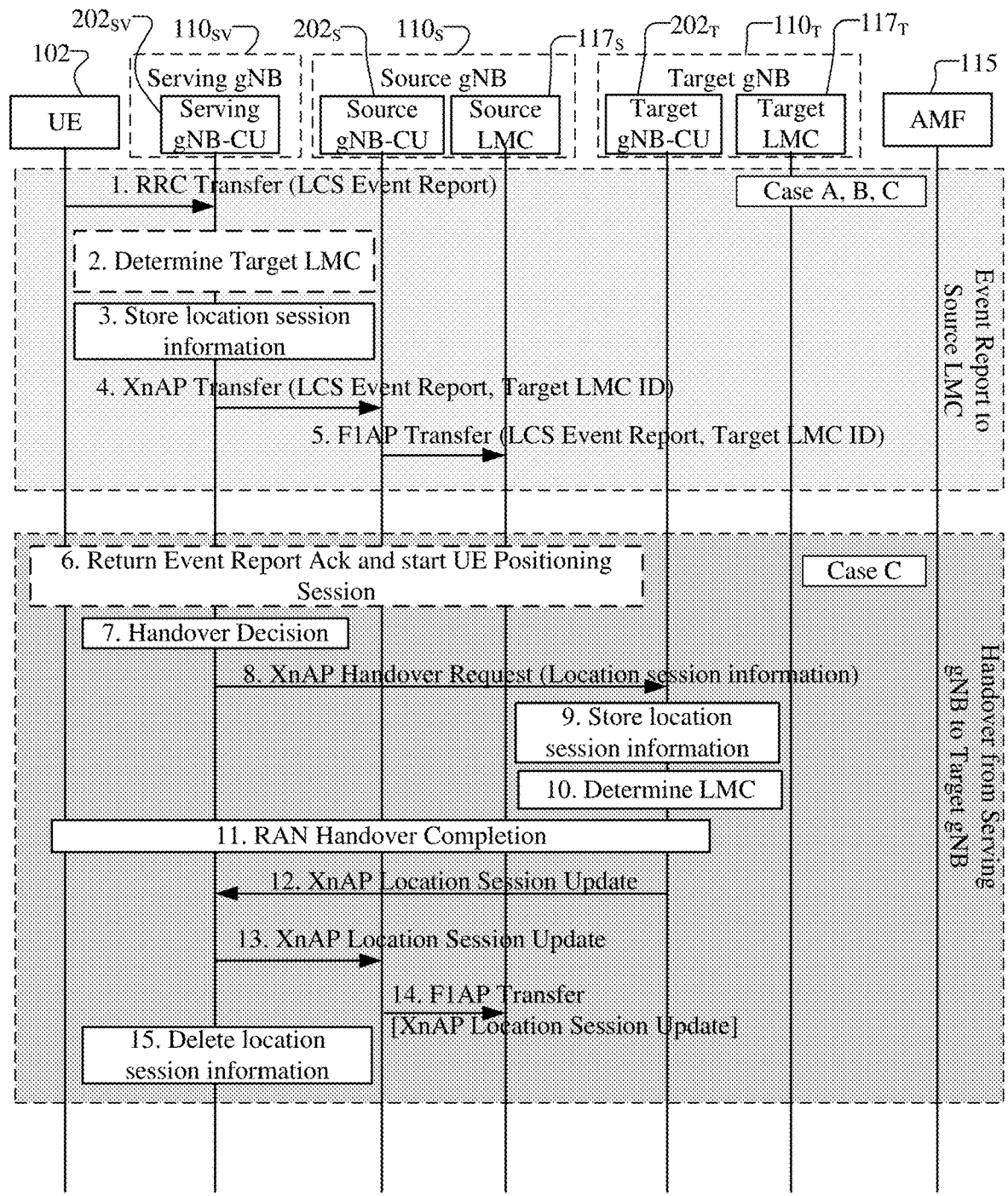
FIG. 18, consisting of FIG. 18A and FIG. 18B, illustrate procedures supporting mobility of a UE 102 for a periodic or triggered MT-LR.
Figure 18A:
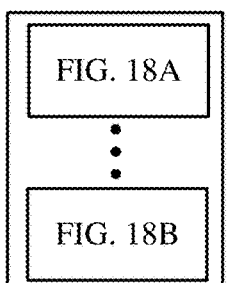
Figure 18B:
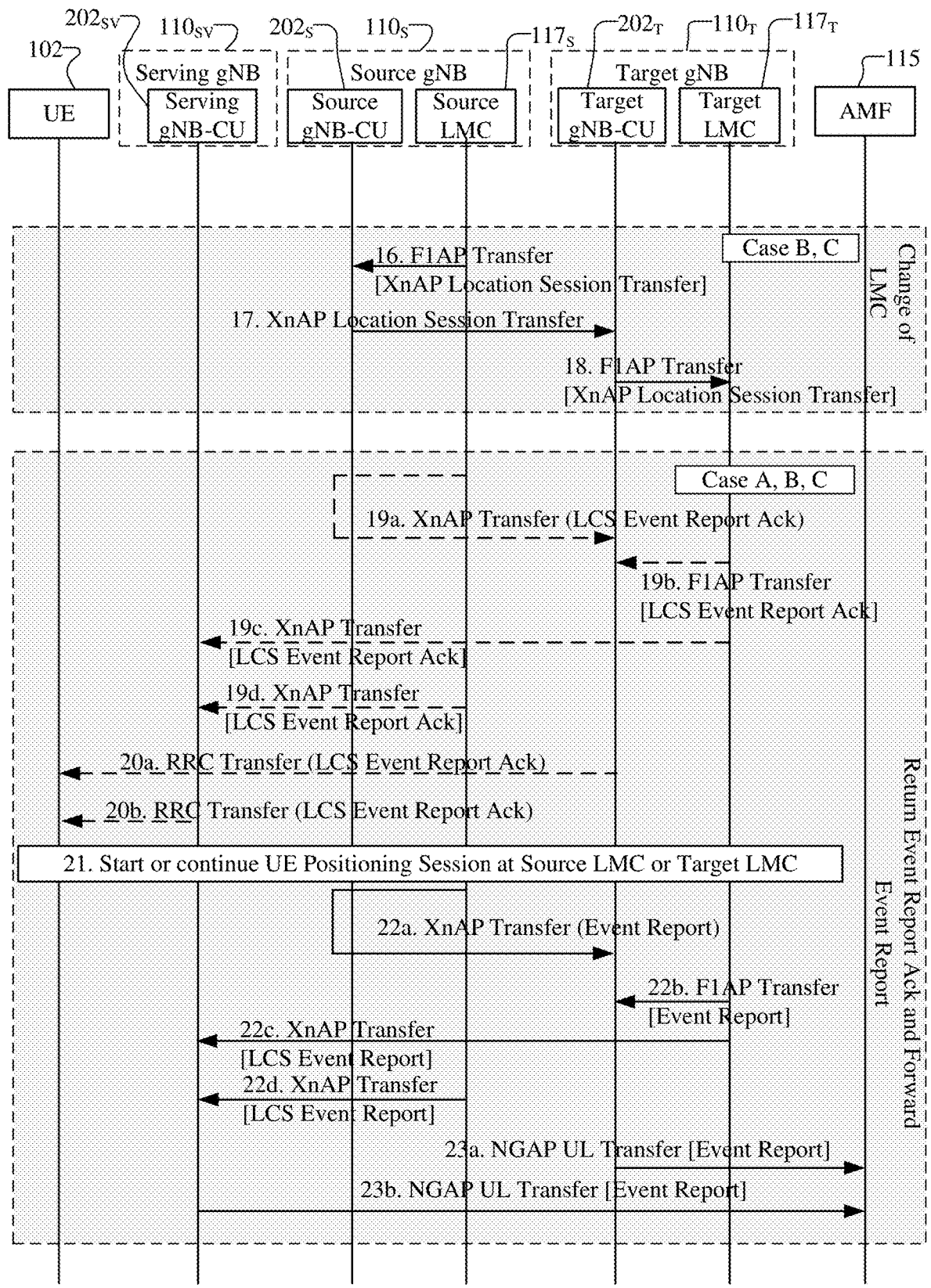

FIG. 18, consisting of FIG. 18A and FIG. 18B, illustrates two procedures supporting mobility of a UE 102 for a periodic or triggered MT-LR. For a periodic or triggered MT-LR as described in FIG. 16, mobility of the UE 102 may occur prior to sending each event report at stage 16 in FIG. 16 and/or while the event report is being processed by the NG-RAN at stages 17-18 in FIG. 16. Mobility of the UE 102 prior to an event report can be supported by allowing a change of serving LMC using a procedure similar to that for a change of serving LMF for a periodic or triggered MT_LR as described in 3GPP TS 23.273. Mobility of the UE 102 during processing of an event report can be supported by reusing the procedure for UE handover described above in FIG. 17. The two procedures may in some instances both occur and are shown together in FIG. 18. In FIG. 18, the serving gNB $110_{SV}$ is the gNB which initially serves the target UE 102 when an event report is sent. The source LMC $117_S$ is the initial serving LMC for the UE 102 when the deferred routing identifier indicates a serving LMC (in this case LMC $117_S$) or the LMC selected for the UE 102 by the serving gNB $110_{SV}$ when the deferred routing identifier indicates any LMC. The source gNB $110_S$ is the gNB associated with the source LMC $117_S$. The target LMC $117_T$ is a new LMC for the UE 102 selected either due to handover of the UE 102 to the target gNB $110_T$ or due to selection of a new serving LMC. The target gNB $110_T$ is the gNB associated with the target LMC $117_T$ or the gNB to which UE 102 handover occurs.

As for FIG. 17, state information for the location session can be maintained only in the current LMC and in the current serving gNB-CU for the target UE 102. In the case that the source LMC $117_S$ is part of the source gNB-CU $202_S$ or the target LMC $117_T$ is part of the target gNB-CU $202_T$, F1AP Transfer messages in FIG. 18 between the source gNB-CU $202_S$ and source LMC $117_S$ (for stages 14, 16, 19a, 19d, 22a, and 22d) or between the target gNB-CU $202_T$ and target LMC $117_T$ (for stages 18, 19b, 19c, 22b, and 22c), respectively, are not sent. In the case that the source LMC $117_S$ is in the serving gNB $110_{SV}$, XnAP Transfer messages for stages 4, 19d, and 22d are not sent. In the case that the target LMC $117_T$ is in a different gNB to the target gNB-CU $202_T$ (where handover to the target gNB $110_T$ occurs) or is external to a gNB 110, messages in FIG. 18 between the target gNB-CU $202_T$ and target LMC $117_T$ (for stages 18, 19b, and 22b), respectively, are sent via the gNB-CU for the different gNB (or are sent to/from the external LMC) and thus include an extra XnAP transfer leg between two gNB-CUs (or between target gNB-CU $202_T$ and the external LMC).

In FIG. 18, a precondition is that a periodic or triggered MR-LR has been activated in a UE 102, e.g. according to stages 1-12 of FIG. 16, and the UE 102 has detected a trigger event, obtained any needed location measurements and obtained an RRC connection if needed, e.g. as at stage 13-15 in FIG. 16.

At stage 1 in FIG. 18, the UE 102 sends a supplementary services event report message included in a RRC UL Transfer message as described for stage 16 of FIG. 16. The UE 102 includes a deferred routing identifier which indicates that either a particular serving LMC (in this case the source LMC $117_S$ in FIG. 18) is to be used or any LMC.

At stage 2, if the deferred routing identifier indicates a particular serving LMC (here assumed to be the source LMC $117_S$), the serving gNB-CU $202_{SV}$ may optionally determine a different target LMC (here assumed to be the target LMC $117_T$), which may better support location for the current serving cell for the UE 102. If the deferred routing identifier indicates any LMC, the gNB-CU $202_{SV}$ selects an LMC, here assumed to be the source LMC $117_S$. If the deferred routing identifier indicates a particular serving LMC that is not reachable from the serving gNB $110_{SV}$ due to lack of Xn connectivity, the serving gNB $110_{SV}$ may select a source LMC (here assumed to be the source LMC $117_S$) different to the serving LMC. The event report can then be processed as described below. However, the serving LMC will not then be aware of the event report and may continue to retain state information for the periodic or triggered location request and expect to receive event reports. To avoid this situation, the "any LMC" option for the deferred routing identifier may be used for all event reports.

At stage 3, the serving gNB-CU $202_{SV}$ stores location session information which includes the identity of the UE 102, a unique location session identifier (determined by the serving gNB-CU $202_{SV}$), the identity of the final source or target LMC determined in stage 2, the identity of the serving gNB $110_{SV}$ and an indication of periodic or triggered location.

At stage 4, the serving gNB-CU $202_{SV}$ forwards the event report to the source gNB-CU $202_S$ in an XnAP Transfer message as described in FIG. 7 above and includes the identity of the source LMC $117_S$ as the intended recipient of the event report, the identity of the serving gNB $110_{SV}$, the location session identifier, and the identity of the target LMC $117_T$ when a new target LMC is determined at stage 2. If a target LMC $117_T$ is determined at stage 2, the serving gNB-CU $202_{SV}$ still sends the event report towards the source LMC $117_S$ in order to allow the source LMC $117_S$ to transfer state information for the periodic or triggered location to the target LMC $117_T$ along with the event report at stages 16-18.

At stage 5, the source gNB-CU $202_S$ forwards the event report to the source LMC $117_S$ in an F1AP Transfer message as described in FIG. 8 above. Following stages 1-5, there are four alternative possibilities, referred to below as Case A, Case B, Case C and Case D:

Case A: A target LMC $117_T$ is not determined in stage 2 and handover of the UE 102 does not occur during processing of the event report. For this case, stages 6-18 are not performed and stages 19d, 20b, 21, 22d, and 23b are performed to return an Event Report Ack to the UE 102, obtain the UE location if needed and forward the event report to the 5GCN.

Case B: A target LMC $117_T$ is determined in stage 2 and handover of the UE 102 does not occur during processing of the event report. For this case, stages 6-15 are not performed, stages 16-18 are performed to change from the source LMC $117_S$ to the target LMC $117_T$, and stages 19c, 20b, 21, 22c, and 23b are performed to return an Event Report Ack to the UE 102, obtain the UE location if needed and forward the event report to the 5GCN.

Case C: A target LMC $117_T$ is not determined in stage 2 and handover of the UE 102 to the target gNB $110_T$ occurs during processing of the event report. For this case, stages 6-15 are performed to handover to the target gNB $110_T$, stages 16-18 are performed if the source LMC $117_S$ also changes to the target LMC $117_T$ as part of the handover, and stages 19a or 19b, 20a, 21, 22a or 22b, and 23a are performed to return an Event Report Ack to the UE 102, obtain the UE location if needed and forward the event report to the 5GCN.

Case D: A target LMC $117_T$ is determined in stage 2 and handover of the UE 102 occurs during processing of the event report. This case is not explicitly shown in FIG. 18 but would comprise the steps for case B to change the source LMC $117_S$ to the target LMC $117_T$ followed by stages 6-15 or stages 6-18 applied to the target gNB $110_T$ rather than source gNB $110_S$ to change to a new target gNB (not shown in FIG. 18) and optionally a new target LMC. Stages analogous to stages 21-23 would then be performed to return an Event Report Ack to the UE 102, obtain the UE location if needed and forward the event report to the 5GCN.

The following stages 6-15 are performed for Case C.

At stage 6, when the source LMC $117_S$ receives the event report and if it can handle this event report, the source LMC $117_S$ returns a supplementary services acknowledgment for the event report to the UE 102 via the source gNB-CU $202_S$ and serving gNB-CU $202_{SV}$ as for stage 17 in FIG. 16. If a location estimate is needed for event reporting, the source LMC $117_S$ may start to perform positioning procedures as described in section FIG. 13.

At stage 7, the serving gNB-CU $202_{SV}$ decides to handover the UE 102 to a new target gNB $110_T$ (e.g. due to degraded radio coverage from the serving gNB $110_{SV}$). The normal handover procedure is executed as specified in e.g., 3GPP TS 38.300, 3GPP TS 38.401, 3GPP TS 37.340 and with the additions specified below.

At stage 8, an XnAP Handover Request message, sent from the serving gNB-CU $202_{SV}$ to the target gNB-CU $202_T$, includes the location session information stored at stage 3. The serving gNB-CU $202_{SV}$ may also include a preference or requirement for not changing the source LMC $117_S$.

At stage 9, the target gNB-CU $202_T$ stores the location session information.

At stage 10, the target gNB-CU $202_T$ determines whether the source LMC $117_S$ will continue to support the location session or whether a new target LMC (at the target gNB $110_T$ in this example) will be used. The target gNB-CU $202_T$ can take into account that this is a periodic or triggered location and any preference or requirement received from the serving gNB-CU $202_{SV}$ in stage 8 when deciding whether to determine a new LMC. If the target gNB-CU $202_T$ determines to use a new target LMC $117_T$, this will be stored as part of the location session information at stage 9 and the target gNB-CU $202_T$ will buffer any LPP location responses received from the UE 102 for this location session and deliver these to the target LMC $117_T$ following stage 18. Additionally, a new unique location session identifier could be assigned by the target gNB-CU $202_T$ to replace the location session identifier received from the serving gNB-CU $202_{SV}$. If the target gNB-CU $202_T$ determines to continue using the source LMC $117_S$, then any LPP location responses received from the UE 102 for this location session can be sent by the target gNB-CU $202_T$ to the source gNB-CU $202_S$ for forwarding to the source LMC At stage 11, the rest of the normal handover procedure occurs as described in 3GPP TS 38.300, 3GPP TS 38.401, 3GPP TS 37.340.

At stage 12, the target gNB-CU $202_T$ sends an XnAP Location Session Update message (or some other XnAP message), intended for the source LMC $117_S$, to the serving gNB-CU $202_{SV}$, and includes the identity of the target gNB $110_T$, whether a new target LMC will be used, the identity of the target LMC $117_T$ if used and any new location session identifier if the source LMC $117_S$ will not be changed.

At stage 13, the serving gNB-CU $202_{SV}$ forwards the XnAP Location Session Update message to the source gNB-CU $202_S$ (based on the location session information still stored from stage 3).

At stage 14, the source gNB-CU $202_S$ forwards the XnAP Location Session Update message to the source LMC $117_S$ in an F1AP transfer message.

At stage 15, the serving gNB-CU $202_{SV}$ deletes the location session information stored at stage 3. If a new target LMC will not be used, stages 16-18 are skipped. The reason for sending the XnAP Location Session Update message to the source LMC $117_S$ via the serving gNB-CU $202_{SV}$ in stages 12-14 and for deleting the location session information in the serving gNB-CU $202_{SV}$ at stage 15 only after stage 13 has occurred is similar to the explanation provided for stage 12 in FIG. 17.

The following stages 16-18 are performed for Case B and Case C.

At stage 16, if a new target LMC $117_T$ will be used due to either handover to the target gNB $110_T$ (case C) or change of the source LMC $117_S$ to the target LMC $117_T$ (case B), the source LMC $117_S$ sends an XnAP Location Session Transfer message (or some other XnAP message), intended for the target LMC $117_T$, to the source gNB-CU $202_S$ in an F1AP container message. The XnAP message includes the target LMC $117_T$ identity, the serving gNB identity for case B or the target gNB identity for case C (representing the latest serving gNB for the UE), the original Nlmf_Location_DetermineLocation Request service operation from stage 7 in FIG. 16 if this is known, the LCS Event Report message received in stage 5, the location capabilities of the UE 102 if known and the current status of the positioning session and event reporting including the status of any measurements for case C. The source LMC $117_S$ may then release all resources for the location request. For case B (change of a serving LMC from the source LMC $117_S$ to target LMC $117_T$), the XnAP Location Session Transfer message could include or be based on the Nlmf_LocationContextTransfer Request service operation used for a change of serving LMF for a periodic or triggered MT-LR as described in 3GPP TS 23.273. In addition, an acknowledgment might be returned from the target LMC $117_T$ to the source LMC $117_S$ after stage 18, as for the procedure for a change of LMF in 3GPP TS 23.273.

At stage 17, the source gNB-CU $202_S$ forwards the XnAP Location Session Transfer message to the target gNB-CU $202_T$.

At stage 18, the target gNB-CU $202_T$ forwards the XnAP Location Session Transfer message to the target LMC $117_T$ in an F1AP transfer message. As an alternative, the XnAP Location Session Update message in stage 14 and the XnAP Location Session Transfer message in stages 16 and 18 can be mapped into corresponding F1AP messages which are transferred instead of these XnAP messages in these stages.

The following stages 19-23 are performed for Case A, Case B and Case C.

At stages 19-20, if an Event Report acknowledgment was not yet returned to the UE 102, the source LMC $117_S$ (Case A or Case C) or the target LMC $117_T$ (Case B or Case C) sends an Event Report acknowledgment to the serving gNB-CU $202_{SV}$ (Case A or B) (at stages 20a or 20b) or the target gNB-CU $202_T$ (case C) (at stages 20c or 20d) for transfer to the UE 102 at step 20 (at stages 21a or 21b). The Event Report acknowledgment includes a new routing identifier indicating either the current LMC if this will act as a serving LMC or an indication of a default (any) LMC. If the current LMC (source LMC $117_S$ or target LMC $117_T$) will act as serving LMC, then change of LMC due to handover to a new gNB may occur following stage 20 but cannot be allowed to change the serving LMC as the UE 102 will not be aware of the change of LMC after stage 20.

At stage 21, the positioning session starts or continues, as described in FIG. 13, using the serving gNB $110_{SV}$ (Case A or B) or target gNB $110_T$ (case C) and either the source LMC $117_S$ (Case A or C) or target LMC $117_T$ (Case B or C) to obtain a location estimate for the UE 102. For continuation of the positioning session after handover (Case C) by the source LMC $117_S$, the target gNB-CU $202_T$ should forward any LPP message received from the UE 102 for this location session to the source LMC $117_S$ via the source gNB-CU $202_S$ and the source LMC $117_S$ should send any LPP message intended for the UE 102 to the target gNB-CU $202_T$ via the source gNB-CU $202_S$ for forwarding to the UE 102. For continuation after handover by the target LMC $117_T$, the target LMC $117_T$ should notify any gNB-DU/TRP 204/112 from which UL location measurements were requested in stage 6 but not yet received to send a location response to the target LMC $117_T$ (via the target gNB-CU $202_T$) instead of the source LMC $117_S$.

At stage 22, the current LMC (source LMC $117_S$ or target LMC $117_T$) sends an Event Report for the UE 102 to the current serving gNB-CU (target gNB-CU $202_T$ (at stages 23a or 23b) or serving gNB-CU $202_{SV}$ (at stages 23c or 23d) in FIG. 18). The current LMC includes an indication, visible to the current serving gNB-CU, that the location session has ended. The current LMC may then release all resources for the location session if not acting as a serving LMC.

At stage 23, the current serving gNB-CU (target gNB-CU $202_T$ or serving gNB-CU $202_{SV}$ in FIG. 18) forwards the Event Report to the AMF 115 (at stages 24a or 24b) inside an NGAP UL Transfer message for onward transfer to an (H-)GMLC (e.g. GMLC 125) and external client (e.g. external client 130). The current serving gNB-CU then deletes the location session information stored at stage 3 or stage 9.

It is noted that the Event Report sent at stages 22 and 23 would be forwarded by AMF 115 to an external client 130 (or possibly AF 131) via a (H-)GMLC (e.g. GMLC 125) and/or NEF (e.g. NEF 127) using control plane signaling. However, as described for stage 19 in FIG. 16, the current LMC (source LMC $117_S$ or target LMC $117_T$) or the gNB-CU connected to the current LMC could send the Event Report to the external client 130 (or AF 131) at a user plane level and bypass other entities such as AMF 115, GMLC 125 and NEF 127, which could enable reduced latency.

The procedure in stages 7-18 in FIG. 18 is also valid for further handovers from the initial (or most recent) target gNB to additional target gNBs. In this case, the serving gNB-CU $202_{SV}$ and source LMC $117_S$ in FIG. 18 correspond, respectively, to the serving gNB-CU and LMC prior to handover, and the target gNB-CU $202_T$ and target LMC $117_T$ in FIG. 18 (when there is a change of LMC) correspond, respectively, to the new serving gNB-CU and new LMC after handover.

The procedures described in FIGS. 17 and 18 can be simplified by not changing an LMC following handover of a UE 102 while a positioning session is ongoing. A positioning session would typically take less than 30 seconds (e.g. which is the maximum time allowed for location of an E911 call in the US) and for low latency user cases would only take a few seconds or less than one second. This has two implications. First, handover will be a rare event with more than one handover extremely rare. Second, the UE 102 will not have moved very far (e.g. at 100 kph, a UE 102 would move 833 meters in 30 seconds and 56 meters in 2 seconds). Thus, although an LMC might have to request additional UL or DL measurements applicable to a new serving cell for the UE 102, it may be unlikely that an LMC would not have connectivity to any new neighbor gNBs needed to support these new measurements or would not be configured with, or not have access to, associated assistance data to enable UE location determination from the new measurements.

If a change of LMC is not supported following a handover of a UE 102 during a positioning session, the procedure in FIG. 17 can be simplified by removing stages 7, 13, 14, and 17b. Similarly, the procedure in FIG. 18 can be simplified by removing stage 10, stages 16-18 for case C and stages 19b and 22b.

The procedures described in FIGS. 17 and 18 assume that UE handover is Xn based and thus occurs directly between gNBs 110 and not via an AMF 115. For N2 based handover of a UE 102 via an AMF 115 (e.g. as described in 3GPP TS 23.502), the source gNB $110_S$ can be configured with information indicating whether any location session can continue or needs to be aborted. Aborting the location session could be required if there is no Xn connectivity (direct or indirect) between the source gNB $110_S$ and the new target gNB $110_T$ or if the current serving AMF 115 for an immediate location request (NI-LR, MT-LR or MO-LR) needs to change. A change of serving AMF 115 also causes aborting of a request for an immediate location when an LMF 120 is used, so aborting location for an LMC 117 need not degrade service compared to use of an LMF 120 if there is extensive NG-RAN Xn interconnectivity.

If the source gNB $110_S$ decides to continue the location session (and assuming there is NG-RAN Xn interconnectivity between the source gNB $110_S$ and target gNB $110_T$), the procedures in FIGS. 17 and 18 can continue to be used with one difference. The difference is that the location session information sent to the target gNB-CU $202_T$ at stage 6 in FIG. 17 or at stage 8 in FIG. 18 can be included as part of the Source to Target transparent container for stage 1 of the N2 handover procedure in 3GPP TS 23.502.

If the source gNB $110_S$ decides to abort the location session, an abort message can be sent to the current LMC and the current LMC may then abort positioning and return whatever location estimate for the target UE 102 is available to the source gNB $110_S$ for forwarding to the current serving AMF 115. If the source AMF 115 does not change, an NI-LR, MT-LR or MO-LR request can then be completed by the AMF 115. If the source AMF 115 changes as a result of the handover, the source AMF 115 may itself abort the location request before receiving a location estimate from the source gNB $110_S$ or may wait for the location estimate if there is time (depending on how fast the handover proceeds).

As described in 3GPP TS 23.273, support of location privacy for a target UE 102 is a 5GCN function supported by UE subscription data in the UDM, verification and enforcement of privacy by an NEF or GMLC and, when subscribed, notification and verification of privacy with a target UE 102 prior to returning location information to an external client or AF. These functions are not restricted or impacted by using an LMC 117 in the NG-RAN to locate a target UE 102 instead of an LMF 120 in the 5GCN. For example, the procedures described here for location of a target UE 102 using an LMC 117 include stages for supporting privacy as follows: MT-LR for immediate location, at stages 1, 3 and 8 in FIG. 11; and MT-LR for deferred location at stages 1, 5 and 19 in FIG. 16.

When an LMF 120 is used to support location of a target UE 102 as defined in 3GPP TS 23.273, LPP and SS messages exchanged between the target UE 102 and either the serving AMF 115 or LMF 120 to support the location would be security protected by ciphering at the NAS level and possibly AS level.

When an LMC 117 in the NG-RAN 135 is used to support location of a target UE 102 as described here, LPP and SS messages exchanged between the target UE 102 and the LMC 117 to support the location would be security protected by ciphering at the AS level provided these are sent after AS security has been activated by the serving gNB 110-1. For a UE transitioning from CM-IDLE state to CM-CONNECTED state, AS security can be activated after the serving gNB 110-1 receives an NGAP Initial Context Setup Request message from the serving AMF 115, as described in 3GPP TS 38.300 and 38.413. This occurs as part of a UE Triggered service request or Network Triggered service request as defined in 3GPP TS 23.502 after the UE 102 has entered RRC Connected state and has sent a NAS Service Request to the serving AMF 115. AS ciphering can also remain active if the serving gNB 110-1 maintains the UE 102 in RRC and CM CONNECTED states for the duration of the location session (e.g. due to being aware of the start and end of the location session as described in FIGS. 17 and 18).

For the MT-LR, NI-LR and MO-LR procedures described here in FIGS. 11-13 and 15 and for the initial activation of a deferred MT-LR for stages 1-12 in FIG. 16, the signaling between the UE 102 and LMC 117 occurs after a UE Triggered Service Request or Network Triggered Service Request has occurred, so AS security would be active. For RAN initiated location as described here in FIG. 14, the serving gNB 110-1 can also restrict use to cases where AS security is already active (which should cover almost all instances where a UE location is needed). For sending event reports for a deferred MT-LR for periodic or triggered location and for subsequent return of an event report acknowledgment and possible positioning of the UE 102 as described for stages 16-18 in FIG. 16, AS security would be active if the UE is already in CM CONNECTED state prior to stages 16-18, e.g. by performing a UE Triggered Service Request in addition to establishing an RRC Connection at stage 15 in FIG. 16. The UE Triggered Service Request is required for event reporting for triggered or periodic location using an LMF 120 as described in clause 6.3.1 in 3GPP TS 23.273, so usage of this for an LMC 117 would not introduce extra signaling overhead compared to use of an LMF 120. However, this may not be desirable as the LMC 117 is intended to reduce signaling and associated latency.

One way to avoid the extra overhead of a complete UE Triggered Service Request for event reporting for periodic or triggered location would be to maintain the UE 102 in RRC INACTIVE state when not otherwise reporting events or engaged in other signaling or data transfer activity. This would allow a more efficient transition into RRC and CM CONNECTED states with AS security as described in 3GPP TS 38.300. The serving gNB 110-1, being initially aware of the periodic or triggered location session (e.g. as described in FIG. 18) or being informed about this by the initial serving AMF 115, could retain information indicating a preference for the target UE 102 to use RRC INACTIVE state rather than RRC IDLE state.

If the UE 102 does transition into RRC IDLE state between consecutive event reports and does not perform a full UE Triggered Service Request before sending the next event report as discussed above, then sending of the event report, the event report acknowledgment and any positioning messages at stages 16-18 in FIG. 16 would not be protected by AS security. To provide security for this case, messages transferred between the target UE 102 and LMC 117 might be ciphered according to security information stored in the UE 102 and LMC 117 when the deferred periodic or triggered location was first activated. For example, the LMC 117 might transfer a ciphering key to the UE 102 at stage 9 in FIG. 16 (while AS security is still active) which the LMC 117 might assign itself or might receive from the AMF 115 at stage 7 in FIG. 16. Such ciphering between the UE 102 and LMC 117 would require the LMC 117 to act as a serving LMC in which the LMC 117 maintains state information for the periodic or triggered location and provides a deferred routing identifier to the UE 102 indicating an identifier for the LMC 117.

Figure 19:
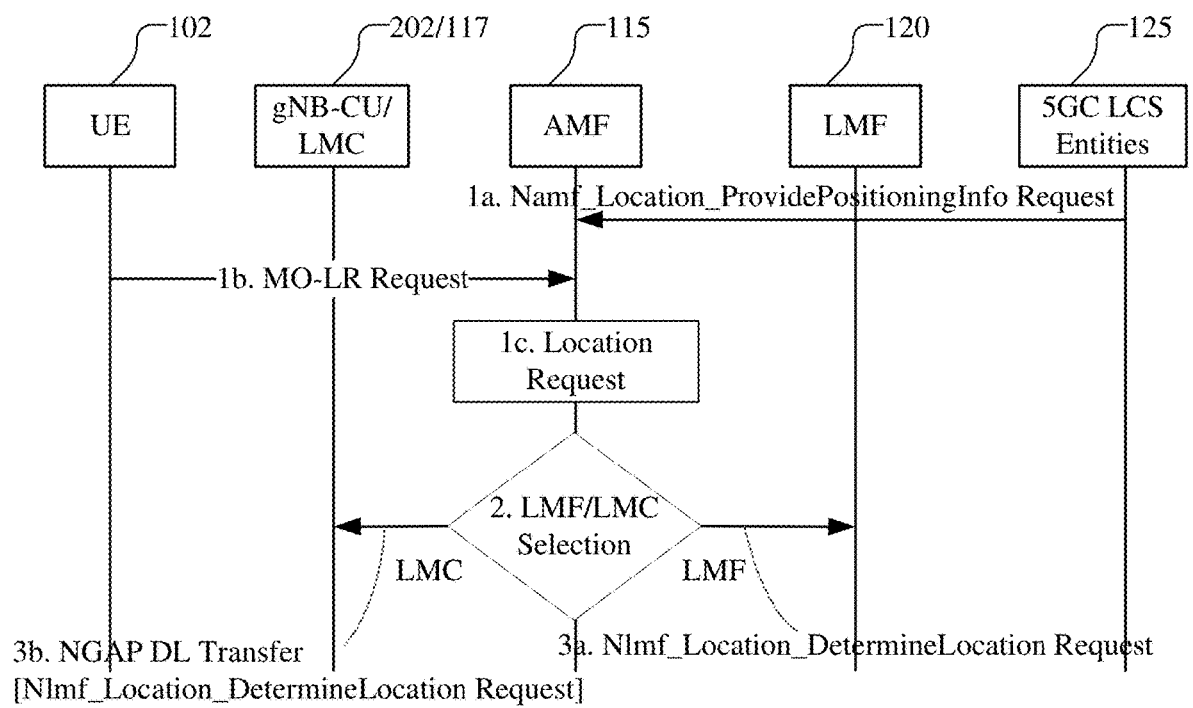
FIG. 19 illustrates a procedure in which an LMC and LMF coexist and the AMF determine a suitable LMF or LMC for location estimation of the target UE or for providing assistance data to the target UE.

FIG. 19 illustrates a procedure in which an NG-RAN LMC 117 and 5GCN LMF 120 coexist and the AMF 115 determine a suitable 5GCN LMF 120 or a NG-RAN LMC 117 for location estimation of the target UE 102 or for providing assistance data to the target UE 102. As shown in FIG. 4 and FIGS. 11-16 above, a 5GCN LMF 120 and NG-RAN LMC 117 may coexist in a network. The LMF 120 selection criteria defined in 3GPP TS 23.273 can consider the availability of NG-RAN LMCs.

At stage 1 in FIG. 19, the serving AMF 115 receives a Namf_Location_ProvidePositioningInfo Request from LCS entities 125 (in case of MT-LR) (at stage 1a), an emergency registration for an IMS emergency call from the UE (in case of an NI-LR) (at stage 1c), or an SS MO-LR Request (in case of an MO-LR) (at stage 1b). The AMF 115 instigates the location procedures in response.

At stage 2, in all cases, the AMF 115 can determine a suitable 5GCN LMF 120 or a NG-RAN LMC 117 for location estimation of the target UE 102 or for providing assistance data to the target UE 102.

At stage 3, the serving AMF 115 sends an Nlmf_Location_DetermineLocation Request to the selected 5GCN LMF 120 (at stage 3a) or to the selected LMC 117 inside an NGAP DL Transfer message.

The above describes the feasibility of, and specification impact for, location management functionality in the NG RAN (referred to as Location Management Component (LMC)). Some main observations and conclusions can be summarized as follows.

1.) An LMC 117 may be part of a gNB-CU 202 or may be a separate entity within a gNB 110 connected to the gNB-CU 202 via F1 interface. 2.) Existing location protocols (developed by 3GPP for 5GCN location services and NR positioning support) may be reused for positioning using an LMC 117 in the NG-RAN 135 (i.e., 3GPP TS 29.572, 3GPP TS 37.355, 3GPP TS 24.080, 3GPP TS 38.455). These enable an AMF 115 to treat an LMC 117 similarly to an LMF 120 and an LMC 117 to function similarly to an LMF 120. 3.) The impact on existing RAN protocols to support an LMC 117 in the NG-RAN 135 may be limited mainly to the specification of a new UL/DL transfer message container in NGAP, RRC, XnAP, and F1AP protocols, which can transport the various location protocol PDUs in item 2 above. 4.) The location services procedures for an immediate MT-LR, NI-LR, MO-LR and deferred MT-LR can also be supported with a RAN LMC. The differences compared to the corresponding 5GCN location services procedures using an LMF 120 as specified in 3GPP TS 23.273 are mainly in the UE positioning procedures (LPP, NRPPa), which can remain functionally identical to those using an LMF 120 but have greater efficiency of signaling. 5.) UE mobility during either an immediate location or a deferred location can be supported via two alternatives: (a) the source LMC for the UE may be changed to a new (target) LMC, or (b) may remain unchanged. 6.) For supporting UE mobility, state information for a location session can be maintained only in the current LMC and in the current serving gNB-CU. The LMC can be updated with the identity of the current serving gNB and the serving gNB-CU remains aware of the current LMC. 7.) To support location session state information update and transfer according to item 6, the following XnAP changes could be introduced: (a) Location Session information can be included in the XnAP Handover Request message, and (b) new XnAP procedures can be defined to update and transfer location session information between source and target gNB-CUs. 8.) Location privacy is a 5GCN function as specified in 3GPP TS 23.273 and is not restricted or impacted by using an LMC in the NG-RAN to locate a target UE instead of an LMF in the 5GCN. 9.) LPP and SS messages exchanged between the target UE and the LMC to support the location can be security protected by ciphering at the AS level provided these are sent after AS security has been activated by the serving gNB. 10.) An NG-RAN LMC and 5GCN LMF can coexist in a network by considering the availability of LMCs in the LMF selection procedures performed by an AMF.

Figure 20:
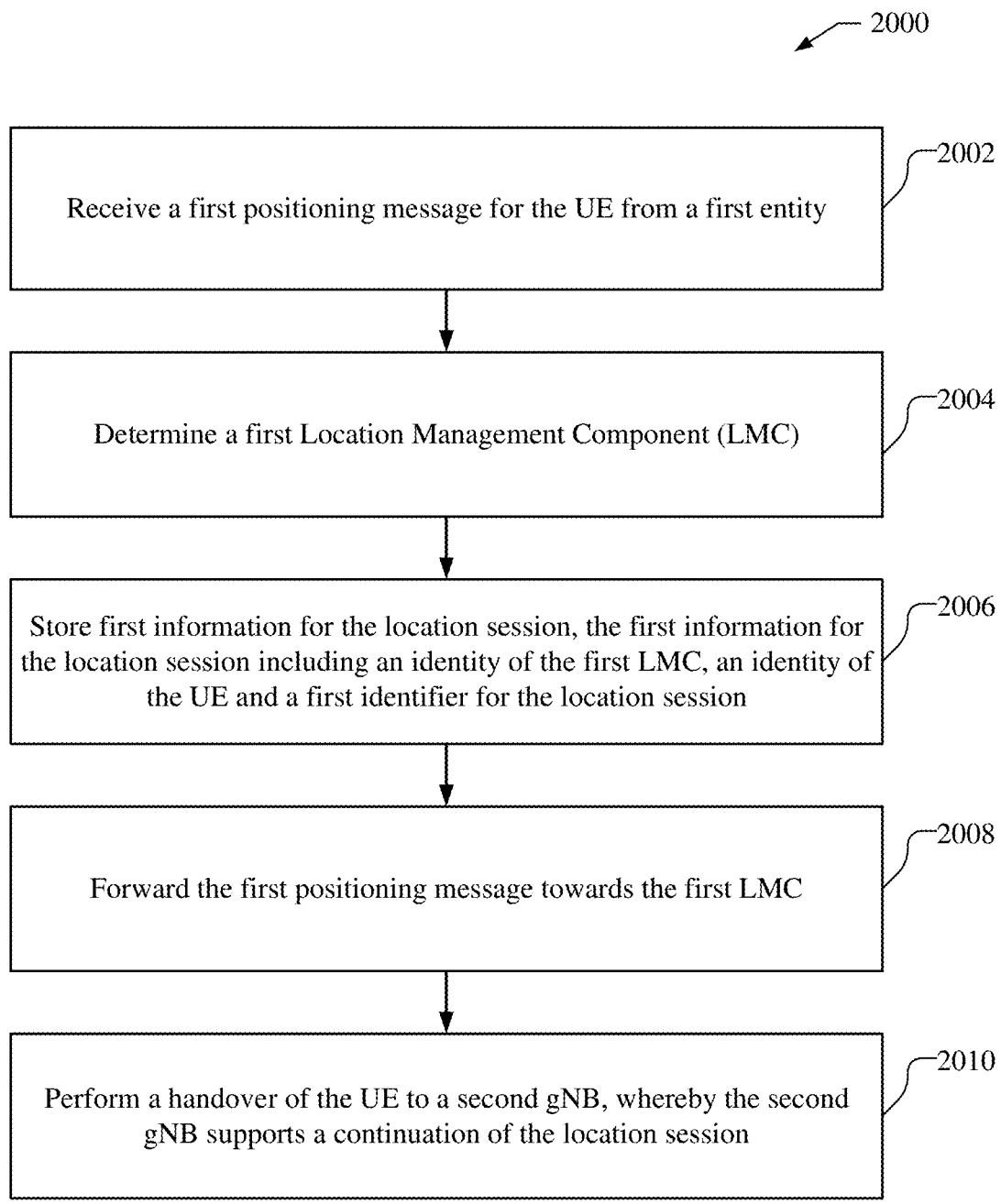
FIG. 20 shows a process flow illustrating a method for supporting a location session for a UE performed by a source CU.

FIG. 20 shows a process flow 2000 illustrating a method for supporting a location session for a user equipment (UE), e.g., UE 102, performed by a first Central Unit (CU), e.g., source gNB-CU $202_S$ in FIG. 17 or source gNB-CU $202_S$ or serving gNB-CU $202_{SV}$ in FIG. 18, in a first New Radio (NR) node B (gNB) in a radio access network (RAN), such as NG-RAN 135.

Process flow 2000 may start at block 2002, where a CU receives a first positioning message for the UE from a first entity, e.g., as discussed at stage 1 in FIG. 17 or stage 1 in FIG. 18. At block 2004, the CU determines a first Location Management Component (LMC), e.g., as discussed at stage 2 in FIG. 17 or stage 2 in FIG. 18. At block 2006, the CU stores first information for the location session, the first information for the location session including an identity of the first LMC, an identity of the UE and a first identifier for the location session, e.g., as discussed at stage 2 in FIG. 17 or stage 3 in FIG. 18. At block 2008, the CU forwards the first positioning message towards the first LMC, e.g., as discussed at stage 3 in FIG. 17 or stage 4 at FIG. 18. At block 2010, the CU performs a handover of the UE to a second gNB, whereby the second gNB supports a continuation of the location session, e.g., as discussed at stages 5-12 in FIG. 17 or stages 7-15 (or 7-18) in FIG. 18.

In one implementation, the first gNB, e.g., serving gNB $110_{SV}$ or source gNB $110_S$, is a serving gNB for the UE before the handover and the second gNB, e.g., target gNB $110_T$, is a serving gNB for the UE after the handover, as illustrated in FIGS. 17 and 18.

In one implementation, the first LMC is part of the first CU, wherein forwarding the first positioning message towards the first LMC is internal to the first CU, e.g., as discussed in FIGS. 17 and 18.

In one implementation, the first LMC is part of the first gNB and separate from the first CU, wherein forwarding the first positioning message towards the first LMC comprises sending the first positioning message to the first LMC in an F1 Application Protocol (F1AP) transfer message, e.g., as discussed in FIGS. 17 and 18.

In one implementation, the first LMC is part of a third gNB, such as gNB $110_S$ in FIG. 18, wherein forwarding the first positioning message towards the first LMC comprises sending the first positioning message to the third gNB in an Xn Application Protocol (XnAP) transfer message, e.g., as discussed in FIG. 18.

In one implementation, forwarding the first positioning message towards the first LMC further comprises forwarding at least some of the first information for the location session along with the first positioning message towards the first LMC, e.g., as discussed in stage 3 of FIG. 17 and stage 4 of FIG. 18.

In one implementation, the process may further include the CU receiving a second positioning message from the first LMC, the second positioning message including the first identifier for the location session. The CU may send the second positioning message to the UE, based on the first information for the location session.

In one implementation, the process may further include the CU receiving a second positioning message from the UE, the second positioning message including the first identifier for the location session. The CU may send the second positioning message to the first LMC, based on the first information for the location session.

In one implementation, the CU performs the handover to the second gNB by determining to handover the UE to the second gNB, sending a handover request message to the second gNB, the handover request message comprising the first information for the location session, and completing the handover of the UE to the second gNB, as discussed at stages 5, 6, and 9 of FIG. 7 and stages 7, 8, and 11 of FIG. 18. The CU further receives a location session update message from the second gNB, the location session update message comprising an identity of the second gNB, sends the location session update message to the first LMC, and deletes the first information for the location session, e.g., as discussed at stages 10, 11, and 12 of FIG. 17 or stages 12, 13, and 15 of FIG. 18.

In one implementation, a second CU, such as gNB-CU $202_T$, in the second gNB receives the handover request message, wherein the second CU stores second information for the location session, the second information for the location session including at least part of the first information for the location session, wherein the second CU sends the location session update message to the first CU, e.g., as discussed at stages 6, 7, and 10 of FIG. 17 and stages 8, 9, and 12 of FIG. 18.

In one implementation, wherein the second CU assigns a second identifier for the location session, the second identifier for the location session different to the first identifier for the location session, the second information for the location session including the second identifier for the location session, the location session update message may include the second identifier for the location session, e.g., as discussed at stage 8 of FIG. 17 and stages 10 of FIG. 18.

In one implementation, wherein the second CU determines a second LMC, the second LMC different to the first LMC, the second information for the location session including an identity of the second LMC, the location session update message may include the identity of the second LMC, e.g., as discussed at stage 8 of FIG. 17 and stages 10 of FIG. 18. In one implementation, the second LMC obtains a location estimate for the UE.

In one implementation, the first entity is an Access and Mobility Management Function (AMF), such as AMF 115, wherein the first positioning message is an Nlmf_Location_DetermineLocation Request service operation, wherein the first positioning message is received inside an NGAP DL Transfer message, e.g., as discussed at stage 7 of FIG. 16 and stage 1 of FIG. 17.

In one implementation, the process may further include the CU receiving an Nlmf_Location_DetermineLocation Response service operation from the first LMC, wherein the Nlmf_Location_DetermineLocation Response service operation comprises a location estimate for the UE, e.g., as discussed at stage 3 in FIG. 14. The CU may send the Nlmf_Location_DetermineLocation Response service operation to the AMF inside an NGAP UL Transfer message, e.g., as discussed at stage 11 of FIG. 16. The CU may delete the first information for the location session, e.g., as discussed at stage 12 of FIG. 17.

In one implementation, the first entity is the UE, wherein the first positioning message comprises an event report for periodic or triggered location of the UE and a routing identifier, the routing identifier indicating any LMC or a serving LMC, and the process flow 2000 may further comprise determining the first LMC based at least in part on the routing identifier, e.g., as discussed at stages 1 and 2 of FIG. 18.

In one implementation, the routing identifier indicates the serving LMC, wherein the first LMC is different from the serving LMC, wherein forwarding the event report towards the first LMC comprises sending the event report and an indication of the first LMC to the serving LMC, e.g., as discussed at stages 1 and 2 of FIG. 18.

In one implementation, the serving LMC sends a location session transfer message to the first LMC, the location session transfer message comprising the event report and a current status of periodic or triggered event reporting for the UE, e.g., as discussed at stage 13 of FIG. 18.

In one implementation, location related signaling may be transported in container messages of the corresponding application protocols, including an Radio Resource Control (RRC) container for LPP messages on an air interface, NG-AP container for location related messages on an NG interface, Xn-AP container for location related messages on an Xn interface, and F1AP container for location related messages on an F1 interface.

In one implementation, the first LMC obtains a location estimate for the UE.

Figure 21:
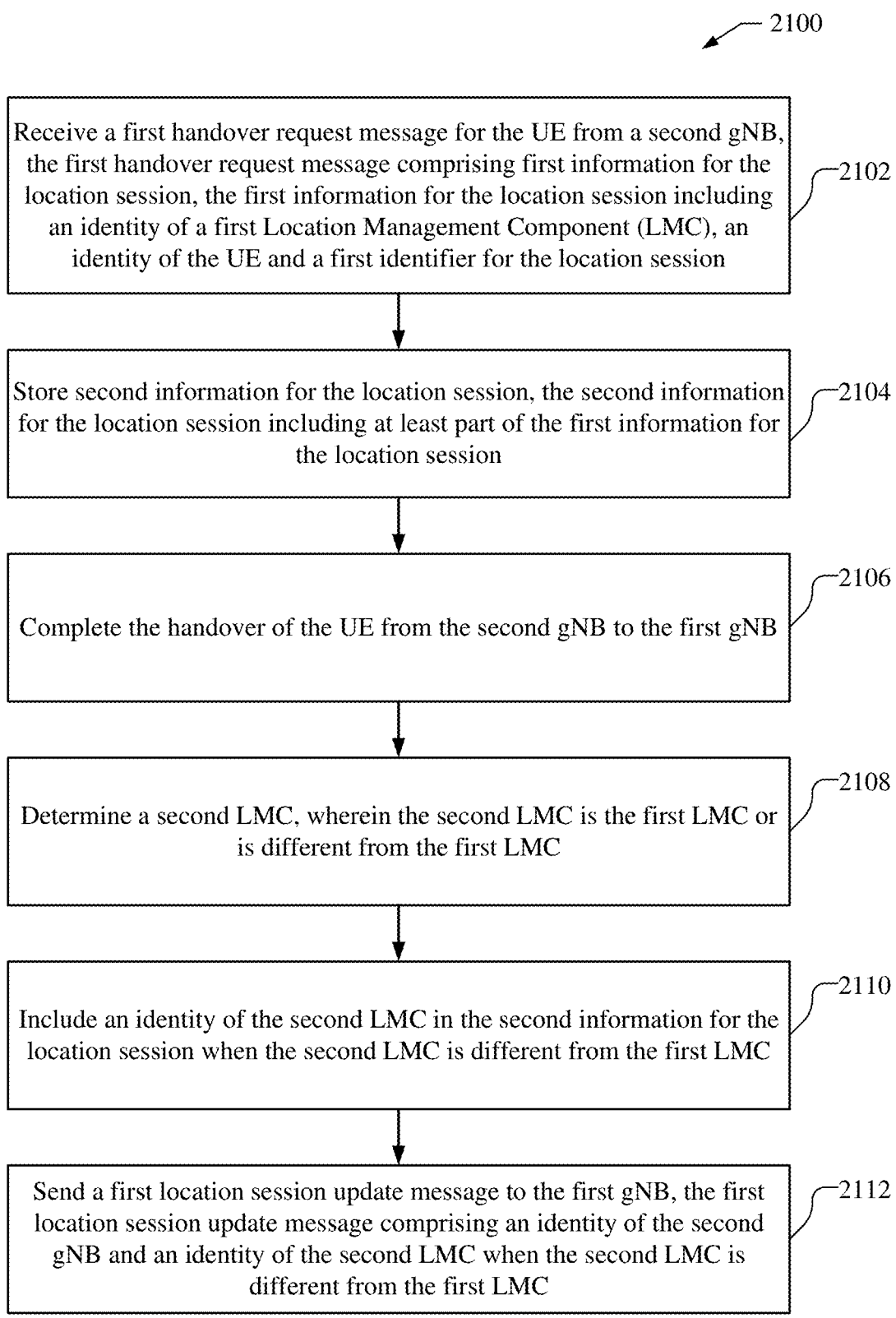
FIG. 21 shows a process flow illustrating a method for supporting a location session for a UE performed by a target CU.

FIG. 21 shows a process flow 2100 illustrating a method for continuing a location session for a user equipment (UE), e.g., UE 102, performed by a first Central Unit (CU), e.g., target gNB-CU 202$_T$ in FIGS. 17 and 18, in a first New Radio (NR) node B (gNB) in a radio access network (RAN), such as NG-RAN 135.

Process flow 2100 may start at block 2102, where a CU receives a first handover request message for the UE from a second gNB, e.g., gNB 202$_S$ or 202$_{SV}$, the first handover request message comprising first information for the location session, the first information for the location session including an identity of a first Location Management Component (LMC), an identity of the UE and a first identifier for the location session, e.g., as discussed at stage 6 in FIG. 17 or stage 8 in FIG. 18. At block 2104, the CU stores second information for the location session, the second information for the location session including at least part of the first information for the location session, e.g., as discussed at stage 7 in FIG. 17 or stage 9 in FIG. 18. At block 2106, the CU completes the handover of the UE from the second gNB to the first gNB, e.g., as discussed at stage 9 in FIG. 17 or stage 11 in FIG. 18. At block 2108, the CU determines a second LMC, wherein the second LMC is the first LMC or is different from the first LMC, e.g., as discussed at stage 8 in FIG. 17 or stage 10 in FIG. 18. At block 2110, the CU includes an identity of the second LMC in the second information for the location session when the second LMC is different from the first LMC, e.g., as discussed at stage 8 in FIG. 17 or stage 10 in FIG. 18. At block 2112, the CU sends a first location session update message to the first gNB, the first location session update message comprising an identity of the second gNB and an identity of the second LMC when the second LMC is different from the first LMC, e.g., as discussed at stage 10 in FIG. 17 or stage 12 in FIG. 18.

In one implementation, the second gNB, e.g., serving gNB 110$_{SV}$ or source gNB 110$_S$, is a serving gNB for the UE before the handover and the first gNB, e.g., target gNB 110$_T$, is a serving gNB for the UE after the handover, as illustrated in FIGS. 17 and 18.

In one implementation, the process further includes the CU determining a second identifier for the location session, wherein the second identifier for the location session is the same as the first identifier for the location session or is different from the first identifier for the location session, e.g., as discussed at stage 8 of FIG. 17 and stage 10 of FIG. 18. The CU may include the second identifier for the location session in both the second information for the location session and the first location session update message sent to the second gNB when the second identifier for the location session is different from the first identifier for the location session, e.g., as discussed at stages 8 and 10 of FIG. 17 and stages 10 and 12 of FIG. 18.

In one implementation, a second CU in the second gNB receives the first location session update message sent by the first CU, wherein the second CU sends the first location session update message to the first LMC, e.g., as discussed at stage 11 of FIG. 17 and stages 13 and 14 of FIG. 18.

In one implementation, the process further includes the CU receiving a positioning message from the second LMC, the positioning message including the second identifier for the location session. The CU may send the positioning message to the UE, based on the second information for the location session.

In one implementation, the positioning message comprises an event report acknowledgment for periodic or triggered location or an LPP message, e.g., as discussed at stage 22b in FIG. 18.

In one implementation, the process further includes the CU receiving a positioning message from the UE, the positioning message including the second identifier for the location session, e.g., as discussed at stage 16 of FIG. 16. The CU may send the positioning message to the second LMC, based on the second information for the location session, e.g., as discussed at stage 16 of FIG. 16.

In one implementation, the process further include the CU determining to handover the UE to a third gNB, as discussed in FIGS. 17 and 18. The CU may send a second handover request message to the third gNB, the second handover request message comprising the second information for the location session. The CU may complete the handover of the UE to the third gNB. The CU may receive a second location session update message from the third gNB, the second location session update message comprising an identity of the third gNB. The CU may send the second location session update message to the second LMC. The CU may delete the second information for the location session.

In one implementation, the process may further include the CU receiving a positioning message intended for a serving Access and Mobility Management Function, e.g., AMF 115, for the UE from the second LMC and an indication of termination of the location session, e.g., as discussed at stage 17b in FIG. 17 or at stage 22b in FIG. 18. The CU may send the positioning message to the serving AMF for the UE, e.g., as discussed at stage 18 in FIG. 17 or stage 23a in FIG. 18. The CU may delete the second information for the location session, e.g., as discussed at stage 18 in FIG. 17 or stage 23a in FIG. 18.

In one implementation, the positioning message comprises an event report for periodic or triggered location or an Nlmf_Location_DetermineLocation Response service operation, as discussed at stages 1 and 6 in FIG. 17 or stages 1 and 8 of FIG. 18.

In one implementation, location related signaling may be transported in container messages of the corresponding application protocols, including an Radio Resource Control (RRC) container for LPP messages on an air interface, NG-AP container for location related messages on an NG interface, Xn-AP container for location related messages on an Xn interface, and F1AP container for location related messages on an F1 interface.

In one implementation, the second LMC obtains a location estimate for the UE.

Figure 22:
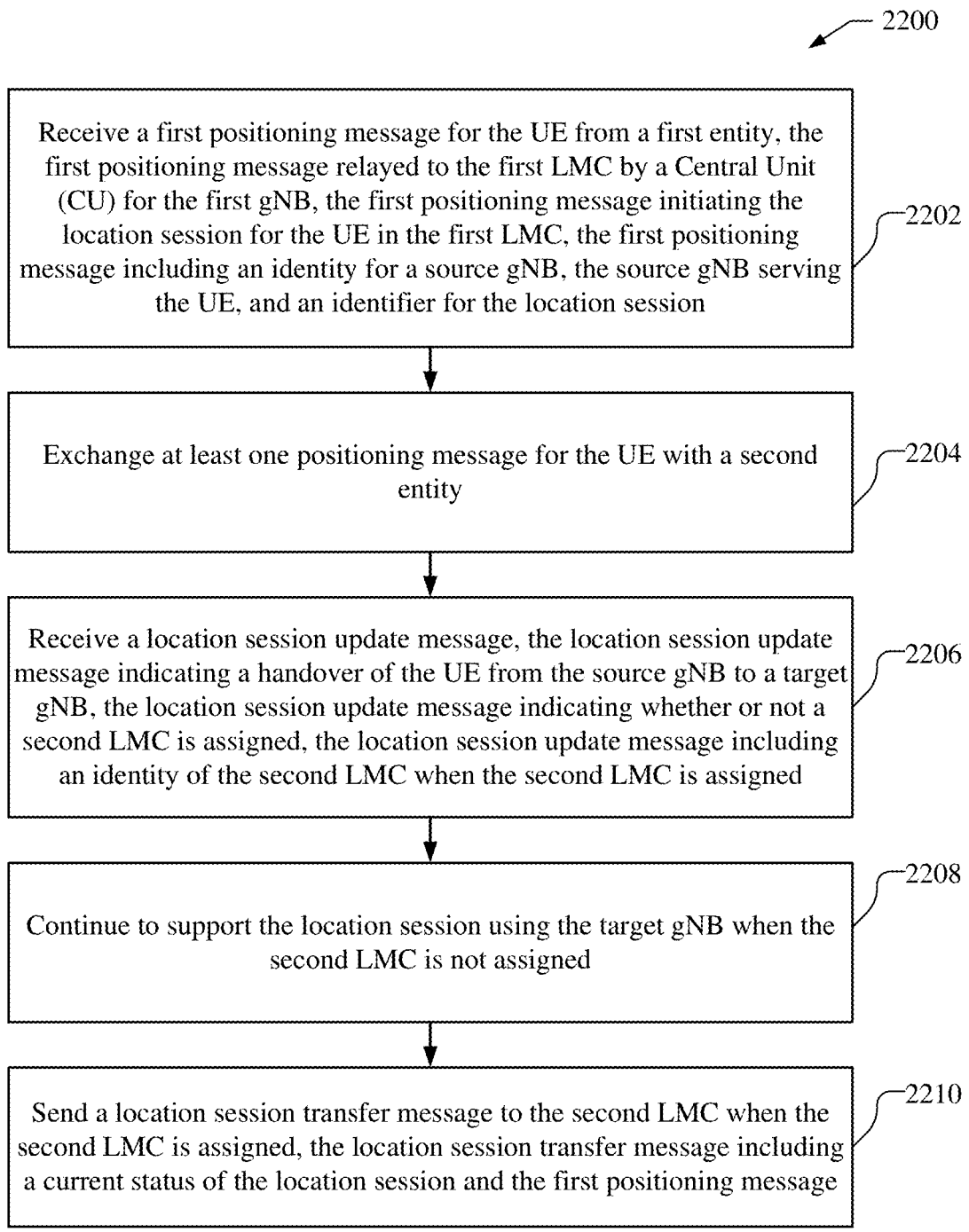
FIG. 22 shows a process flow illustrating a method for supporting a location session for a UE performed by a source or target LMC.

FIG. 22 shows a process flow 2200 method for supporting a location session for a user equipment (UE), e.g., UE 102, performed by a first Location Management Component (LMC), e.g., source LMC $117_S$ or target LMC $117_T$ in FIGS. 17 and 18, in a first New Radio (NR) node B (gNB) in a radio access network (RAN), such as NG-RAN 135.

Process flow 2200 may start at block 2202, where the first LMC receives a first positioning message for the UE from a first entity, the first positioning message relayed to the first LMC by a Central Unit (CU) for the first gNB, the first positioning message initiating the location session for the UE in the first LMC, the first positioning message including an identity for a source gNB, the source gNB serving the UE, and an identifier for the location session, e.g., as discussed at stages 3 and 15 of FIG. 17 or stages 5 and 18 of FIG. 18. At stage 2204, the first LMC transmits at least one positioning message for the UE to a second entity, e.g., as discussed at stages 4 and 16 of FIG. 17 or stages 6 and 21 at FIG. 18. In an alternative implementation, instead of transmitting at least one positioning message in stage 2204, the first LMC may receive at least one positioning message for the UE to a second entity, e.g., as discussed at stages 4 and 16 of FIG. 17 or stages 6 and 21 at FIG. 18. At stage 2206, the first LMC receives a location session update message, the location session update message indicating a handover of the UE from the source gNB to a target gNB, the location session update message indicating whether or not a second LMC is assigned, the location session update message including an identity of the second LMC when the second LMC is assigned, as discussed at stage 11 of FIG. 17 or stage 14 of FIG. 18. At stage 2208, the first LMC continues to support the location session using the target gNB when the second LMC is not assigned, as discussed at stage 8 and 17a of FIG. 17 or stage 10 and 19d of FIG. 18. At stage 2210, the first LMC sends a location session transfer message to the second LMC when the second LMC is assigned, the location session transfer message including a current status of the location session and the first positioning message, as discussed at stage 13 of FIG. 17 or stage 16 of FIG. 18.

In one implementation, the relaying is internal to the CU when the first LMC is part of the CU, wherein the relaying uses an F1 Application Protocol (F1AP) transfer message when the LMC is not part of the CU, e.g., as discussed in FIGS. 17 and 18.

In one implementation, the first LMC receives the first positioning message from the first entity via the source gNB when the first gNB is different from the source gNB, e.g., as discussed in FIGS. 17 and 18.

In one implementation, the first entity is an Access and Mobility Management Function (AMF), e.g., such as AMF 115, wherein the first positioning message comprises an Nlmf_Location_DetermineLocation Request service operation, e.g., as discussed at stage 3 of FIG. 17.

In one implementation, the first entity is the UE, wherein the first positioning message comprises an event report for periodic or triggered location of the UE, e.g., as discussed at stage 5 of FIG. 17.

In one implementation, the first entity is a third LMC, wherein the first positioning message comprises a location session transfer message, wherein the location session transfer message includes a second positioning message, e.g., as discussed at stage 18 of FIG. 18.

In one implementation, the second positioning message comprises an event report for periodic or triggered location of the UE, wherein the source gNB receives the event report from the UE and an indication of the third LMC, wherein the source gNB determines the first LMC, wherein the source gNB sends the event report to the third LMC with an indication of the first LMC, e.g., as discussed at stage 18 of FIG. 18.

In one implementation, the location session transfer message is sent by the third LMC in response to a handover of the UE from a second gNB to the source gNB, wherein the source gNB determines the first LMC, wherein the source gNB sends a location session update message to the third LMC via the second gNB, the location session update message including an identity of the first LMC, e.g., as discussed at stage 15 in FIG. 17 or stage 18 of FIG. 18.

In one implementation, the second positioning message comprises an event report for periodic or triggered location previously sent by the UE or an Nlmf_Location_Determine-Location Request service operation previously sent by a serving Access and Mobility Management Function (AMF) for the UE, e.g., as discussed at stage 15 in FIG. 17 or stage 18 of FIG. 18.

In one implementation, the second entity is the UE, wherein the first LMC transmits the at least one positioning message to the UE by sending a downlink positioning message to the UE via the first CU and the source gNB. The first LMC may further receive an uplink positioning message from the UE via the first CU and the source gNB, e.g., as discussed at FIG. 13.

In one implementation, the second entity is the UE, wherein the first LMC may receive the at least one positioning message to the UE by receiving an uplink positioning message from the UE via the first CU and the source gNB, e.g., as discussed at FIG. 13. The first LMC may further send a downlink positioning message to the UE via the first CU and the source gNB.

In one implementation, the downlink positioning message and the uplink positioning message each include the identifier for the location session, wherein the downlink positioning message is routed by the source gNB to the UE based on the identifier for the location session, wherein the uplink positioning message is routed by the source gNB to the first LMC based on the identifier for the location session, e.g., as discussed at stage 2 of FIG. 17 or stage 2 of FIG. 18.

In one implementation, the downlink positioning message is an LCS Periodic-Triggered Location Invoke message, an event report acknowledgment for periodic or triggered location or an LPP message, e.g., as discussed in FIGS. 17 and 18.

In one implementation, the uplink message is an LCS Periodic-Triggered Location Return Result message, or an LPP message, e.g., as discussed in FIGS. 17 and 18.

In one implementation, the second entity is a Distributed Unit (DU) in a gNB, wherein the first LMC transmits the at least one positioning message to the DU by sending a downlink network positioning message to the DU via the first CU. The first LMC may further receive an uplink network positioning message from the DU via the first CU, e.g., as discussed at FIG. 13.

In one implementation, the second entity is a Distributed Unit (DU) in a gNB, wherein the first LMC may receive an uplink network positioning message from the DU via the first CU, e.g., as discussed at FIG. 13. The first LMC may further transmit the at least one positioning message to the DU by sending a downlink network positioning message to the DU via the first CU.

In one implementation, the downlink network positioning message and the uplink network positioning message each comprise an NRPPa message or an F1AP message capable of mapping to an NRPPa message, e.g., as discussed at FIG. 13.

In one implementation, the first LMC continues to support the location session using the target gNB when the second LMC is not assigned by at least one of sending a downlink positioning message to the UE via the CU and the target gNB; receiving an uplink positioning message from the UE via the CU and the target gNB; sending a downlink network positioning message to a Distributed Unit (DU) in a gNB via the CU; receiving an uplink network positioning message from the DU via the CU; or sending a second positioning message to the first entity via the CU and the target gNB, e.g., as discussed at FIGS. 13, 17, and 18.

In one implementation, the downlink positioning message and the uplink positioning message each comprise an LPP message, wherein the downlink network positioning message and the uplink network positioning message each comprise an NRPPa message or an F1AP message capable of mapping to an NRPPa message, wherein the second positioning message comprises an event report acknowledgment for periodic or triggered location when the first entity comprises the UE or a Nlmf_Location_DetermineLocation Request service operation or an event report for periodic or triggered location when the first entity comprises an AMF, e.g., as discussed at FIGS. 13, 17, and 18.

In one implementation, the second LMC continues supporting the location session using the target gNB when the second LMC is assigned, e.g., as discussed at stages 15 and 16 in FIG. 17 and stages 18 and 21 of FIG. 19.

In one implementation, location related signaling may be transported in container messages of the corresponding application protocols, including an Radio Resource Control (RRC) container for LPP messages on an air interface, NG-AP container for location related messages on an NG interface, Xn-AP container for location related messages on an Xn interface, and F1AP container for location related messages on an F1 interface.

In one implementation, the first LMC obtains a location estimate for the UE when the second LMC is not assigned.

Figure 23:
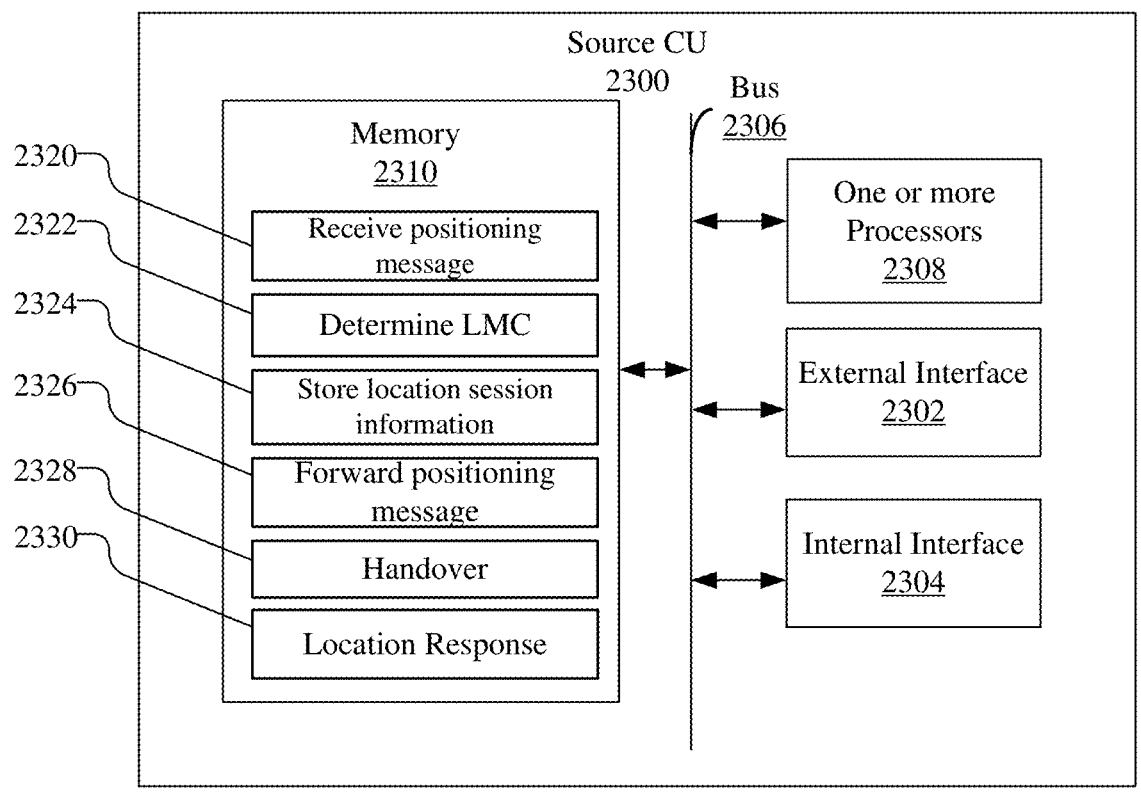
FIG. 23 is a diagram illustrating a hardware implementation of a source CU.

FIG. 23 is a diagram illustrating an example of a hardware implementation of a source Central Unit (CU) 2300 in a wireless network, such as NG-RAN 135. The source CU 2300 may be performed or supported by an entity at (or connected to) a serving or source NG-RAN node entity, e.g., serving gNB $110_{SV}$ or source gNB $110_S$ and may be, e.g., part of a wireless network such as a 5G Core network (5GCN) (e.g. 5GCN 140). The source CU 2300 may include hardware components, e.g., such as an external interface 2302, which may be a wired or wireless interface capable of connecting to an AMF 115 via an NG interface, or other nodes within the RAN, such as neighbor gNBs 110-2 or 110-3 and to other CUs or Location Management Components (LMCs) within the other gNBs, using Xn Application Protocol (XnAP) or a location specific protocol transported by XnAP, such as NR Positioning Protocol A (NRPPa). The source CU 2300 may further include an internal interface 2304, e.g., if the source CU 2300 is within a gNB 110, capable of connecting to a Location Management Component (LMC), such as LMC 117, a Distributed Unit (DU), such as gNB-DU 204, and a Transmission Reception Point (TRP), which may include a Reception Point (RP) and Transmission Point (TP), such as TRP 112, RP 113, and TP 111, that are within the same gNB 110 via an F1 interface. The source CU node 2300 further includes one or more processors 2308 and memory 2310, which may be coupled together with bus 2306. The memory 2310 may store data and may contain executable code or software instructions that when executed by the one or more processors 2308 cause the one or more processors 2308 to operate as a special purpose computer programmed to perform the procedures and techniques disclosed herein (e.g. such as the process flow 2000 discussed in FIG. 20).

As illustrated in FIG. 23, the memory 2310 includes one or more components or modules that when implemented by the one or more processors 2308 implements the methodologies described herein. While the components or modules are illustrated as software in memory 2310 that is executable by the one or more processors 2308, it should be understood that the components or modules may be dedicated hardware either in the processors 2308 or off processor.

As illustrated, the memory 2310 may include receive positioning message unit 2320 that when implemented by the one or more processors 2308 configures the one or more processors 2308 to receive, e.g., via the external interface 2302 and/or internal interface 2304, a positioning message for a UE, e.g., UE 102, from an entity, such as AMF 115 or the UE 102, e.g., as discussed at block 2002 of FIG. 20 and stage 1 in FIG. 17 or stage 1 in FIG. 18. For example, the one or more processors 2308 may be further configured to receive a second positioning message from an LMC or UE, the second positioning message including the first identifier for the location session. A determine LMC unit 2322 when implemented by the one or more processors 2308 configures the one or more processors 2308 to determine a Location Management Component (LMC), e.g., as discussed at block 2004 of FIG. 20, stage 2 in FIG. 17 or stage 2 in FIG. 18. A store location session information unit 2324 when implemented by the one or more processors 2308 configures the one or more processors 2308 to stores information for the location session, e.g., in memory 2310, the information includes an identity of the LMC, an identity of the UE and an identifier for the location session, e.g., as discussed at block 2006 of FIG. 20, at stage 2 in FIG. 17 or stage 3 in FIG. 18. The one or more processors 2308 may be further configured to delete the stored information. A forward positioning message unit 2326 when implemented by the one or more processors 2308 configures the one or more processors 2308 to forward, e.g., via the external interface 2302 and/or internal interface 2304, the positioning message towards the LMC, e.g., as discussed at block 2008 of FIG. 20, stage 3 in FIG. 17 or stage 4 at FIG. 18. For example, the one or more processors 2308 may be further configured to forward at least some of the information for the location session, such as an identity of the first LMC, an identity of the UE and a first identifier for the location session with the positioning message. The one or more processors 2308 may be further configured to send a second positioning message to the LMC, based on the first information for the location session. A handover unit 2328 when implemented by the one or more processors 2308 configures the one or more processors 2308 to perform a handover of the UE to a second gNB, whereby the second gNB supports a continuation of the location session, e.g., as discussed at block 2010 of FIG. 20, stages 5-12 in FIG. 17 or stages 7-15(or 18) in FIG. 18. For example, the one or more processors 2308 may be configured to perform the handover by determining to handover the UE to the second gNB, sending a handover request message to the second gNB, the handover request message comprising the first information for the location session; completing the handover of the UE to the second gNB; receiving a location session update message from the second gNB, the location session update message comprising an identity of the second gNB; sending the location session update message to the first LMC; and deleting the first information for the location session. A location response unit 2330 when implemented by the one or more processors 2308 configures the one or more processors 2308 to receive location response, such as a Nlmf_Location_DetermineLocation Response message from an LMC, which may include a location estimate and to send the location response message to an AMF inside an NGAP UL transfer message, e.g., as discussed stage 3 in FIG. 14 and stage 11 in FIG. 16.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 2310) and executed by one or more processor units (e.g. processors 2308), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 2310, and are configured to cause the one or more processors (e.g. processors 2308) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A Central Unit (CU) in a first New Radio (NR) node B (gNB) in a radio access network (RAN), such as source CU 2300, may be configured to support a location session for a user equipment (UE), and includes a means for receiving a first positioning message for the UE from a first entity, which may be, e.g., the external interface 2302, the internal interface 2304, and one or more processors 2308 with dedicated hardware or implementing executable code or software instructions in memory 2310 such as the receive positioning message unit 2320. A means for determining a first Location Management Component (LMC) may be, e.g., the one or more processors 2308 with dedicated hardware or implementing executable code or software instructions in memory 2310 such as the determine LMC unit 2322. A means for storing first information for the location session, the first information for the location session including an identity of the first LMC, an identity of the UE and a first identifier for the location session may be, e.g., the one or more processors 2308 with dedicated hardware or implementing executable code or software instructions in memory 2310 such as the store location session information unit 2324. A means for forwarding the first positioning message towards the first LMC may be, e.g., the external interface 2302, the internal interface 2304, and one or more processors 2308 with dedicated hardware or implementing executable code or software instructions in memory 2310 such as the forward positioning message unit 2326. A means for performing a handover of the UE to a second gNB, whereby the second gNB supports a continuation of the location session. may be, e.g., the external interface 2302, the internal interface 2304, and one or more processors 2308 with dedicated hardware or implementing executable code or software instructions in memory 2310 such as the handover unit 2328.

In some implementations, the CU may further include a means for forwarding at least some of the first information for the location session along with the first positioning message towards the first LMC, which may be, e.g., the external interface 2302, the internal interface 2304, and one or more processors 2308 with dedicated hardware or implementing executable code or software instructions in memory 2310 such as the forward positioning message unit 2326.

In some implementations, the CU may further include a means for receiving a second positioning message from the first LMC, the second positioning message including the first identifier for the location session, which may be, e.g., the external interface 2302, the internal interface 2304, and one or more processors 2308 with dedicated hardware or implementing executable code or software instructions in memory 2310 such as the receive positioning message unit 2320. A means for sending the second positioning message to the UE, based on the first information for the location session may be the external interface 2302, the internal interface 2304, and one or more processors 2308 with dedicated hardware or implementing executable code or software instructions in memory 2310 such as the forward positioning message unit 2326.

In some implementations, the CU may further include a means for receiving a second positioning message from the UE, the second positioning message including the first identifier for the location session, which may be, e.g., the external interface 2302, the internal interface 2304, and one or more processors 2308 with dedicated hardware or implementing executable code or software instructions in memory 2310 such as the receive positioning message unit 2320. A means for sending the second positioning message to the first LMC, based on the first information for the location session may be the external interface 2302, the internal interface 2304, and one or more processors 2308 with dedicated hardware or implementing executable code or software instructions in memory 2310 such as the forward positioning message unit 2326.

In some implementations, the CU may further include a means for receiving an Nlmf_Location_DetermineLocation Response service operation from the first LMC, wherein the Nlmf_Location_DetermineLocation Response service operation comprises a location estimate for the UE which may be, e.g., the external interface 2302, the internal interface 2304, and one or more processors 2308 with dedicated hardware or implementing executable code or software instructions in memory 2310 such as the location response unit 2330. A means for sending the Nlmf_Location_DetermineLocation Response service operation to the AMF inside an NGAP UL Transfer message may be the external interface 2302, the internal interface 2304, and one or more processors 2308 with dedicated hardware or implementing executable code or software instructions in memory 2310 such as the location response unit 2330. A means for deleting the first information for the location session location may be, e.g., the one or more processors 2308 with dedicated hardware or implementing executable code or software instructions in memory 2310 such as the store location session information unit 2324.

Figure 24:
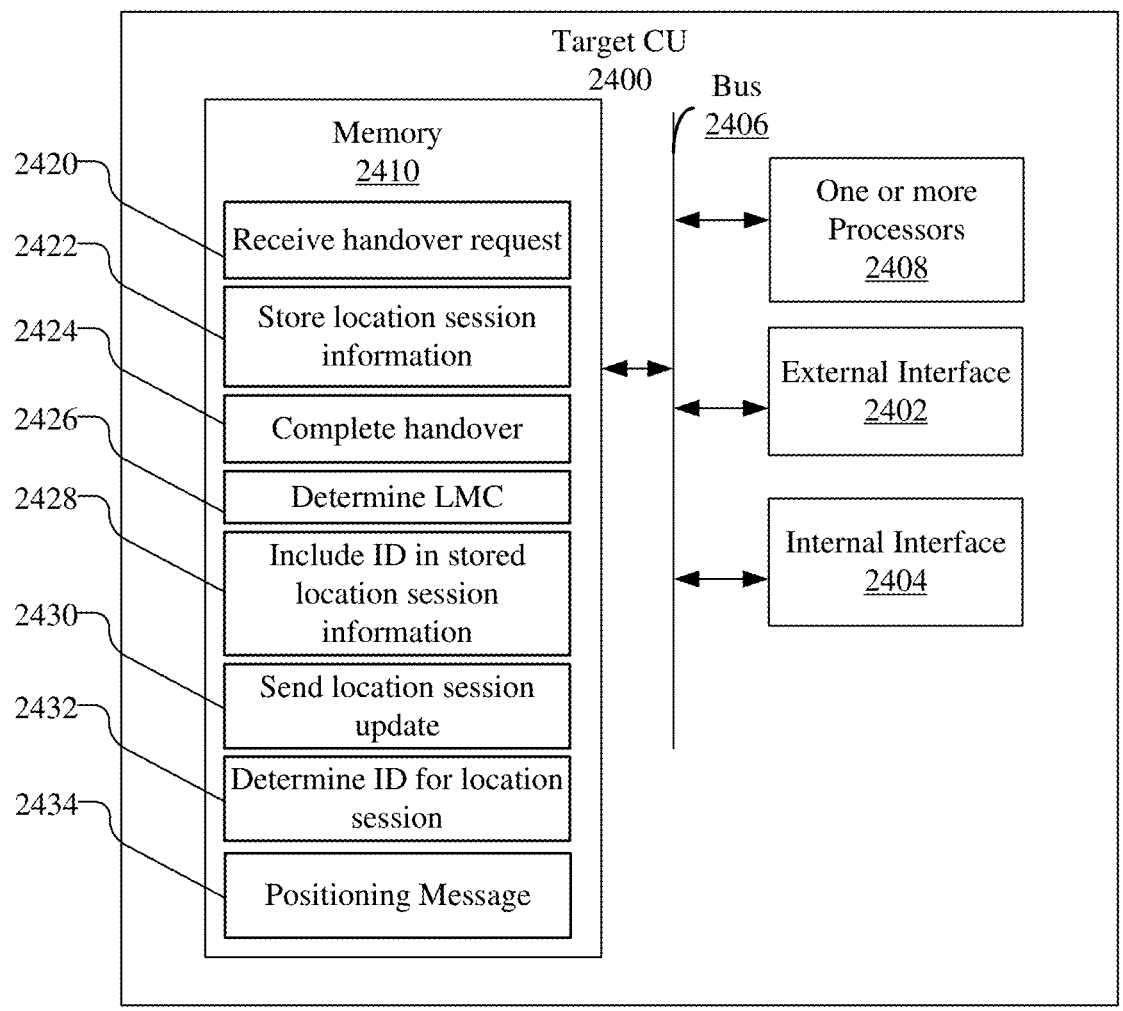
FIG. 24 is a diagram illustrating a hardware implementation of a target CU.

FIG. 24 is a diagram illustrating an example of a hardware implementation of a target Central Unit (CU) 2400 in a wireless network, such as NG-RAN 135. The target CU 2400 may be performed or supported by an entity at (or connected to) a target NG-RAN node entity, e.g., target gNB 110$_T$ and may be, e.g., part of a wireless network such as a 5G Core network (5GCN) (e.g. 5GCN 140). The target CU 2400 and source CU 2300 may be parts of the same CU in some implementations. The target CU 2400 may include hardware components, e.g., such as an external interface 2402, which may be a wired or wireless interface capable of connecting to an AMF 115 via an NG interface, or other nodes within the RAN, such as neighbor gNBs 110-2 or 110-3 and to other CU's or Location Management Components (LMCs) within the other gNBs, using Xn Application Protocol (XnAP) or a location specific protocol transported by XnAP, such as NR Positioning Protocol A (NRPPa). The target CU 2400 may further include an internal interface 2404, e.g., if the target CU 2400 is within a gNB 110, capable of connecting to a Location Management Component (LMC), such as LMC 117, a Distributed Unit (DU), such as gNB-DU 204, and a Transmission Reception Point (TRP), which may include a Reception Point (RP) and Transmission Point (TP), such as TRP 112, RP 113, and TP 111, that are within the same gNB 110 via an F1 interface. The target CU 2400 further includes one or more processors 2408 and memory 2410, which may be coupled together with bus 2406. The memory 2410 may store data and may contain executable code or software instructions that when executed by the one or more processors 2408 cause the one or more processors 2408 to operate as a special purpose computer programmed to perform the procedures and techniques disclosed herein (e.g. such as the process flow 2100 discussed in FIG. 21).

As illustrated in FIG. 24, the memory 2410 includes one or more components or modules that when implemented by the one or more processors 2408 implements the methodologies described herein. While the components or modules are illustrated as software in memory 2410 that is executable by the one or more processors 2408, it should be understood that the components or modules may be dedicated hardware either in the processors 2408 or off processor.

As illustrated, the memory 2410 may include a receive handover request unit 2420 that when implemented by the one or more processors 2408 configures the one or more processors 2408 to receive, e.g., via the external interface 2402, a first handover request message for a UE, e.g., UE 102, from a second gNB, e.g., gNB 202$_S$ or 202$_{SV}$, where the handover request message includes first information for the location session, including an identity of a Location Management Component (LMC), an identity of the UE and an identifier for the location session, e.g., as discussed at block 2102 of FIG. 21, stage 6 in FIG. 17 or stage 8 in FIG. 18. A store location session information unit 2422 when implemented by the one or more processors 2408 configures the one or more processors 2408 to stores second information for the location session, e.g., in memory 2410, the second information for the location session including at least part of the first information for the location session, e.g., as discussed at block 2104 of FIG. 21, stage 7 in FIG. 17 or stage 9 in FIG. 18. The one or more processors 2408 may be further configured to delete the stored information. A complete handover unit 2424 when implemented by the one or more processors 2408 configures the one or more processors 2408 to complete the handover of the UE from the second gNB, e.g., as discussed at block 2106 of FIG. 21, stage 9 in FIG. 17 or stage 11 in FIG. 18. For example, the one or more processors 2408 may be configured to complete the handover for the UE by determining to handover the UE to a third gNB, sending a second handover request message to the third gNB, the second handover request message comprising the second information for the location session, completing the handover of the UE to the third gNB, receiving a second location session update message from the third gNB, the second location session update message comprising an identity of the third gNB, sending the second location session update message to the second LMC, and deleting the second information for the location session. A determine LMC unit 2426 when implemented by the one or more processors 2408 configures the one or more processors 2408 to determine a second LMC to be used for the location session, the second LMC may be the first LMC or may be different from the first LMC, e.g., as discussed at block 2108 of FIG. 21, stage 8 in FIG. 17 or stage 10 in FIG. 18. An include ID in stored location session information unit 2428 when implemented by the one or more processors 2408 configures the one or more processors 2408 to include the identity of the second LMC in the stored second information if the second LMC is different from the first LMC, e.g., as discussed at block 2110 of FIG. 21, stage 8 in FIG. 17 or stage 10 in FIG. 18. A send location session update unit 2430 when implemented by the one or more processors 2408 configures the one or more processors 2408 to send, e.g., via the external interface 2402, a location session update message to the first gNB, that includes an identity of the second gNB and an identity of the second LMC when the second LMC is different from the first LMC, e.g., as discussed at block 2112 of FIG. 21, stage 10 in FIG. 17 or stage 12 in FIG. 18. A determine ID for location session unit 2432 when implemented by the one or more processors 2408 configures the one or more processors 2408 to determine a second identifier for the location session, which may be the same as the first identifier for the location session or different from the first identifier for the location session, wherein the second identifier may be included in the stored information for the location session and the location session update message. A positioning message unit 2434 when implemented by the one or more processors 2408 configures the one or more processors 2408 to receive, via external interface 2402 or internal interface 2404 a positioning message from an LMC or UE, the positioning message may include an second identifier for the location session, and to sending the positioning message to the UE or an LMC, based on the information for the location session. The one or more processors 2408 may be further configured by the positioning message unit 2434 to receive a positioning message intended for a serving AMF for the UE from an LMC and an indication of termination of the location session and to send the positioning message to the serving AMF for the UE via the external interface 2402.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 2410) and executed by one or more processor units (e.g. processors 2408), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 2410, and are configured to cause the one or more processors (e.g. processors 2408) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A Central Unit (CU) in a first New Radio (NR) node B (gNB) in a radio access network (RAN), such as target CU 2400, may be configured to continue a location session for a user equipment (UE) and includes a means for receiving a first handover request message for the UE from a second gNB, the first handover request message comprising first information for the location session, the first information for the location session including an identity of a first Location Management Component (LMC), an identity of the UE and a first identifier for the location session, which may be, e.g., the external interface 2402, the internal interface 2404, and one or more processors 2408 with dedicated hardware or implementing executable code or software instructions in memory 2410 such as the receive handover request unit 2420. A means for storing second information for the location session, the second information for the location session including at least part of the first information for the location session may be the one or more processors 2408 with dedicated hardware or implementing executable code or software instructions in memory 2410 such as the receive store location session information unit 2422. A means for completing a handover of the UE from the second gNB to the first gNB may be, e.g., the external interface 2402, the internal interface 2404, and one or more processors 2408 with dedicated hardware or implementing executable code or software instructions in memory 2410 such as the complete handover unit 2424. A means for determining a second LMC, wherein the second LMC is the first LMC or is different from the first LMC may be, e.g., the one or more processors 2408 with dedicated hardware or implementing executable code or software instructions in memory 2410 such as the determine LMC unit 2426. A means for including an identity of the second LMC in the second information for the location session when the second LMC is different from the first LMC may be, e.g., the one or more processors 2408 with dedicated hardware or implementing executable code or software instructions in memory 2410 such as the include ID in stored location session information unit 2428. A means for sending a first location session update message to the first gNB, the first location session update message comprising an identity of the second gNB and an identity of the second LMC when the second LMC is different from the first LMC may be, e.g., the external interface 2402, the internal interface 2404, and one or more processors 2408 with dedicated hardware or implementing executable code or software instructions in memory 2410 such as the send location session update unit 2430.

In some implementations, the CU may further include a means for determining a second identifier for the location session, wherein the second identifier for the location session is the same as the first identifier for the location session or is different from the first identifier for the location session, which may be, e.g., the one or more processors 2408 with dedicated hardware or implementing executable code or software instructions in memory 2410 such as the determine ID in determine ID for location session unit 2432. A means for including the second identifier for the location session in both the second information for the location session and the first location session update message sent to the second gNB when the second identifier for the location session is different from the first identifier for the location session may be, e.g., the external interface 2402, the internal interface 2404, and one or more processors 2408 with dedicated hardware or implementing executable code or software instructions in memory 2410 such as the include ID in stored location session information unit 2428 and the send location session update unit 2430.

In one implementation, the CU may further include a means for receiving a positioning message from the second LMC, the positioning message including the second identifier for the location session, which may be, e.g., the external interface 2402, the internal interface 2404, and one or more processors 2408 with dedicated hardware or implementing executable code or software instructions in memory 2410 such as the positioning message unit 2434. A means for sending the positioning message to the UE, based on the second information for the location session may be, e.g., the external interface 2402, the internal interface 2404, and one or more processors 2408 with dedicated hardware or implementing executable code or software instructions in memory 2410 such as the positioning message unit 2434.

In one implementation, the CU may further include a means for receiving a positioning message from the UE, the positioning message including the second identifier for the location session, which may be, e.g., the external interface 2402, the internal interface 2404, and one or more processors 2408 with dedicated hardware or implementing executable code or software instructions in memory 2410 such as the positioning message unit 2434. A means for sending the positioning message to the second LMC, based on the second information for the location session may be, e.g., the external interface 2402, the internal interface 2404, and one or more processors 2408 with dedicated hardware or imple- menting executable code or software instructions in memory 2410 such as the positioning message unit 2434.

In one implementation, the CU may further include a means for receiving a positioning message intended for a serving Access and Mobility Management Function (AMF) for the UE from the second LMC and an indication of termination of the location session, which may be, e.g., the external interface 2402, the internal interface 2404, and one or more processors 2408 with dedicated hardware or implementing executable code or software instructions in memory 2410 such as the positioning message unit 2434. A means for sending the positioning message to the serving AMF for the UE may be, e.g., the external interface 2402, the internal interface 2404, and one or more processors 2408 with dedicated hardware or implementing executable code or software instructions in memory 2410 such as the positioning message unit 2434. A means for deleting the second information for the location session may be, e.g., the one or more processors 2408 with dedicated hardware or implementing executable code or software instructions in memory 2410 such as the store location session information unit 2422.

Figure 25:
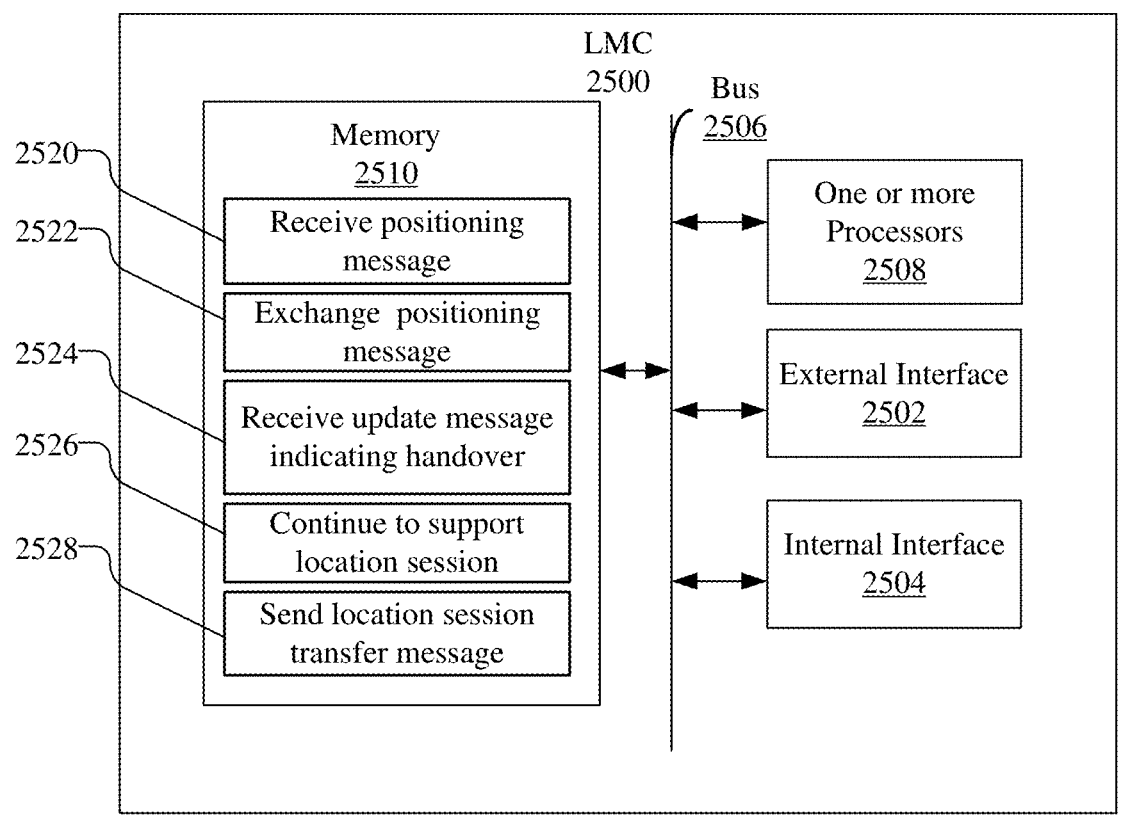
FIG. 25 is a diagram illustrating a hardware implementation of a source or target LMC.

FIG. 25 is a diagram illustrating an example of a hardware implementation of a Location Management Component (LMC) 2500, which may be similar to LMC 117, in a wireless network, such as NG-RAN 135. The LMC 2500 may be a source LMC, e.g., performed by an entity at (or connected to) a serving or source NG-RAN node entity, e.g., serving gNB $110_{SV}$ or source gNB $110_S$ or a target LMC, e.g., performed by an entity at (or connected to) a target NG-RAN node entity, e.g., target gNB $110_T$ and may be, e.g., part of a wireless network such as a 5G Core network (5GCN) (e.g. 5GCN 140). The LMC 2500 may include hardware components, e.g., such as a communications interface that may include one or more of an external interface 2502, e.g., if the LMC 2500 is external to a gNB 110, which may be a wired or wireless interface capable of connecting to other nodes within the RAN, such a Central Unit (CU), or an internal interface 2504, e.g., if the LMC 2500 is within a gNB 110, capable of connecting to a CU or other entities within the gNB 110, e.g., via an F1 interface. The LMC 2500 further includes one or more processors 2508 and memory 2510, which may be coupled together with bus 2506. The memory 2510 may store data and may contain executable code or software instructions that when executed by the one or more processors 2508 cause the one or more processors 2508 to operate as a special purpose computer programmed to perform the procedures and techniques disclosed herein (e.g. such as the process flow 2200 discussed in FIG. 22).

As illustrated in FIG. 25, the memory 2510 includes one or more components or modules that when implemented by the one or more processors 2508 implements the methodologies described herein. While the components or modules are illustrated as software in memory 2510 that is executable by the one or more processors 2508, it should be understood that the components or modules may be dedicated hardware either in the processors 2508 or off processor.

As illustrated, the memory 2510 may include receive positioning message unit 2520 that when implemented by the one or more processors 2508 configures the one or more processors 2508 to receive, e.g., via the external interface 2502 or internal interface 2504, a positioning message for a UE, e.g., UE 102, from a first entity, which may be an Access and Mobility Management Function (AMF), e.g., such as AMF 115, or the UE, that is relayed to the LMC by a CU for a gNB and initiates the location session for the UE in the LMC, and includes an identity for a source gNB, the source gNB serving the UE, and an identifier for the location session, e.g., as discussed at block 2202 of FIG. 22, stages 3 and 15 of FIG. 17 or stages 5 and 18 of FIG. 18. An exchange positioning message unit 2522 when implemented by the one or more processors 2508 configures the one or more processors 2508 to transmit and/or receive, e.g., using the external interface 2502 or internal interface 2504, at least one positioning message for the UE with a second entity, which may be the UE or a Distributed Unit (DU), such as gNB-DU 204, e.g., as discussed at block 2204 of FIG. 22, stages 4 and 16 of FIG. 17 or stages 6 and 21 at FIG. 18. For example, the one or more processors 2508 may be configured to send a downlink positioning message to the UE via the first CU and the source gNB or receive an uplink positioning message from the UE via the first CU and the source gNB. In another example, the one or more processors 2508 may be configured to send a downlink network positioning message to the DU via the first CU or receive an uplink network positioning message from the DU via the first CU. A receive update message indicating handover unit 2524 when implemented by the one or more processors 2508 configures the one or more processors 2508 to receive, e.g., via the external interface 2502 or internal interface 2504, a location session update message, that indicates a handover of the UE from the source gNB to a target gNB, and indicating whether or not a second LMC is assigned, and including an identity of the second LMC when the second LMC is assigned, as discussed at block 2206 of FIG. 22, stage 11 of FIG. 17 or stage 14 of FIG. 18. A continue to support location session unit 2526 when implemented by the one or more processors 2508 configures the one or more processors 2508 to continue to support the location session using the target gNB when the second LMC is not assigned, e.g., as discussed at block 2208 of FIG. 22, stage 8 and 17a of FIG. 17 or stage 10 and 19d of FIG. 18. For example, the one or more processors 2508 may be configured to continue to support the location session using the target gNB when the second LMC is not assigned by sending a downlink positioning message to the UE via the CU and the target gNB, receiving an uplink positioning message from the UE via the CU and the target gNB, sending a downlink network positioning message to a Distributed Unit (DU) in a gNB via the CU, receiving an uplink network positioning message from the DU via the CU, or sending a second positioning message to the first entity via the CU and the target gNB. A send location session transfer message when implemented by the one or more processors 2508 configures the one or more processors 2508 to send, via the external interface 2502 or internal interface 2504, a location session transfer message to the second LMC when the second LMC is assigned, the location session transfer message including a current status of the location session and the first positioning message, e.g., as discussed at block 2210 of FIG. 22, stage 13 of FIG. 17 or stage 16 of FIG. 18.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 2510) and executed by one or more processor units (e.g. processors 2508), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 2510, and are configured to cause the one or more processors (e.g. processors 2508) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A Location Management Component (LMC), such as LMC 2500, in a first New Radio (NR) node B (gNB) in a radio access network (RAN) configured to support a location session for a user equipment (UE), the LMC may include a means for receiving a first positioning message for the UE from a first entity, the first positioning message relayed to the first LMC by a Central Unit (CU) for the first gNB, the first positioning message initiating the location session for the UE in the first LMC, the first positioning message including an identity for a source gNB, the source gNB serving the UE, and an identifier for the location session, which may be, e.g., the external interface 2502, the internal interface 2504, and one or more processors 2508 with dedicated hardware or implementing executable code or software instructions in memory 2510 such as the receive positioning message unit 2520. A means for transmitting at least one positioning message for the UE to a second entity; may be, e.g., the external interface 2502, the internal interface 2504, and one or more processors 2508 with dedicated hardware or implementing executable code or software instructions in memory 2510 such as the exchange positioning message unit 2522. A means for receiving a location session update message, the location session update message indicating a handover of the UE from the source gNB to a target gNB, the location session update message indicating whether or not a second LMC is assigned, the location session update message including an identity of the second LMC when the second LMC is assigned, may be, e.g., the external interface 2502, the internal interface 2504, and one or more processors 2508 with dedicated hardware or implementing executable code or software instructions in memory 2510 such as the receive update message indicating handover unit 2524. A means for continuing to support the location session using the target gNB when the second LMC is not assigned may be, e.g., the one or more processors 2508 with dedicated hardware or implementing executable code or software instructions in memory 2510 such as the continue to support location session unit 2526. A means for sending a location session transfer message to the second LMC when the second LMC is assigned, the location session transfer message including a current status of the location session and the first positioning message may be, e.g., the external interface 2502, the internal interface 2504, and one or more processors 2508 with dedicated hardware or implementing executable code or software instructions in memory 2510 such as the send location session transfer message unit 2528.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

One implementation (1) may be a method for supporting a location session for a user equipment (UE) performed by a first Central Unit (CU) in a first New Radio (NR) node B (gNB) in a radio access network (RAN), the method comprising: receiving a first positioning message for the UE from a first entity; determining a first Location Management Component (LMC); storing first information for the location session, the first information for the location session including an identity of the first LMC, an identity of the UE and a first identifier for the location session; forwarding the first positioning message towards the first LMC; and performing a handover of the UE to a second gNB, whereby the second gNB supports a continuation of the location session.

There may be some implementations (2) of the above-described method (1) wherein the first gNB is a serving gNB for the UE before the handover and the second gNB is a serving gNB for the UE after the handover.

There may be some implementations (3) of the above-described method (1) wherein the first LMC is part of the first CU, wherein forwarding the first positioning message towards the first LMC is internal to the first CU.

There may be some implementations (4) of the above-described method (1) wherein the first LMC is part of the first gNB and separate from the first CU, wherein forwarding the first positioning message towards the first LMC comprises sending the first positioning message to the first LMC in an F1 Application Protocol (F1AP) transfer message.

There may be some implementations (5) of the above-described method (1) wherein the first LMC is part of a third gNB, wherein forwarding the first positioning message towards the first LMC comprises sending the first positioning message to the third gNB in an Xn Application Protocol (XnAP) transfer message.

There may be some implementations (6) of the above-described method (1) wherein forwarding the first positioning message towards the first LMC further comprises forwarding at least some of the first information for the location session along with the first positioning message towards the first LMC.

There may be some implementations (7) of the above-described method (1) further comprising: receiving a second positioning message from the first LMC, the second positioning message including the first identifier for the location session; and sending the second positioning message to the UE, based on the first information for the location session.

There may be some implementations (8) of the above-described method (1) further comprising: receiving a second positioning message from the UE, the second positioning message including the first identifier for the location session; and sending the second positioning message to the first LMC, based on the first information for the location session.

There may be some implementations (9) of the above-described method (1) wherein performing the handover to the second gNB comprises: determining to handover the UE to the second gNB; sending a handover request message to the second gNB, the handover request message comprising the first information for the location session; completing the handover of the UE to the second gNB; receiving a location session update message from the second gNB, the location session update message comprising an identity of the second gNB; sending the location session update message to the first LMC; and deleting the first information for the location session.

There may be some implementations (10) of the above-described method (9) wherein a second CU in the second gNB receives the handover request message, wherein the second CU stores second information for the location session, the second information for the location session including at least part of the first information for the location session, wherein the second CU sends the location session update message to the first CU.

There may be some implementations (11) of the above-described method (10) wherein the second CU assigns a second identifier for the location session, the second identifier for the location session different to the first identifier for the location session, the second information for the location session including the second identifier for the location session, the location session update message including the second identifier for the location session.

There may be some implementations (12) of the above-described method (10) wherein the second CU determines a second LMC, the second LMC different to the first LMC, the second information for the location session including an identity of the second LMC, the location session update message including the identity of the second LMC.

There may be some implementations (13) of the above-described method (1) wherein the first entity is an Access and Mobility Management Function (AMF), wherein the first positioning message is an Nlmf_Location_Determine-Location Request service operation, wherein the first positioning message is received inside an NGAP DL Transfer message.

There may be some implementations (14) of the above-described method (13) further comprising: receiving an Nlmf_Location_DetermineLocation Response service operation from the first LMC, wherein the Nlmf_Location_DetermineLocation Response service operation comprises a location estimate for the UE; sending the Nlmf_Location_DetermineLocation Response service operation to the AMF inside an NGAP UL Transfer message; and deleting the first information for the location session.

There may be some implementations (15) of the above-described method (1) wherein the first entity is the UE, wherein the first positioning message comprises an event report for periodic or triggered location of the UE and a routing identifier, the routing identifier indicating any LMC or a serving LMC, and further comprising determining the first LMC based at least in part on the routing identifier.

There may be some implementations (16) of the above-described method (15) wherein the routing identifier indicates the serving LMC, wherein the first LMC is different from the serving LMC, wherein forwarding the event report towards the first LMC comprises sending the event report and an indication of the first LMC to the serving LMC.

There may be some implementations (17) of the above-described method (16) wherein the serving LMC sends a location session transfer message to the first LMC, the location session transfer message comprising the event report and a current status of periodic or triggered event reporting for the UE.

One implementation (18) may be a first Central Unit (CU) in a first New Radio (NR) node B (gNB) in a radio access network (RAN) configured to support a location session for a user equipment (UE), the first CU comprising: an external interface configured to communicate with one or more of an Access and Mobility Management Function (AMF), other gNBs in the RAN, other CUs within the other gNBs, and Location Management Components (LMCs) within the other gNBs; an internal interface configured to communicate with one or more of an LMC within the first gNB, a Distributed Unit (DU) within the first gNB, and a Transmission Reception Point (TRP) within the first gNB, which may include a Reception Point (RP) and Transmission Point (TP); at least one memory; at least one processor coupled to the external interface, the internal interface, and the at least one memory, wherein the at least one processor is configured to: receive a first positioning message for the UE from a first entity; determine a first Location Management Component (LMC); store first information for the location session, the first information for the location session including an identity of the first LMC, an identity of the UE and a first identifier for the location session; forward the first positioning message towards the first LMC; and perform a handover of the UE to a second gNB, whereby the second gNB supports a continuation of the location session.

There may be some implementations (19) of the above-described first CU (18) wherein the first gNB is a serving gNB for the UE before the handover and the second gNB is a serving gNB for the UE after the handover.

There may be some implementations (20) of the above-described first CU (18) wherein the first LMC is part of the first CU, wherein the first positioning message is forwarded towards the first LMC via the internal interface.

There may be some implementations (21) of the above-described first CU (18) wherein the first LMC is part of the first gNB and separate from the first CU, wherein the at least one processor is configured to forward the first positioning message towards the first LMC by being configured to send the first positioning message to the first LMC via the internal interface in an F1 Application Protocol (F1AP) transfer message.

There may be some implementations (22) of the above-described first CU (18) wherein the first LMC is part of a third gNB, wherein the at least one processor is configured to forward the first positioning message towards the first LMC by being configured to send the first positioning message to the third gNB via the external interface in an Xn Application Protocol (XnAP) transfer message.

There may be some implementations (23) of the above-described first CU (18) wherein the at least one processor is configured to forward the first positioning message towards the first LMC by being further configured to forward at least some of the first information for the location session along with the first positioning message towards the first LMC.

There may be some implementations (24) of the above-described first CU (18) wherein the at least one processor is further configured to: receive a second positioning message from the first LMC, the second positioning message including the first identifier for the location session; and send the second positioning message to the UE, based on the first information for the location session.

There may be some implementations (25) of the above-described first CU (18) wherein the at least one processor is further configured to: receive a second positioning message from the UE, the second positioning message including the first identifier for the location session; and send the second positioning message to the first LMC, based on the first information for the location session.

There may be some implementations (26) of the above-described first CU (18) wherein the at least one processor is configured to perform the handover to the second gNB by being configured to: determine to handover the UE to the second gNB; send a handover request message to the second gNB, the handover request message comprising the first information for the location session; complete the handover of the UE to the second gNB; receive a location session update message from the second gNB, the location session update message comprising an identity of the second gNB; send the location session update message to the first LMC; and delete the first information for the location session.

There may be some implementations (27) of the above-described first CU (26) wherein a second CU in the second gNB receives the handover request message, wherein the second CU stores second information for the location session, the second information for the location session including at least part of the first information for the location session, wherein the second CU sends the location session update message to the first CU.

There may be some implementations (28) of the above-described first CU (27) wherein the second CU assigns a second identifier for the location session, the second identifier for the location session different to the first identifier for the location session, the second information for the location session including the second identifier for the location session, the location session update message including the second identifier for the location session.

There may be some implementations (29) of the above-described first CU (27) wherein the second CU determines a second LMC, the second LMC different to the first LMC, the second information for the location session including an identity of the second LMC, the location session update message including the identity of the second LMC.

There may be some implementations (30) of the above-described first CU (18) wherein the first entity is the AMF, wherein the first positioning message is an Nlmf_Location_DetermineLocation Request service operation, wherein the first positioning message is received inside an Next Generation Application Protocol (NGAP) Downlink (DL) Transfer message.

There may be some implementations (31) of the above-described first CU (30) further comprising: receiving an Nlmf_Location_DetermineLocation Response service operation from the first LMC, wherein the Nlmf_Location_DetermineLocation Response service operation comprises a location estimate for the UE; sending the Nlmf_Location_DetermineLocation Response service operation to the AMF inside an NGAP Uplink (UL) Transfer message; and deleting the first information for the location session.

There may be some implementations (32) of the above-described first CU (18) wherein the first entity is the UE, wherein the first positioning message comprises an event report for periodic or triggered location of the UE and a routing identifier, the routing identifier indicating any LMC or a serving LMC, and wherein the at least one processor is further configured to determine the first LMC based at least in part on the routing identifier.

There may be some implementations (33) of the above-described first CU (32) wherein the routing identifier indicates the serving LMC, wherein the first LMC is different from the serving LMC, wherein the at least one processor is configured to forward the event report towards the first LMC by being configured to send the event report and an indication of the first LMC to the serving LMC.

There may be some implementations (34) of the above-described first CU (33) wherein the serving LMC sends a location session transfer message to the first LMC, the location session transfer message comprising the event report and a current status of periodic or triggered event reporting for the UE.

One implementation (35) may be a first Central Unit (CU) in a first New Radio (NR) node B (gNB) in a radio access network (RAN) configured to support a location session for a user equipment (UE), the first CU comprising: means for receiving a first positioning message for the UE from a first entity; means for determining a first Location Management Component (LMC); means for storing first information for the location session, the first information for the location session including an identity of the first LMC, an identity of the UE and a first identifier for the location session; means for forwarding the first positioning message towards the first LMC; and means for performing a handover of the UE to a second gNB, whereby the second gNB supports a continuation of the location session.

One implementation (36) may be a non-transitory storage medium including program code stored thereon, the program code is operable to cause at least one processor in a first Central Unit (CU) in a first New Radio (NR) node B (gNB) in a radio access network (RAN) to support a location session for a user equipment (UE), comprising: program code to receive a first positioning message for the UE from a first entity; program code to determine a first Location Management Component (LMC); program code to store first information for the location session, the first information for the location session including an identity of the first LMC, an identity of the UE and a first identifier for the location session; program code to forward the first positioning message towards the first LMC; and program code to perform a handover of the UE to a second gNB, whereby the second gNB supports a continuation of the location session.

One implementation (37) may be a method for continuing a location session for a user equipment (UE) performed by a first Central Unit (CU) in a first New Radio (NR) node B (gNB) in a radio access network (RAN), the method comprising: receiving a first handover request message for the UE from a second gNB, the first handover request message comprising first information for the location session, the first information for the location session including an identity of a first Location Management Component (LMC), an identity of the UE and a first identifier for the location session; storing second information for the location session, the second information for the location session including at least part of the first information for the location session; completing a handover of the UE from the second gNB to the first gNB; determining a second LMC, wherein the second LMC is the first LMC or is different from the first LMC; including an identity of the second LMC in the second information for the location session when the second LMC is different from the first LMC; and sending a first location session update message to the first gNB, the first location session update message comprising an identity of the second gNB and an identity of the second LMC when the second LMC is different from the first LMC.

There may be some implementations (38) of the above-described method (37) wherein the second gNB is a serving gNB for the UE before the handover and the first gNB is a serving gNB for the UE after the handover.

There may be some implementations (39) of the above-described method (37) further comprising: determining a second identifier for the location session, wherein the second identifier for the location session is the same as the first identifier for the location session or is different from the first identifier for the location session; and including the second identifier for the location session in both the second information for the location session and the first location session update message sent to the second gNB when the second identifier for the location session is different from the first identifier for the location session.

There may be some implementations (40) of the above-described method (37) wherein a second CU in the second gNB receives the first location session update message sent by the first CU, wherein the second CU sends the first location session update message to the first LMC.

There may be some implementations (41) of the above-described method (39) further comprising: receiving a positioning message from the second LMC, the positioning message including the second identifier for the location session; and sending the positioning message to the UE, based on the second information for the location session.

There may be some implementations (42) of the above-described method (41) wherein the positioning message comprises an event report acknowledgment for periodic or triggered location or an LPP message.

There may be some implementations (43) of the above-described method (39) further comprising: receiving a positioning message from the UE, the positioning message including the second identifier for the location session; and sending the positioning message to the second LMC, based on the second information for the location session.

There may be some implementations (44) of the above-described method (37) further comprising: determining to handover the UE to a third gNB; sending a second handover request message to the third gNB, the second handover request message comprising the second information for the location session; completing the handover of the UE to the third gNB; receiving a second location session update message from the third gNB, the second location session update message comprising an identity of the third gNB; sending the second location session update message to the second LMC; and deleting the second information for the location session.

There may be some implementations (45) of the above-described method (39) further comprising: receiving a positioning message intended for a serving Access and Mobility Management Function (AMF) for the UE from the second LMC and an indication of termination of the location session; sending the positioning message to the serving AMF for the UE; and deleting the second information for the location session.

There may be some implementations (46) of the above-described method (45) wherein the positioning message comprises an event report for periodic or triggered location or an Nlmf_Location_DetermineLocation Response service operation.

One implementation (47) may be a first Central Unit (CU) in a first New Radio (NR) node B (gNB) in a radio access network (RAN) configured to continue a location session for a user equipment (UE), the first CU comprising: an external interface configured to communicate with one or more of an Access and Mobility Management Function (AMF), other gNBs in the RAN, other CUs within the other gNBs, and Location Management Components (LMCs) within the other gNBs; an internal interface configured to communicate with one or more of an LMC within the first gNB, a Distributed Unit (DU) within the first gNB, and a Transmission Reception Point (TRP) within the first gNB, which may include a Reception Point (RP) and Transmission Point (TP); at least one memory; at least one processor coupled to the external interface, the internal interface, and the at least one memory, wherein the at least one processor is configured to: receive a first handover request message for the UE from a second gNB via the external interface, the first handover request message comprising first information for the location session, the first information for the location session including an identity of a first Location Management Component (LMC), an identity of the UE and a first identifier for the location session; store second information for the location session, the second information for the location session including at least part of the first information for the location session; complete a handover of the UE from the second gNB to the first gNB; determine a second LMC, wherein the second LMC is the first LMC or is different from the first LMC; include an identity of the second LMC in the second information for the location session when the second LMC is different from the first LMC; and send a first location session update message to the first gNB via the internal interface, the first location session update message comprising an identity of the second gNB and an identity of the second LMC when the second LMC is different from the first LMC.

There may be some implementations (48) of the above-described first CU (47) wherein the second gNB is a serving gNB for the UE before the handover and the first gNB is a serving gNB for the UE after the handover.

There may be some implementations (49) of the above-described first CU (47) wherein the at least one processor is further configured to: determine a second identifier for the location session, wherein the second identifier for the location session is the same as the first identifier for the location session or is different from the first identifier for the location session; and include the second identifier for the location session in both the second information for the location session and the first location session update message sent to the second gNB when the second identifier for the location session is different from the first identifier for the location session.

There may be some implementations (50) of the above-described first CU (47) wherein a second CU in the second gNB receives the first location session update message sent by the first CU, wherein the second CU sends the first location session update message to the first LMC.

There may be some implementations (51) of the above-described first CU (49) wherein the at least one processor is further configured to: receive a positioning message from the second LMC, the positioning message including the second identifier for the location session; and send the positioning message to the UE, based on the second information for the location session.

There may be some implementations (52) of the above-described first CU (51) wherein the positioning message comprises an event report acknowledgment for periodic or triggered location or an LPP message.

There may be some implementations (53) of the above-described first CU (49) wherein the at least one processor is further configured to: receive a positioning message from the UE, the positioning message including the second identifier for the location session; and send the positioning message to the second LMC, based on the second information for the location session.

There may be some implementations (54) of the above-described first CU (47) wherein the at least one processor is further configured to: determine to handover the UE to a third gNB; send a second handover request message to the third gNB, the second handover request message comprising the second information for the location session; complete the handover of the UE to the third gNB; receive a second location session update message from the third gNB, the second location session update message comprising an identity of the third gNB; send the second location session update message to the second LMC; and delete the second information for the location session.

There may be some implementations (55) of the above-described first CU (49) further comprising: receiving a positioning message intended for a serving AMF for the UE from the second LMC and an indication of termination of the location session; sending the positioning message to the serving AMF via the external interface for the UE; and deleting the second information for the location session.

There may be some implementations (56) of the above-described first CU (55) wherein the positioning message comprises an event report for periodic or triggered location or an Nlmf_Location_DetermineLocation Response service operation.

One implementation (57) may be a first Central Unit (CU) in a first New Radio (NR) node B (gNB) in a radio access network (RAN) configured to continue a location session for a user equipment (UE), the first CU comprising: means for receiving a first handover request message for the UE from a second gNB, the first handover request message comprising first information for the location session, the first information for the location session including an identity of a first Location Management Component (LMC), an identity of the UE and a first identifier for the location session; means for storing second information for the location session, the second information for the location session including at least part of the first information for the location session; means for completing a handover of the UE from the second gNB to the first gNB; means for determining a second LMC, wherein the second LMC is the first LMC or is different from the first LMC; means for including an identity of the second LMC in the second information for the location session when the second LMC is different from the first LMC; and means for sending a first location session update message to the first gNB, the first location session update message comprising an identity of the second gNB and an identity of the second LMC when the second LMC is different from the first LMC.

There may be some implementations (58) of the above-described first CU (57) wherein the second gNB is a serving gNB for the UE before the handover and the first gNB is a serving gNB for the UE after the handover.

There may be some implementations (59) of the above-described first CU (57) further comprising: means for determining a second identifier for the location session, wherein the second identifier for the location session is the same as the first identifier for the location session or is different from the first identifier for the location session; and means for including the second identifier for the location session in both the second information for the location session and the first location session update message sent to the second gNB when the second identifier for the location session is different from the first identifier for the location session.

There may be some implementations (60) of the above-described first CU (57) wherein a second CU in the second gNB receives the first location session update message sent by the first CU, wherein the second CU sends the first location session update message to the first LMC.

There may be some implementations (61) of the above-described first CU (59) further comprising: means for receiving a positioning message from the second LMC, the positioning message including the second identifier for the location session; and means for sending the positioning message to the UE, based on the second information for the location session.

There may be some implementations (62) of the above-described first CU (61) wherein the positioning message comprises an event report acknowledgment for periodic or triggered location or an LPP message.

There may be some implementations (63) of the above-described first CU (59) further comprising: means for receiving a positioning message from the UE, the positioning message including the second identifier for the location session; and means for sending the positioning message to the second LMC, based on the second information for the location session.

There may be some implementations (64) of the above-described first CU (57) further comprising: means for determining to handover the UE to a third gNB; means for sending a second handover request message to the third gNB, the second handover request message comprising the second information for the location session; means for completing the handover of the UE to the third gNB; means for receiving a second location session update message from the third gNB, the second location session update message comprising an identity of the third gNB; means for sending the second location session update message to the second LMC; and means for deleting the second information for the location session.

There may be some implementations (65) of the above-described first CU (59) further comprising: means for receiving a positioning message intended for a serving Access and Mobility Management Function (AMF) for the UE from the second LMC and an indication of termination of the location session; means for sending the positioning message to the serving AMF for the UE; and means for deleting the second information for the location session.

There may be some implementations (66) of the above-described first CU (65) wherein the positioning message comprises an event report for periodic or triggered location or an Nlmf_Location_DetermineLocation Response service operation.

One implementation (67) may be a non-transitory storage medium including program code stored thereon, the program code is operable to cause at least one processor in a first Central Unit (CU) in a first New Radio (NR) node B (gNB) in a radio access network (RAN) configured to continue a location session for a user equipment (UE) comprising: program code to receive a first handover request message for the UE from a second gNB, the first handover request message comprising first information for the location session, the first information for the location session including an identity of a first Location Management Component (LMC), an identity of the UE and a first identifier for the location session; program code to store second information for the location session, the second information for the location session including at least part of the first information for the location session; program code to complete a handover of the UE from the second gNB to the first gNB; program code to determine a second LMC, wherein the second LMC is the first LMC or is different from the first LMC; program code to include an identity of the second LMC in the second information for the location session when the second LMC is different from the first LMC; and program code to send a first location session update message to the first gNB, the first location session update message comprising an identity of the second gNB and an identity of the second LMC when the second LMC is different from the first LMC.

Therefore, it is intended that claimed subject matter not be limited to the particular examples disclosed, but that such claimed subject matter may also include all aspects falling within the scope of appended claims, and equivalents thereof.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for supporting a location session for a user equipment (UE) performed by a first Central Unit (CU) in a first New Radio (NR) node B (gNB) in a radio access network (RAN), the method comprising:
receiving a first positioning message for the UE from a first entity;
determining a first Location Management Component (LMC);
storing first information for the location session, the first information for the location session including an identity of the first LMC, an identity of the UE and a first identifier for the location session;
forwarding the first positioning message towards the first LMC; and
performing a handover of the UE to a second gNB, whereby the second gNB supports a continuation of the location session.

2. The method of claim 1, wherein the first gNB is a serving gNB for the UE before the handover and the second gNB is a serving gNB for the UE after the handover.

3. The method of claim 1, wherein the first LMC is part of the first CU, wherein forwarding the first positioning message towards the first LMC is internal to the first CU.

4. The method of claim 1, wherein the first LMC is part of the first gNB and separate from the first CU, wherein forwarding the first positioning message towards the first LMC comprises sending the first positioning message to the first LMC in an F1 Application Protocol (F1AP) transfer message.

5. The method of claim 1, wherein the first LMC is part of a third gNB, wherein forwarding the first positioning message towards the first LMC comprises sending the first positioning message to the third gNB in an Xn Application Protocol (XnAP) transfer message.

6. The method of claim 1, wherein forwarding the first positioning message towards the first LMC further comprises forwarding at least some of the first information for the location session along with the first positioning message towards the first LMC.

7. The method of claim 1, further comprising:
receiving a second positioning message from the first LMC, the second positioning message including the first identifier for the location session; and
sending the second positioning message to the UE, based on the first information for the location session.

8. The method of claim 1, further comprising:
receiving a second positioning message from the UE, the second positioning message including the first identifier for the location session; and
sending the second positioning message to the first LMC, based on the first information for the location session.

9. The method of claim 1, wherein performing the handover to the second gNB comprises:
determining to handover the UE to the second gNB;
sending a handover request message to the second gNB, the handover request message comprising the first information for the location session;
completing the handover of the UE to the second gNB;
receiving a location session update message from the second gNB, the location session update message comprising an identity of the second gNB;
sending the location session update message to the first LMC; and
deleting the first information for the location session.

10. The method of claim 9, wherein a second CU in the second gNB receives the handover request message, wherein the second CU stores second information for the location session, the second information for the location session including at least part of the first information for the location session, wherein the second CU sends the location session update message to the first CU.

11. The method of claim 1, wherein the first entity is an Access and Mobility Management Function (AMF), wherein the first positioning message is an Nlmf_Location_DetermineLocation Request service operation, wherein the first positioning message is received inside an NGAP DLTransfer message.

12. The method of claim 11, further comprising:
receiving an Nlmf_Location_DetermineLocation Response service operation from the first LMC, wherein the Nlmf_Location_DetermineLocation Response service operation comprises a location estimate for the UE;
sending the Nlmf_Location_DetermineLocation Response service operation to the AMF inside an NGAP ULTransfer message; and
deleting the first information for the location session.

13. The method of claim 1, wherein the first entity is the UE, wherein the first positioning message comprises an event report for periodic or triggered location of the UE and a routing identifier, the routing identifier indicating any LMC or a serving LMC, and further comprising determining the first LMC based at least in part on the routing identifier.

14. The method of claim 13, wherein the routing identifier indicates the serving LMC, wherein the first LMC is different from the serving LMC, wherein forwarding the event report towards the first LMC comprises sending the event report and an indication of the first LMC to the serving LMC.

15. A first Central Unit (CU) in a first New Radio (NR) node B (gNB) in a radio access network (RAN) configured to support a location session for a user equipment (UE), the first CU comprising:
an external interface configured to communicate with one or more of an Access and Mobility Management Function (AMF), other gNBs in the RAN, other CUs within the other gNBs, and Location Management Components (LMCs) within the other gNBs;
an internal interface configured to communicate with one or more of an LMC within the first gNB, a Distributed Unit (DU) within the first gNB, and a Transmission Reception Point (TRP) within the first gNB, which may include a Reception Point (RP) and Transmission Point (TP);
at least one memory;
at least one processor coupled to the external interface, the internal interface, and the at least one memory, wherein the at least one processor is configured to:
receive a first positioning message for the UE from a first entity;
determine a first Location Management Component (LMC);
store first information for the location session, the first information for the location session including an identity of the first LMC, an identity of the UE and a first identifier for the location session;
forward the first positioning message towards the first LMC; and
perform a handover of the UE to a second gNB, whereby the second gNB supports a continuation of the location session.

16. The first CU of claim 15, wherein the first gNB is a serving gNB for the UE before the handover and the second gNB is a serving gNB for the UE after the handover.

17. The first CU of claim 15, wherein the first LMC is part of the first CU, wherein the first positioning message is forwarded towards the first LMC via the internal interface.

18. The first CU of claim 15, wherein the first LMC is part of the first gNB and separate from the first CU, wherein the at least one processor is configured to forward the first positioning message towards the first LMC by being configured to send the first positioning message to the first LMC via the internal interface in an F1 Application Protocol (F1AP) transfer message.

19. The first CU of claim 15, wherein the first LMC is part of a third gNB, wherein the at least one processor is configured to forward the first positioning message towards the first LMC by being configured to send the first positioning message to the third gNB via the external interface in an Xn Application Protocol (XnAP) transfer message.

20. The first CU of claim 15, wherein the at least one processor is configured to forward the first positioning message towards the first LMC by being further configured to forward at least some of the first information for the location session along with the first positioning message towards the first LMC.

21. The first CU of claim 15, wherein the at least one processor is further configured to:
receive a second positioning message from the first LMC, the second positioning message including the first identifier for the location session; and
send the second positioning message to the UE, based on the first information for the location session.

22. The first CU of claim 15, wherein the at least one processor is further configured to:
receive a second positioning message from the UE, the second positioning message including the first identifier for the location session; and
send the second positioning message to the first LMC, based on the first information for the location session.

23. The first CU of claim 15, wherein the at least one processor is configured to perform the handover to the second gNB by being configured to:
determine to handover the UE to the second gNB;
send a handover request message to the second gNB, the handover request message comprising the first information for the location session;
complete the handover of the UE to the second gNB;
receive a location session update message from the second gNB, the location session update message comprising an identity of the second gNB;
send the location session update message to the first LMC; and
delete the first information for the location session.

24. The first CU of claim 23, wherein a second CU in the second gNB receives the handover request message, wherein the second CU stores second information for the location session, the second information for the location session including at least part of the first information for the location session, wherein the second CU sends the location session update message to the first CU.

25. The first CU of claim 15, wherein the first entity is the AMF, wherein the first positioning message is an Nlmf_Location_DetermineLocation Request service operation, wherein the first positioning message is received inside an Next Generation Application Protocol (NGAP) Downlink (DL)Transfer message.

26. The first CU of claim 25, further comprising:
receiving an Nlmf_Location_DetermineLocation Response service operation from the first LMC, wherein the Nlmf_Location_DetermineLocation Response service operation comprises a location estimate for the UE;
sending the Nlmf_Location_DetermineLocation Response service operation to the AMF inside an NGAP Uplink (UL)Transfer message; and
deleting the first information for the location session.

27. The first CU of claim 15, wherein the first entity is the UE, wherein the first positioning message comprises an event report for periodic or triggered location of the UE and a routing identifier, the routing identifier indicating any LMC or a serving LMC, and wherein the at least one processor is further configured to determine the first LMC based at least in part on the routing identifier.

28. The first CU of claim 27, wherein the routing identifier indicates the serving LMC, wherein the first LMC is different from the serving LMC, wherein the at least one processor is configured to forward the event report towards the first LMC by being configured to send the event report and an indication of the first LMC to the serving LMC.

29. A first Central Unit (CU) in a first New Radio (NR) node B (gNB) in a radio access network (RAN) configured to support a location session for a user equipment (UE), the first CU comprising:
   means for receiving a first positioning message for the UE from a first entity;
   means for determining a first Location Management Component (LMC);
   means for storing first information for the location session, the first information for the location session including an identity of the first LMC, an identity of the UE and a first identifier for the location session;
   means for forwarding the first positioning message towards the first LMC; and
   means for performing a handover of the UE to a second gNB, whereby the second gNB supports a continuation of the location session.

30. A non-transitory storage medium including program code stored thereon, the program code is operable to cause at least one processor in a first Central Unit (CU) in a first New Radio (NR) node B (gNB) in a radio access network (RAN) to support a location session for a user equipment (UE), comprising:
   program code to receive a first positioning message for the UE from a first entity;
   program code to determine a first Location Management Component (LMC);
   program code to store first information for the location session, the first information for the location session including an identity of the first LMC, an identity of the UE and a first identifier for the location session;
   program code to forward the first positioning message towards the first LMC; and
   program code to perform a handover of the UE to a second gNB, whereby the second gNB supports a continuation of the location session.

* * * * *